(12) United States Patent
Futryk et al.

(10) Patent No.: US 12,725,368 B1
(45) Date of Patent: Sep. 1, 2026

(54) WEB BROWSER DERIVED CONTENT INCLUDING REAL-TIME VISUALIZATIONS IN A THREE-DIMENSIONAL GAMING ENVIRONMENT

(71) Applicants: Dennis M. Futryk, San Jose, CA (US); Charles H. House, Portland, OR (US)

(72) Inventors: Dennis M. Futryk, San Jose, CA (US); Charles H. House, Portland, OR (US)

(73) Assignee: Astro Virtual, Inc., Gilroy, CA (US)

( * ) Notice: Subject to any disclaimer, the term of this patent is extended or adjusted under 35 U.S.C. 154(b) by 0 days.

(21) Appl. No.: 19/053,867

(22) Filed: Feb. 14, 2025

Related U.S. Application Data

(60) Continuation-in-part of application No. 18/939,144, filed on Nov. 6, 2024, now abandoned, which is a continuation of application No. 18/431,845, filed on Feb. 2, 2024, now Pat. No. 12,165,263, which is a division of application No. 18/080,216, filed on Dec. 13, 2022, now Pat. No. 11,935,195.

(51) Int. Cl.

| | |
|---|---|
| ***A63F 13/52*** | (2014.01) |
| ***A63F 13/65*** | (2014.01) |
| ***G06F 3/01*** | (2006.01) |
| ***G06F 3/0483*** | (2013.01) |
| ***G06T 19/00*** | (2011.01) |

(52) U.S. Cl.
CPC ............ *G06T 19/003* (2013.01); *A63F 13/52* (2014.09); *A63F 13/65* (2014.09); *G06F 3/011* (2013.01); *G06F 3/0483* (2013.01); *A63F 2300/8082* (2013.01); *G06T 2219/024* (2013.01)

(58) Field of Classification Search
CPC ................................ A63F 13/52; A63F 13/65
See application file for complete search history.

(56) References Cited

U.S. PATENT DOCUMENTS

| | | | | |
|---|---|---|---|---|
| 8,384,710 | B2 * | 2/2013 | Schlottmann | G07F 17/32 463/32 |
| 10,679,411 | B2 * | 6/2020 | Ziman | G06F 3/011 |
| 11,457,178 | B2 * | 9/2022 | Krol | A63F 13/213 |
| 2010/0169795 | A1 * | 7/2010 | Hyndman | G06F 9/542 715/757 |
| 2020/0320794 | A1 * | 10/2020 | Huang | G06T 19/20 |

FOREIGN PATENT DOCUMENTS

| | | | |
|---|---|---|---|
| EP | 3862060 | A1 | 8/2021 |
| WO | 2024069234 | A1 | 4/2024 |

OTHER PUBLICATIONS

3D Immersive Collaboration Consulting, LLC, "Capabilities Statement", © 2019, 1 page, Doc 001.
3D Immersive Collaboration Consulting, LLC, "3D Virtual Locations for Real Work", https://www.3dicc.com/, accessed Feb. 5, 2023, 14 pages, Doc 002.

(Continued)

*Primary Examiner* — David L Lewis
*Assistant Examiner* — Shauna-Kay Hall
(74) *Attorney, Agent, or Firm* — Berkeley Law LLC

(57) ABSTRACT

Briefly, embodiments, such as methods and/or systems of real-time visualization of web browser derived content within a gaming environment, for example, are described.

19 Claims, 34 Drawing Sheets
(31 of 34 Drawing Sheet(s) Filed in Color)

120

(56) References Cited

OTHER PUBLICATIONS

Amazon Web Services (AWS), "AWS GameKit for Unreal Game Engine is now Generally Available", https://aws.amazon.com/about-aws/whats-new/2022/03/aws-gamekit-unreal-engine/, posted Mar. 23, 2022, accessed Feb. 5, 2023, 1 page, Doc 003.
Amazon Web Services (AWS), "Start Building on AWS Today", https://aws.amazon.com/, accessed Feb. 5, 2023, 1 page, Doc 004.
Bostock, Mike and Observable, Inc., "D3—Bring your data to life", https://observablehq.com/@d3/gallery, Aug. 31, 2022, © 2023 Observable, Inc., accessed Feb. 5, 2023, 25 pages, Doc 005.
Cgtrader, "Buy Professional 3D models", https://www.cgtrader.com/3d-models, © CGTrader 2011-2023, accessed Feb. 5, 2023, 6 pages, Doc 006.
Epic Games, "Unreal Engine—Unreal Engine 4.27 Documentation—Customizing the Player Web Page", https://docs.unrealengine.com/4.27/en-US/SharingAndReleasing/PixelStreaming/CustomPlayer/, © 2004-2023, Epic Games, Inc., accessed Feb. 5, 2023, 16 pages, Doc 007.
Epic Games, "Unreal Engine—Unreal Engine 4.27 Documentation—Introduction to Blueprints", https://docs.unrealengine.com/4.27/en-US/ProgrammingAndScripting/Blueprints/GettingStarted/, © 2004-2023, Epic Games, Inc., accessed Feb. 5, 2023, 7 pages, Doc 008.
Epic Games, "Unreal Engine©Unreal Engine 5.0 Documentation©Unreal Engine 5 WebBrowser", https://docs.unrealengine.com/5.0/en-US/API/Runtime/WebBrowser/, © 2004-2023, Epic Games, Inc., accessed Feb. 5, 2023, 5 pages, Doc 009.
Few, Stephen and Interaction Design Foundation, "The Encyclopedia of Human-Computer Interaction", Second Edition, Chapter 35 "Data Visualization for Human Perception", Jan. 1, 2014, 33 pages, Doc 010.
Few, Stephen, "Tapping the Power of Visual Perception", http://www.perceptualedge.com/articles/ie/visual_perception.pdf, Sep. 4, 2004, accessed Feb. 5, 2023, 8 pages, Doc 011.
Friendly, Michael, "A Brief History of Data Visualization," Handbook of Computational Statistics: Data Visualization, Mar. 21, 2006, 44 pages, Doc 012.
House, Chuck. YouTube Video: "Chuck House Virtual Exposition Center—21 Min 49 sec", posted by user anywhereanytime on Nov. 4, 2022, https://www.youtube.com/watch?v=PkarQkMpmiE, accessed Feb. 5, 2023, 1 page, Doc 013.
Kay, Alan, YouTube Video: "Croquet Demo (2003)" posted by user Every Alan Kay Video posted on Jul. 17, 2019 https://www.youtube.com/watch?v=uQTeWJNkyll, recording of presentation at Etech 2003, accessed Feb. 5, 2023, 1 page, Doc 014.
Lemon, Sumner, "Intel's 3D User Interface Gets an Collaboration Application", ABCNews.com, https://abcnews.go.com/Technology/PCWorld/story?id=3630571, accessed Feb. 5, 2023, 2 pages, Doc 015.
Magee, Mike, "Here comes Intel's Miramar", The Register, Sep. 16, 1998, https://www.theregister.com/1998/09/16/here_comes_intels_miramar/, accessed Feb. 5, 2023, 6 pages, Doc 016.
Microsoft Azure, "Microsoft Azure portal", https://azure.microsoft.com/en-us/get-started/azure-portal, accessed Feb. 5, 2023, 1 page, Doc 017.
Microsoft, "Microsoft Power BI Blog—Gartner", https://powerbi.microsoft.com/en-us/blog/tag/gartner/, © 2023 Microsoft, accessed Feb. 5, 2023, 15 pages, Doc 018.
Microsoft, "Quickstart: Create a Game Development Virtual Machine with Unreal Engine", https://learn.microsoft.com/en-us/gaming/azure/game-dev-virtual-machine/create-game-development-vm-for-unreal, Jan. 19, 2023, accessed Feb. 5, 2023, Doc 019.
Microsoft, "Windows Blogs—Creating your own browser with HTML and JavaScript", https://blogs.windows.com/msedgedev/2015/08/27/creating-your-own-browser-with-html-and-javascript/, Aug. 27, 2015, © Microsoft 2023, accessed Feb. 5, 2023, 6 pages, Doc 020.
Nvidia, "Developer—RTX Technology", https://developer.nvidia.com/rtx/ray-tracing, © 2023 Nvidia Corporation, accessed Feb. 5, 2023, 15 pages, Doc 021.
Qube, "Build your new world. Learn how in ours.", https://home.qube.cc/, accessed Feb. 5, 2023, 11 pages, Doc 022.
ShouldIRemoveIt.com, Program Search Results for "3d ICC Terf", https://www.shouldiremoveit.com/3d-ICC-Terf- 119053-program.aspx, accessed Jan. 15, 2023, 3 pages, Doc 023.
Teleplace.wordpress.com, "The Teleplace Blog—Moving Immersive Collaboration Forward", https://teleplace.wordpress.com/2011/05/03/moving-immersive-collaboration-forward, May 3, 2011, accessed Feb. 5, 2023, 5 pages, Doc 024.
Wenczel, Heiko, "Unreal Engine—Streaming Unreal Engine content to multiple platforms—Comparison of HTML5, WebGL, and Pixel Streaming", Copyright © 2020 Epic Games, Inc., accessed at https://www.unrealengine.com/en-US/tech-blog/discover-pixel-streaming-real-time-distributed-content-for-any-device, accessed Feb. 5, 2023, 14 pages, Doc 025.
Wikipedia, "Unreal Engine", https://en.wikipedia.org/wiki/Unreal_Engine, last edited on Feb. 5, 2023, at 22:55 (UTC), accessed Feb. 5, 2023, 28 pages., Doc 026.
Wikipedia, "OpenQwag", https://en.wikipedia.org/wiki/OpenQwag, last edited on Jun. 11, 2022, at 10:19 (UTC), accessed Feb. 5, 2023, 4 pages, Doc 027.
Wikipedia, "Croquet OS", https://en.wikipedia.org/wiki/Croquet_OS, last edited on Dec. 25, 2022, at 15:02 (UTC), accessed Feb. 5, 2023, 6 pages, Doc 028.
Wikipedia, "Open Cobalt", https://en.wikipedia.org Open_Cobalt, last edited on Dec. 25, 2022, at 15:01 (UTC), accessed Feb. 5, 2023, 6 pages, Doc 029.
ZoomInfo.com, Company Search Results for "3d ICC", https://www.zoominfo.com/c/3d-icc/354627180, accessed Jan. 15, 2023, 7 pages, Doc 030.
Slide Presentation—"Situational Awareness, How to gain and maintain it" https://slidetodoc.com/situational-awareness-how-to-gain-and-maintain-it/ accessed Apr. 13, 2024, 31 pages, Doc 055.
Slide Presentation—"Critical Thinking, An Introduction to Situational Awareness and Decisionmaking", https://studylib.net/doc/9711154/critical-thinking-an-introduction-to-situational-awareness, accessed Apr. 13, 2024, 16 pages, Doc 056.
SKYbrary Aviation Safety, "Situational Awareness (OGFA BN)" https://skybrary.aero/articles/situational-awareness-oghfa-bn accessed Apr. 13, 2024, copyright 2021-2024, 11 pages, Doc 057.
Work in VR, "Immersed—Tips & Tricks—Screen Configuration Slots" Jun. 9, 2022, available at https://www.youtube.com/watch?v=xl-aceKGDGk (Year: 2022), Doc 073.
Jorgensen, Kevin Storm, "Collaborative Room Screen Sharing in Immersed" May 5, 2023, available at https://www.youtube.com/watch?v+GM_bG_6PZEM (Year: 2023), Doc 074.
Hewlitt-Packard, "Measure" May-Jun. 1989 Issue, 32 pages, Doc 094.
Adobe Communications Team, "Types of analytics explained—descriptive, predictive, prescriptive, and more," Nov. 8, 2022, 9 pages, Doc 095.
Vleeshouwer, MIck, "How to create a private ChatGPT with your own data", Medium.com, Mar. 27, 2023, 16 pages, Doc 096.
InsightSoftware, "Comparing Descriptive, Predictive, Prescriptive, and Diagnostic Analytics", The Four Types of Analytics Guide, 2/17/023, 12 pages, Doc 097.
Wikipedia, "Cloud gaming," https://en.wikipedia.org/wiki/Cloud_gaming, Accessed Feb. 4, 2025, 9 pages, Doc 098.
McCoy, Julia, "Ilya Sutskever Breaks Silence: The Wild Truth About AI's Future | OpenAI's Ex-Chief Scientist", Dec. 19, 2024 https://aiaffiliatemarket.com/ilya-sutskever-breaks-silence-the-wild-truth-about-ais-future-openais-ex-chief-scientist/ Video Link, 9 pages, Doc 099.
Dickson, Ben, "How to create a private ChatGPT that interacts with your local documents," TeckTalks Jun. 1, 2023, 6 pages, Doc 100.
Spotfire, "What is predictive analytics?", https://www.spotfire.com/glossary/what-is-predictive-analytics, Spotfire Behind the Scenes: The Mechanism of Predictive Analytics, Accessed Dec. 11, 2024, 7 pages, Doc 101.

(56) References Cited

OTHER PUBLICATIONS

Wikipedia, "Situation Awareness" https://en.wikipedia.org/wiki/Situation_awareness Accessed Dec. 23, 2024, 28 pages, Doc 102.
Dickson, Ben, "How to customize LLMs like ChatGPT with your own data and documents" TechTalks, May 1, 2023, 7 pages, Doc 103.
Diepeveen, Mary-Jo, "Artificial Intelligence with Power BI: Take your data analytics skills to the next level by leveraging the AI capabilities in Power BI" eBook, Chapter 7, "Using Cognitive Services", 21 pages, Doc104.
Way, Ted, "From Hindsight to Foresight: Machine Learning with Excel and Power BI" Gartner graph/screen shot, https://www.youtube.com/watch?v=5cpUZs9ECP4 Accessed Dec. 23, 2024. 1 page Doc 105.
Wikipedia, "Management Accounting" https://en.wikipedia.org/wiki/Management_accounting Accessed Dec. 30, 2024, 11 pages, Doc 106.
Srinivasan, Praburam, "How to Use ChatGPT for Excel Formulas | ClickUp" https://clickup.com/blog/how-to-use-chatgpt-for-excel-formulas/ Oct. 2, 2024, 22 pages, Doc 107.
Wikipedia, "Management Accounting", https://en.wikipedia.org/w/index.php?title=Management_accounting&oldid=1259670438 Accessed Dec. 30, 2024, 11 pages, Doc 108.
Riverlogic, "The Ultimate Guide to Prescriptive Analytics" https://riverlogic.com/technology-platform/prescriptive-analytics/ Accessed Dec. 30, 2024, 43 pages, Doc 109.
LM Studio "Your local AI toolkit", https://lmstudio.ai/ Accessed Feb. 19, 2025, 1 page, Doc 110.
Futryk, Scott, CHATgpt o3 mini dialog completed by Scott Futryk on Feb. 11, 2025, 13 pages, Doc 111.
OpenAI, "Prompt engineering best practices for ChatGPT" https://help.openai.com/en/articles/10032626-prompt-engineering-best-practices-for-chatgpt Accessed Feb. 11, 2025, 3 pages, Doc 112.
OpenAI Developer Community, https://community.openai.com/t/voice-to-text-via-whisper-integration-in-chatgpt-web-app/685231 Accessed Feb. 19, 2025, 4 pages, Doc 113.
OpenAI "Prompt engineering best practices for ChatGPT" https://help.openai.com/en/articles/10032626-prompt-engineering-best-practices-for-chatgpt Accessed Feb. 19, 2025, 3 pages, Doc 114.
OpenAI "Introducing GPT-4o" https://www.youtube.com/live/DQacCB9tDaw Accessed Feb. 19, 2025, pages, Doc 115.
Dickson, Ben, "How to customize LLMs like ChatGPT with your own data and documents" May 1, 2023, 17 pages, Doc 116.
Krensky, Peter, "The Future of Data & Analytics: From Data-Driven to Decision-Centric" Gartner Webinars, 2024, 33 pages, Doc 117.
Baum, David *Generative AI and LLMs for Dummies*, 2024 by John Wiley & Sons, Inc., Hoboken, New Jersey, 52 pages, Doc 118.
Analytics8, "What Are the Four Types of Analytics and How Do You Use Them?" Jul. 29, 2024, 15 pages, Doc 119.
OpenAI Help Center, "Extracting Insights with ChatGPT Data Analysis" https://help.openai.com/en/articles/9213685-extracting-insights-with-chatgpt-data-analysis#main-content Accessed Feb. 13, 2025, 11 pages, Doc 120.
Kimball, Ralph and Ross, Margy, *The Data Warehouse Toolkit* Third Edition, Chapter 7, "Using Cognitive Services" 21 pages Doc 121.
Hammarberg, Marcus, "Creating a local Chat GPT—using private data" https://www.marcusoft.net/2023/12/creating-a-local-gpt-chat.html Dec. 1, 2023, 8 pages, Doc 122.
Wikipedia "Cloud Computing" file:///C:/Users/jjack/Downloads/Cloud%20computing%20-%20Wikipedia.pdf Accessed Feb. 4, 2025, 21 pages, Doc 123.
Wikipedia "Cloud Gaming" https://en.wikipedia.org/w/index.php?title=Cloud_gaming&oldid=1272324974 Accessed Feb. 19, 2025, 9 pages, Doc 124.
OpenAI Help Center "Data Analysis with ChatGPT" https://help.openai.com/en/articles/8437071-data-analysis-with-chatgpt Accessed Feb. 29, 2025, 6 pages, Doc 125.
www.Luzmo.com, Using AI for Data Analysis: The Ultimate Guide (2025) https://www.luzmo.com/blog/ai-data-analysis_7/17/2024, 14 pages, Doc 126.
House C. and Price, R. "The Return Map: Tracking Project Teams," Harvard Business Review, Jan.-Feb. 1991, pp. 92-101, https://hbr.org/1991/01/the-return-map-tracking-product-teams Accessed Feb. 19, 2025, 19 pages, Doc 127.
Wikipedia, "Performance Indicator" https://en.wikipedia.org/wiki/Performance_indicator Accessed Feb. 19, 2025, 9 pages, Doc 128.
Wikipedia, "Performance Measurement" https://en.wikipedia.org/wiki/Performance_measurement Accessed Feb. 19, 2025 , 4 pages, Doc 129.
OpenAI, "Prompt engineering best practices for ChatGPT" https://help.openai.com/en/articles/10032626-prompt-engineering-best-practices-for-chatgpt Accessed Feb. 19, 2025, 3 pages, Doc 130.
Greenberg, Andy, "Building the Feds' Virtual War Room" Forbes Mar. 20, 2008, Updated Jul. 12, 2012, 4 pages, Doc 131.
House, Charles H., "Innovation and Resilience: Seldom mentioned All Important," Ted x Livermore, May 2013, 8:40-9:40 time segment, https://www.youtube.com/watch?v=a2oeSFkV7eE, 2 pages, Doc 132.
House, Charles H., "Permission Denied: Odyssey of an Intrapreneur," InnovaScapes Institute, May 7, 2012, https://www.amazon.com/Permission-Denied-Charles-H-House/dp/130086429X, 235 pages, Doc 133.
Dumaine, Brian, "How managers can succeed through speed," Fortune, Feb. 13, 1989, pp. 54-59, and House C. and Price, R. "The Return Map: Tracking Project Teams," Harvard Business Review, Jan.-Feb. 1991, pp. 92-101. https://hbr.org/1991/01/the-return-map-tracking-product-teams, 19 pages, Doc 134.
Kaplan, Robert, and Steven Anderson, "Time-Driven Activity-Based Costing," Harvard Business Review, Nov. 2004, https://hbr.org/2004/11/time-driven-activity-based-costing, 18 pages, Doc 136.
House, Charles H. and Raymond L. Price, "Competitiveness with the Return Picture/. You Bet!" Internal HP document, Jan. 1, 1989, revised Mar. 27, 1989, https://www.researchgate.net/publication/387465260_Original_RETURN_MAP_paper_for_Harvard_Biz_Review, 21 pages, Doc 137.
House, Charles, Managing R&D and Technology: Converting Your R&D Strength into Profitable Products, Dec. 19, 1991, London School of Economics, https://www.researchgate.net/publication/387469164_London_Retum_Map_Text, 12 pages, Doc 138.
U.S. Appl. No. 18/080,216: Patent application as filed Dec. 13, 2022, 125 pages, Doc 031.
U.S. Appl. No. 18/080,216: Filing Receipt issued Jan. 5, 2023, 5 pages, Doc 032.
U.S. Appl. No. 18/080,216: Filing Receipt issued Jan. 20, 2023, 4 pages, Doc 033.
U.S. Appl. No. 18/080,216: Patent Application as filed Jan. 29, 2023, 121 pages, Doc 034.
U.S. Appl. No. 18/080,216: Amendment filed Jan. 30, 2023, 5 pages, Doc 035.
U.S. Appl. No. 18/080,216: Amendment filed Feb. 2, 2023, 5 pages, Doc 036.
U.S. Appl. No. 18/080,216: Amendment and Petition to Accept Color Drawings filed Feb. 6, 2023, Doc 037.
U.S. Appl. No. 18/080,216: Updated filing Receipt issued Feb. 9, 2023, 4 pages, Doc 038.
U.S. Appl. No. 18/080,216: Decision dismissing Petition to Accept Color Drawings dated Mar. 7, 2023, 4 pages, Doc 039.
U.S. Appl. No. 18/080,216: Amendment and Petition to Accept Color Drawings filed Mar. 22, 2023, 66 pages, Doc 040.
U.S. Appl. No. 18/080,216: Decision granting Petition to Accept Color Drawings dated Mar. 29, 2023, 4 pages, Doc 041.
U.S. Appl. No. 18/080,216: Preliminary Amendment filed Apr. 18, 2023, 8 pages, Doc 042.
U.S. Appl. No. 18/080,216: Petition to Make Special filed Aug. 14, 2023, 2 pages, Doc 043.
U.S. Appl. No. 18/080,216: Grant of Petition to Make Special dated Aug. 14, 2023, 1 page, Doc 044.
U.S. Appl. No. 18/080,216: Restriction Requirement issued Oct. 10, 2023, 10 pages, Doc 045.

(56) References Cited

OTHER PUBLICATIONS

U.S. Appl. No. 18/080,216: Response to Restriction Requirement and Amendment filed Oct. 19, 2023,12 pages, Doc 046.
U.S. Appl. No. 18/080,216: Non-final Office Action issued Dec. 5, 2023, 17 pages, Doc 047.
U.S. Appl. No. 18/080,216: Non-final Office Action issued Jan. 4, 2024, 18 pages, Doc 048.
U.S. Appl. No. 18/080,216: Amendment filed Jan. 10, 2024, 15 pages, Doc 049.
U.S. Appl. No. 18/080,216: Examiner Interview Summary dated Jan. 23, 2024, 3 pages, Doc 050.
U.S. Appl. No. 18/080,216: Notice of Allowance issued Feb. 2, 2024, 12 pages, Doc 051.
U.S. Appl. No. 18/080,216: Issue Fee and Amendment filed Feb. 2, 2024, 10 pages, Doc 052.
U.S. Appl. No. 18/080,216: Notice of Allowance issued Feb. 13, 2024, 7 pages, Doc 053.
U.S. Appl. No. 18/080,216: Issue Notification issued Feb. 28, 2024, 7 pages, Doc 054.
U.S. Appl. No. 18/431,845: Application as filed Feb. 2, 2024; 129 pages, Doc 058.
U.S. Appl. No. 18/431,845: Preliminary Amendment as filed Feb. 23, 2024; 28 pages, Doc 059.
U.S. Appl. No. 18/431,845: Petition and Grant of Petition to Make Special dated Feb. 23, 2024; 4 pages, Doc 060.
U.S. Appl. No. 18/431,845: Oaths/Declarations filed Mar. 2, 2024; 5 pages, Doc 061.
U.S. Appl. No. 18/431,845: Filing Receipt and Notice to File Missing Parts dated Mar. 20, 2024; 7 pages, Doc 062.
U.S. Appl. No. 18/431,845: Petition to Accept Color Drawings filed Mar. 21, 2024, 63 pages, Doc 063.
U.S. Appl. No. 18/431,845: Updated Filing Receipt dated Apr. 18, 2024, 4 pages, Doc 064.
U.S. Appl. No. 18/431,845: Grant of Petition to Accept Color Drawings dated Apr. 29, 2024, 4 pages, Doc 065.
U.S. Appl. No. 18/431,845: Non-final Office Action issued May 21, 2024; 36 pages, Doc 066.
U.S. Appl. No. 18/431,845: Response to Non-final Office Action filed Jul. 15, 2024, 131 pages, Doc 067.
U.S. Appl. No. 18/431,845: Final Office Action issued Sep. 28, 2024, 16 pages, Doc 068.
U.S. Appl. No. 18/431,845: Response to Final Office Action filed Oct. 8, 2024, 11 pages, Doc 069.
U.S. Appl. No. 18/431,845: Notice of Allowance dated Oct. 24, 2024, 12 pages, Doc 070.
U.S. Appl. No. 18/431,845: Issue Fee Payment as 312 Amendment filed Oct. 28, 2024, 12 pages, Doc 071.
U.S. Appl. No. 18/431,845: Issue Notification dated Nov. 20, 2024, 2 pages, Doc 072.
U.S. Appl. No. 18/431,845: Certificate of Correction dated Dec. 10, 2024, 1 page, Doc 075.
U.S. Appl. No. 18/939,144: Application as filed Nov. 6, 2024; 125 pages, Doc 076.
U.S. Appl. No. 18/939,144: Granted Petition to Make Special dated Nov. 17, 2024, 2 pages, Doc 077.
U.S. Appl. No. 18/939,144: Notice to File Missing Parts dated Nov. 18, 2024, 2 pages, Doc 078.
U.S. Appl. No. 18/939,144: Filing Receipt dated Nov. 18, 2024, 4 pages, Doc 079.
U.S. Appl. No. 18/939,144: Petition to Accept Color Drawings or Photographs dated Nov. 26, 2024, 57 pages, Doc 080.
U.S. Appl. No. 18/939,144: Power of Attorney filed Nov. 27, 2024, 4 pages, Doc 081.
U.S. Appl. No. 18/939,144: Preliminary Amendment filed Dec. 22, 2024, 22 pages, Doc 082.
U.S. Appl. No. 18/939,144: Updated Filing Receipt dated Dec. 23, 2024, 4 pages, Doc 083.
U.S. Appl. No. 18/939,144: Notice of Acceptance of Power of Attorney dated Dec. 26, 2024, 1 page, Doc 084.
U.S. Appl. No. 18/939,144: Oath/Declaration filed Jan. 7, 2025, 3 pages, Doc 085.
U.S. Appl. No. 18/939,144: Petition Granting Request to File Color Drawings or Photographs dated Jan. 21, 2025, 4 pages, Doc 086.
U.S. Appl. No. 18/939,144: Non-final Office Action dated Jan. 31, 2025, 37 pages, Doc 087.
U.S. Appl. No. 18/939,144: Response to Non-final Office Action filed Feb. 4, 2025, 101 pages, Doc 088.
U.S. Appl. No. 18/939,144: Corrected Application Data Sheet filed Feb. 19, 2025, 14 pages, Doc 089.
U.S. Appl. No. 18/939,144: Corrected Application Data Sheet filed Mar. 6, 2025, 46 pages, Doc 090.
U.S. Appl. No. 18/939,144: Corrected Filing Receipt dated Mar. 10, 2025, 4 pages, Doc 091.
U.S. Appl. No. 18/939,144: Express Abandonment of Application filed Mar. 13, 2025, pages, Doc 092.
U.S. Appl. No. 18/939,144: Notice of Abandonment dated Mar. 18, 2025, 2 pages, Doc 093.

* cited by examiner

100

120

200

300

400

500

600

700

800

1000

1100

1200

1300

FIG. 14
ACM Athena Lecturer Award

1400

1500

1600

1700

1800

1900

2000

2100

2200

2300

2400

2500

FIG. 31
EAGLE Pixel Streaming x 4 Devices Simultaneously
Samsung Galaxy S22
14 Pro Max

WEB BROWSER DERIVED CONTENT INCLUDING REAL-TIME VISUALIZATIONS IN A THREE-DIMENSIONAL GAMING ENVIRONMENT

RELATED PATENT APPLICATIONS

This patent application is a continuation in part of U.S. patent application Ser. No. 18/939,144, titled WEB BROWSER DERIVED CONTENT INCLUDING REAL-TIME VISUALIZATIONS IN A THREE-DIMENSIONAL GAMING ENVIRONMENT, filed on Nov. 6, 2024, by Futryk et al., which is a continuation of U.S. patent application Ser. No. 18/431,145, titled WEB BROWSER DERIVED CONTENT INCLUDING REAL-TIME VISUALIZATIONS IN A THREE-DIMENSIONAL GAMING ENVIRONMENT, filed on Feb. 2, 2024, by Futryk et al., which has issued as U.S. patent Ser. No. 12/165,263, on Dec. 10, 2024, which also is a divisional of U.S. patent application Ser. No. 18/080,216, titled WEB BROWSER DERIVED CONTENT INCLUDING REAL-TIME VISUALIZATIONS IN A THREE-DIMENSIONAL GAMING ENVIRONMENT, filed on Dec. 13, 2022, by Futryk et al., which has issued as U.S. patent Ser. No. 11/935,195, on Mar. 19, 2024.

BACKGROUND

1. Field

This disclosure relates to web browser derived content that includes real-time visualizations appearing in a three-dimensional (3D) gaming environment.

2. Information

In certain situations, individuals may digest content, such as, during a visit to a museum, walking through an exposition, or experiencing an institution's Hall of Fame. Likewise, for a business, a CEO, executive staff (e.g., CFO, COO, CSO, CIO, etc.) a founder, partners, etc., may need to digest various types of content employed to communicate status information to such individuals, often important or even critical status information. Often images, videos, power point slides, word documents, web pages, email messages, text messages, audio recordings, and so on, may be employed as non-limiting examples. However, for an individual in either of these situations to digest the information being communicated via such content, for example, in real-time, may at times be daunting.

Mechanisms, such as web pages, have been devised, but still often fall short of the task. For one thing, the content may not be in a web page form. Furthermore, even web pages may be limited in terms of the amount and/or variety of content types that may be communicated in real-time and in one place. As mentioned, the content to be communicated may not exist in an appropriate form; however, in addition, navigating between web pages, such as for a website or even between different websites, may be time-consuming, cumbersome, and/or be distracting to an individual attempting to digest a large amount of content quickly, as is typically desirable in a number of situations.

Another disadvantage may be that those web pages and/or websites may not be available in real-time to others who may be remotely located from a decisionmaker. That decisionmaker may be navigating between different forms of content and across many web pages and/or websites in a manner so as to digest the real-time information conveyed by that content but may also seek the advice of one or more subject matter experts before making a decision.

It would be desirable if another, better, approach existed to communicate a large amount content, in various forms, to one or even to multiple individuals in real-time, including real-time updates, if appropriate.

BRIEF DESCRIPTION OF DRAWINGS

The patent or application file contains at least one drawing executed in color. Copies of this patent or patent application publication with color drawing(s) will be provided by the Office upon request and payment of the necessary fee.

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

DETAILED DESCRIPTION

Figure 1:
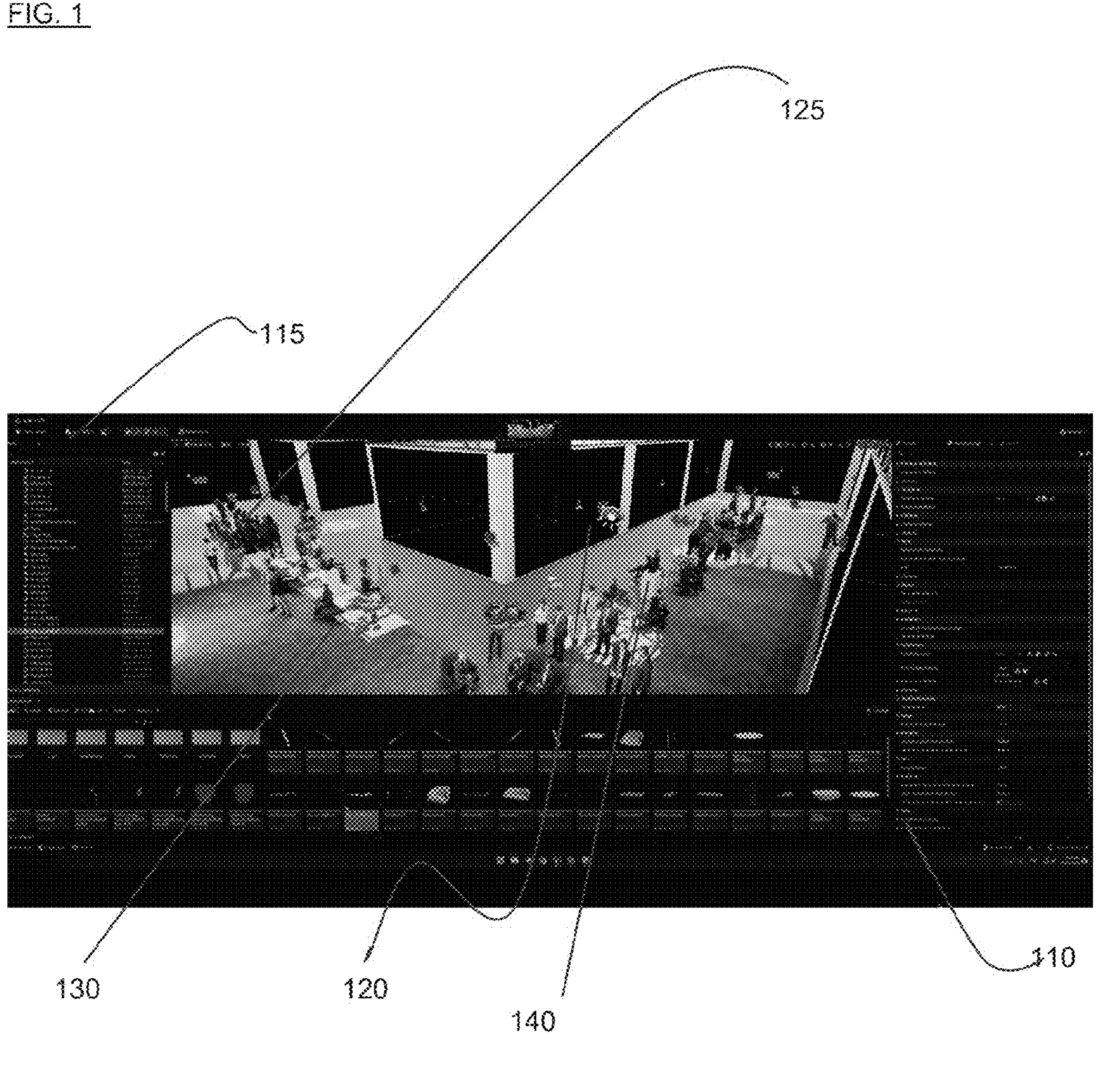
FIG. 1 is an illustration of a window of an embodiment of a computer-generated three-dimensional (3D) gaming environment that may be edited to provide a host of 3D virtual displays in accordance with claimed subject matter.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims and are not necessarily intended to refer to a complete claim set, to a particular combination of claim sets (e.g., method claims, apparatus claims, etc.), or to a particular claim. Furthermore, the phrase "in this context" is meant to refer to the context of the present patent application.

In certain situations, individuals may digest content, such as, during a visit to a museum, walking through an exposition, or experiencing an institution's Hall of Fame. Likewise, for a business, a CEO, executive staff (e.g., CFO, COO, CSO, CIO, etc.) a founder, partners, etc., may need to digest various types of content employed to communicate status information to such individuals, often important or even critical status information. Often images, videos, power point slides, word documents, web pages, email messages, text messages, audio recordings, and so on, may be employed as non-limiting examples. However, for an individual in either of these situations to digest the information being communicated via such content, for example, in real-time, may at times be daunting.

Mechanisms, such as web pages, have been devised, but still, often fall short of the task. For one thing, the content may not be in a web page form. Furthermore, even web pages may be limited in terms of the amount and/or variety of content types that may be communicated in real-time and in one place. As mentioned, the content to be communicated may not exist in an appropriate form; however, in addition, navigating between web pages, such as for a website or even between different websites, may be time-consuming, cumbersome, and/or be distracting to an individual attempting to digest a large amount of content quickly, as is typically desirable in a number of situations, such as if managing a factory, managing a company, and so on.

Another disadvantage may be that those web pages and/or websites may not be available in real-time to others who may be remotely located from a decisionmaker. That decisionmaker may be navigating between different forms of content and across many web pages and/or websites in a manner so as to digest the real-time information conveyed by that content but may also seek the advice of one or more subject matter experts before making a decision. It would be desirable if another, better, approach existed to communicate a large amount content, in various forms, to one or even to multiple individuals in real-time, including real-time updates, if appropriate.

Figure 2:
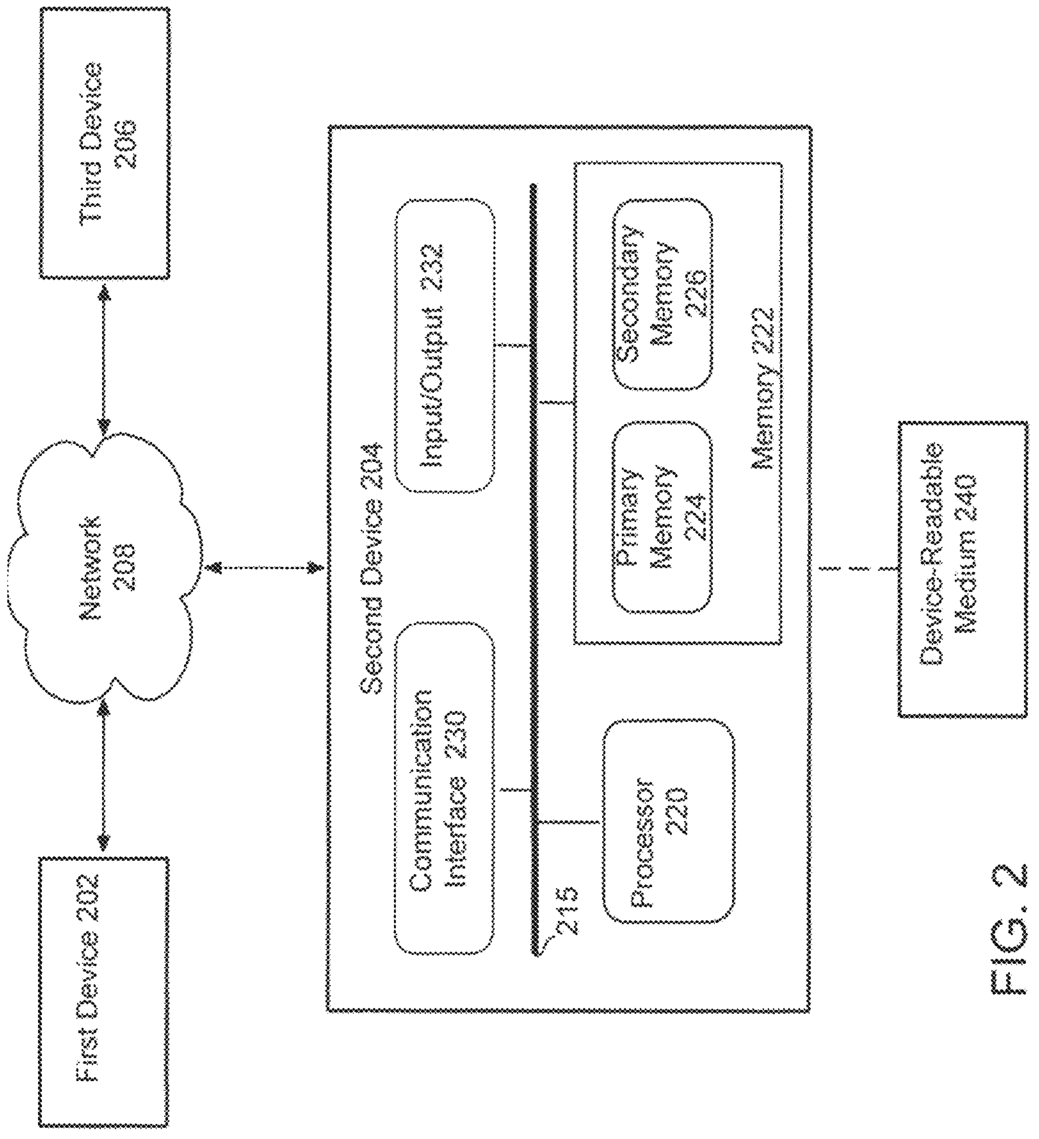
FIG. 2 is an illustration of a schematic diagram showing an embodiment of a computing and/or communications network that includes several computing devices able to mutually communicate via the computing and/or communications network.

Referring now to FIG. 2, in an embodiment, first and third devices 202 and 206 may be capable of rendering a graphical user interface (GUI) for a network device and/or a computing device, for example, so that a user-operator may engage in system use. Device 204 may potentially serve a similar function in this illustration. Likewise, in FIG. 2, computing device 202 ('first device' in figure) may interface with computing device 204 ('second device' in figure), which may, for example, comprise features of a client computing device and/or a server computing device, in an embodiment. Processor (e.g., processing device) 220 and memory 222, which may comprise primary memory 224 and secondary memory 226, may communicate by way of a communication bus 215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. It is further noted that the term "computing device," in general, whether employed as a client and/or as a server, or otherwise, refers at least to a processor and a memory connected by a communication bus, such as illustrated in FIG. 2. Thus, a computing device, in the context of the present patent application, may comprise hardware, software, firmware, or any combinations thereof (other than software per se). Computing device 204, as depicted in FIG. 2 is merely one example, and claimed subject matter is not limited in scope to this particular example.

For one or more embodiments, a device, such as a computing device and/or networking device, may comprise, for example, any of a wide range of digital electronic devices. These may include, but are not limited to, desktop and/or laptop computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combinations of the foregoing. These may also include, but are not otherwise limited to, current and/or next generation stand-alone 3D gaming simulation devices, or any combinations thereof. Likewise, the terms computing device, computer, computer device, computer system, computer platform and the like may be used interchangeable without loss of generality or understanding. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a web-enabled computing device may include a physical and/or a virtual keyboard, mass storage, one or more accelerometers, one or more gyroscopes, global positioning system (GPS) and/or other location-identifying type capability, and/or a display with a high degree of functionality, such as a touch-sensitive color 2D or 3D display.

Communications between a computing device and/or a network device and a wireless network, as an example, may be in accordance with known and/or to be developed network protocols including, but not limited to, for example, global system for mobile communications (GSM), enhanced data rate for GSM evolution (EDGE), 802.11b/g/n/h, etc., worldwide interoperability for microwave access (WiMAX), 3G, 4G, 4G, 5G, as well as any or all next generation wireless network protocols, or any combinations thereof. A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that it may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

Additional details regarding the components of computing device 204 are described later. However, it is noted that, in an embodiment, computing device 204 may comprise a computing device or system that includes a state-of-the art graphics processor unit (GPU) and a state-of-the-art central processing unit (CPU), such as the Nvidia RTX3070 GPU, available from Nvidia Corp., and the Intel Core i9 microprocessor, available from Intel Corp., both located in San Jose, CA, as merely examples. It is noted, of course, that claimed subject matter is not limited in scope in this respect. Nonetheless, such an embodiment, for example, may include software capable of computer generating a three-dimensional gaming environment. Likewise, as indicated, claimed subject matter is not limited in scope in this respect.

In this context, the term "three-dimensional (3D) gaming environment" refers to a computer-generated three-dimensional virtual representation of a real-world environment, which may, as an example, be generated from geometric signal and/or state information, with the ability for a user to virtually move within and/or virtually interact with that three-dimensional virtual representation of a real-world environment. Furthermore, a 3D gaming environment, in an embodiment, may be fully immersive and photorealistic, as described in more detail below.

As another example of an embodiment, computing device 204 may comprise a server or even several servers, such as may be provided by Amazon Web Services (AWS), see: aws.amazon.com/, or by Microsoft Azure, see azure.microsoft.com/en-us/get-started/azure-portal. For example, such one or more servers may include software executable to provide a "virtual machine," denoted VM, so that it is not necessary to own a computing device or system to have the capability to computer generate a 3D gaming environment for others to access. That is, for such an embodiment, computing device 204, for example, may be accessible via a network, such as via the Internet or the Worldwide Web. Again, claimed subject matter is not intended to be limited in scope to this illustrative example.

Thus, in an embodiment, a computing device 204 may execute 3D rendering software and/or other similar software tools to computer generate a three-dimensional gaming environment. A host of commercial application software is available in this regard. As simply one example, Unreal Engine software, available from Epic Games, see en.wikipedia.org/wiki/Unreal_Engine, may be employed to computer generate a three-dimensional gaming environment. Furthermore, if employing a virtual machine, as described above, for an embodiment, AWS, see aws.amazon.com/about-aws/whats-new/2022/03/aws-gamekit-unreal-engine/ and Azure, see learn.microsoft.com/en-us/gaming/azure/game-dev-virtual-machine/create-game-development-vm-for-unreal, both support Unreal Engine.

Figure 3:
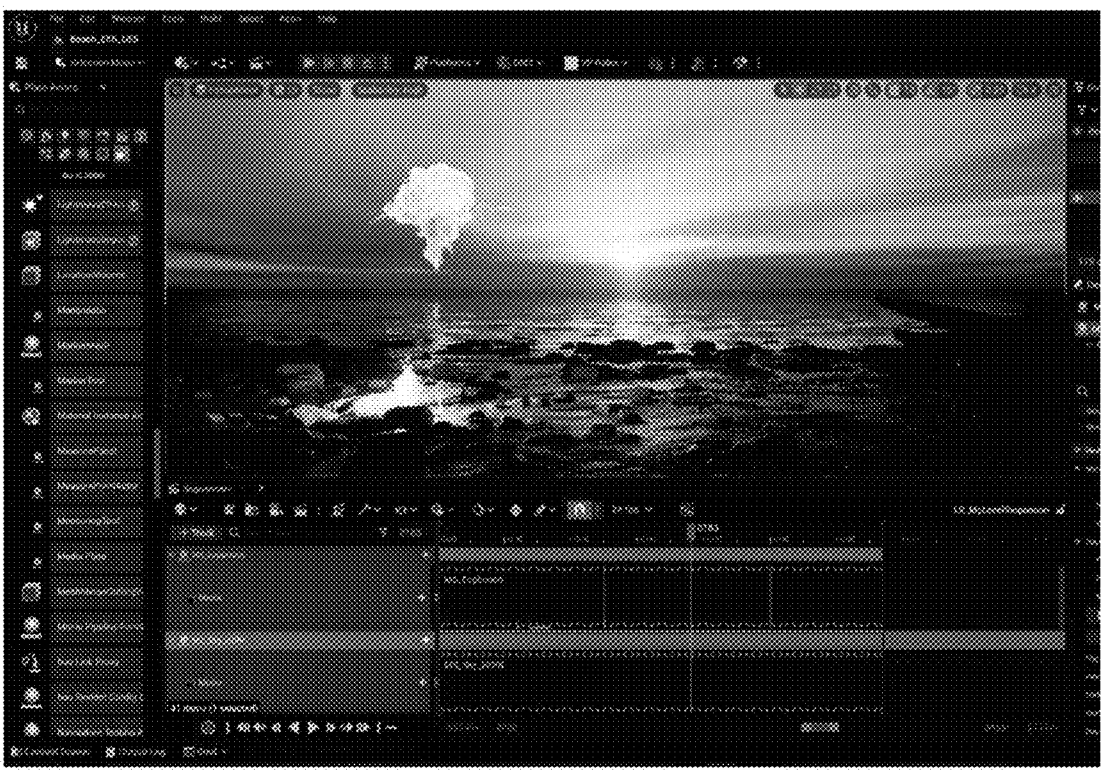
FIG. 3 is a window illustrating an image of Unreal Engine 5.1, available from Epic Games.

Unreal Engine (UE) is a three-dimensional (3D) computer graphics game engine developed by Epic Games, first showcased in the 1998 first-person shooter game Unreal. Initially developed for PC first-person shooters, it has since been used in a variety of genres of games and has also seen adoption by other industries, most notably the film and television industry. Written in C++, the Unreal Engine features a high degree of portability, supporting a wide range of desktop, mobile, and/or console platforms. The latest generation, Unreal Engine 5, was launched in April 2022. Its source code is available on GitHub after registering an account, and commercial use is granted based on a royalty model. It is noted that there are several versions of Unreal Engine. For example, versions 4 and above, including versions that may later be developed, are included as illustrative examples and are intended to be included within the scope of claimed subject matter. Referring to FIG. 3, as one example, Unreal Engine 5.1 300 is illustrated by a screen shot, as shown. Of course, Unreal Engine is simply one example, and it is not intended that claimed subject matter be limited in scope to Unreal Engine software.

Unreal Engine 5 was revealed on May 13, 2020 by Epic Games. It was released in early access on May 26, 2021, and formally launched for developers on Apr. 5, 2022. One of its major features is Nanite, an engine that allows for detailed photographic source material to be imported into games.

The goal of Unreal Engine 5 was to make it as easy as possible for game developers to create detailed game worlds without having to spend excessive time on creating new detailed assets. Among its features are collision detection, colored lighting, and texture filtering. An integrated level editor, UnrealEd, that has support for real-time constructive solid geometry operations, allows mappers to change the level layout on the fly.

Nanite can import nearly any other pre-existing three-dimensional representation of objects and environments, enabling the use of film-quality assets. Nanite automatically handles the levels of detail (LODs) of these imported objects appropriate to the target platform and draw distance, a task that an artist would have had to perform otherwise. Lumen is another component described as a "fully dynamic global illumination solution that immediately reacts to scene and light changes". Lumen eliminates the need for artists and/or developers to craft a lightmap for a given scene, but instead calculates light reflections and shadows on the fly, thus allowing for real-time behavior of light sources. Virtual Shadow Maps is another component added in Unreal Engine 5 described as "a new shadow mapping method used to deliver consistent, high-resolution shadowing that works with film-quality assets and large, dynamically lit open worlds". Virtual Shadow Maps differs from the common shadow map implementation in its extremely high resolution, more detailed shadows, and the lack of shadows popping in and out which can be found in the more common shadow map technique due to shadow cascades. Additional components include Niagara for fluid and particle dynamics and Chaos for a physics engine. With potentially tens of billions of polygons present on a single screen at 4K resolution, Epic also developed the Unreal Engine 5 to take advantage of the upcoming high-speed storage solutions with next-generation console hardware expected to use a mix of RAM and custom solid-state drives.

A version of Unreal Engine, Unreal Engine 5.1, is currently available. Thus, executing on a computing device, such as 204, which may, as described, comprise a platform with one or more state of the art GPUs and CPUs, or which may comprise a virtual machine (VM), executing on one or more servers, such as via AWS or Microsoft Azure, an immersive, photorealistic, virtual three-dimensional gaming environment is able to be computer generated. Other examples of computer-generated virtual 3D gaming environments are provided in U.S. Pat. No. 8,384,710, titled "Displaying and Using 3D graphics On Multiple Displays Provided for Gaming Environments," issued to Schlottmann, et. al., on Feb. 26, 2013; U.S. Pat. No. 10,846,937, titled "Three-Dimensional Virtual Environment," issued to Rogers et. al., on Nov. 24, 2020; and U.S. Pat. No. 11,471,775, titled "System and Method for Providing a Computer-Generated Environment," issued to Benzies, on Oct. 18, 2022.

Figure 4:
FIG. 4 is a window Illustrating an image of a typical 3D model capable of being rendered, such as by Unreal Engine 5.1, for example.

Likewise, a host of three-dimensional models are available or may be created that are able to be rendered on a computing device, such 204 of FIG. 2. Unreal Engine 5.1 is an example of software to computer generate a 3D model. Thus, for example, a 3D model for a museum walk through may be computer generated. A screen shot illustrating one embodiment, 400, is provided in FIG. 4. This three-dimensional model, for example, is available for purchase at Buy Professional 3D Models|CGTrader, www.cgtrader.com/3d-models. Of course, claimed subject matter is not intended to be limited to any particular 3D model.

However, continuing with this illustrative example, A museum walk through 3D model may, in an embodiment, include many three-dimensional (3D) virtual displays, as illustrated in embodiment 100 of FIG. 1. FIG. 1 is an illustration of a 3D model 100 capable of being computer generated with Unreal Engine 5.1, for example. FIG. 1 shows, for embodiment 100, an Unreal Engine window in which the 3D model is being at least partially rendered so that the 3D model may be edited. It is noted that windows provided in the figures depict example embodiments, as described below, and are generated from a full high definition window of 1920×1080 pixels. However, the windows providing example embodiments are sized down to fit within standard borders, such as those in the computer application, Word. Thus, it is noted, that some resolution (e.g., detail) may be lost as a result of this resizing.

Thus, in FIG. 1, the illustration of embodiment 100 includes an editor window 110, which represents execution of Unreal Engine 5.1 so that the 3D model that is to be rendered may be edited. For example, window 115 partially illustrates the 3D model being rendered, but in a manner so that within window 115, a user, for example, may be able to perform edits to the particular 3D model. Partially rendered window 115 includes, as shown, people 125, benches 130, sculptures 140, and/or other items to create an immersive, photorealistic museum-type three-dimensional (3D) gaming environment.

Likewise, 110 depicts many 3D virtual displays or virtual screens within the 3D model, such as 3D virtual display 120, which, after being rendered, becomes a part of the computer-generated 3D gaming environment. As shown, there are many 3D virtual displays illustrated in FIG. 1. These 3D virtual displays may be arranged in a chosen configuration within the 3D gaming environment in an embodiment, as illustrated.

In this example, the configuration attempts to simulate a real world environment, here, a museum-type walk through environment, with a virtual 3D gaming environment. Hence, many more 3D virtual displays may be included that are not depicted in FIG. 1. That is, due to the three-dimensional nature of the gaming environment created, for an embodiment, a user may be able to virtually navigate between and/or among the 3D virtual displays, including some not shown by FIG. 1. Therefore, in one embodiment, as described below in more detail, a user may be able to virtually navigate between and/or among many 3D virtual displays.

For one embodiment, virtual navigation might be accomplished with a mouse, for example, in which moving the mouse may result in virtual movement within the 3D gaming environment. Likewise, a mouse, again, merely as an example, may permit zooming in and/or zooming out, perhaps via scrolling, for example. Again, these are merely illustrative examples. However, there are a number of other modes of navigation that may be provided as well, as described in more detail below. As simply one example of another mode of navigation, a path of virtual navigation for a user may be created during the editing process, such as one intended to virtually and smoothly navigate the user between different 3D virtual displays in a particular order, for example. In this mode, for example, once or after a particular 3D display is reached via virtual navigation along a preset path, perhaps, via a mouse click, a keyboard key, or some other actuation of some other input device, virtual navigation may be paused in front of a particular 3D display, but virtual navigation to the next 3D virtual display of the preset path may be resumed as well via a similar type of actuation via an input device.

Figure 9:
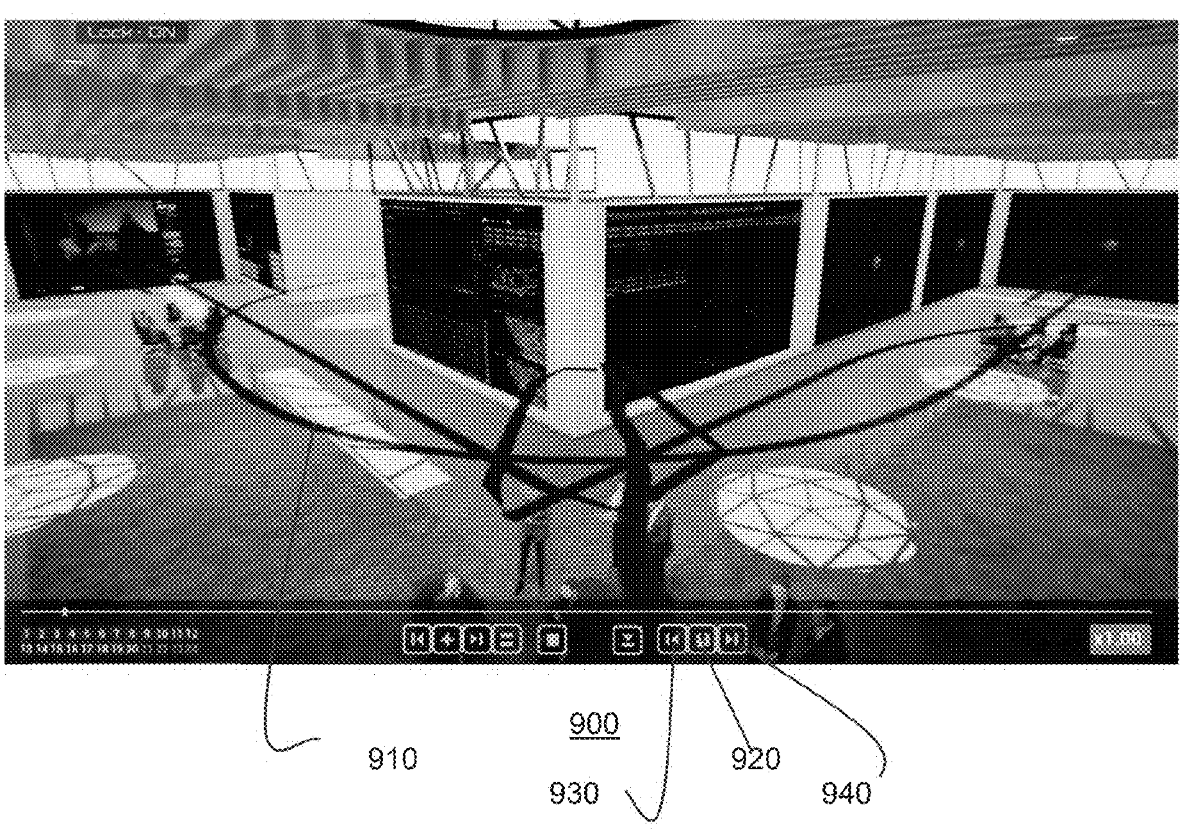

FIG. 9, for example, illustrates a window that includes a ribbon path 910, depicting a preset path, for an embodiment 900 of a computer-generated 3D gaming environment, as has been described. It is noted that during virtual navigation, the path 910 would not be shown to a user. Embodiment 900 likewise includes, as an example, controls shown along with the 3D virtual display itself, similar to the type of controls often seen in connection with a YouTube video player or the like. A ribbon path and controls for virtual navigation are also illustrated by FG. 14. In FIG. 9, for example, a pause button 920 is shown, as is a reverse button 930 to move to a prior 3D virtual display and a forward/resume button 940 to move to a next 3D virtual display. Other controls may also be present in this embodiment, described in more detail below, which may involve "jumps" and/or "teleports," for example, within the 3D gaming environment. In this manner, in an embodiment, an immersive, photorealistic, and virtually navigable, three-dimensional gaming environment is able to be computer-generated. As mentioned, the additional buttons may permit additional operations associated with the preset path, such as a "jump" or "teleport" to a prior or later 3D virtual display along the preset path, described in more detail below. It is noted, however, that, again, this is merely an illustration of an embodiment of claimed subject matter.

Continuing with embodiment 100, illustrated in FIG. 1, once or after the 3D model is edited and complete, it may be rendered by executing Unreal Engine 5.1, for example. Once or after being rendered, a user, sometimes described as a first person in a game, as suggested above, in a "play" virtual navigation mode, would be able to virtually navigate within the 3D gaming environment to move among and/or between different virtual 3D displays. Again, in one particular virtual navigation mode, for example, this may be done via a mouse and/or similar input device.

Thus, in accordance with claimed subject matter, a three-dimensional gaming environment may be computer-generated, such as on a 3D gaming simulation device. Furthermore, a number of three-dimensional virtual displays, such as from three up to hundreds, to pick an arbitrary example, without intending to limit claimed subject matter, may be computer-generated to be arranged in a configuration within the 3D gaming environment so as to be able to virtually 3D navigate in a manner between and/or among the 3D virtual displays computer-generated (and/or to be computer-generated) by the 3D gaming simulation device.

For the purposes of this patent application, a "3D gaming simulation device" refers to any device or set of devices able to render and, therefore, display a three-dimensional gaming environment. Thus, typically, a computing device and/or computing system, with a suitable manner of displaying visual content in three-dimensions, comprises an example of a 3D gaming simulation device. However, it may include many other devices, as well, including, as examples, but without limitation, tablets, smart phones, laptops, high resolution 2D computer displays, mobile smartphones, HDTV, video projectors, current and/or next generation 3D simulation devices reality or any combinations of the foregoing. For example, in many instances, a display device, such as a high resolution 2D computer display may be able to connect or couple to a computing device, for example, such as via a wired or wireless connection, to result in a "3D gaming simulation device."

Furthermore, in an embodiment, the 3D virtual displays may be populated with web browser derived real-time content. In general, "web browser derived real-time content" refers to content that is derived or produced by real-time execution of a web-browser. As examples, this may include content computer-generated within and/or derived from a web browser being executed in real-time, such as computer-generated content, as examples, but without limitation, in the form of at least one of web pages, images, video, slides, electronic documents, electronic spreadsheets, graphical displays or any combinations thereof. Claimed subject matter, such as "web browser derived real-time content" is not restricted in scope to any particular type of computer-generated content and/or to any particular web browser. A variety of web browsers exist and may be sufficient; however, one example, without limitation, is a Google Chrome web browser. Another example, without limitation, is an Oculus web browser.

Continuing with discussion of the present embodiment, 3D virtual displays are able to be populated from a web browser via execution by Unreal Engine of a "blueprint script." The blueprint visual scripting system, for example, in Unreal Engine is a complete gameplay scripting system based on the concept of using a node-based interface to create gameplay elements from within the Unreal Editor. See, for example, "Introduction to Blueprints," docs.unrealengine.com/4.27/en-US/ProgrammingAndScripting/Blueprints/GettingStarted/#:~:text=The%20Blueprint%20Visual%20Scripting%20system,or%20objects%20in%20the%20engine. The blueprint visual scripts translate to executable C++ code. This system is, in some ways, perhaps, similar to Javascript and/or HTML5. Thus, as with these former scripting languages, one is able to write code to be executed that may be employed to generate a web browser. See, for example, blogs.windows.com/msedgedev/2015/08/27/creating-your-own-browser-with-html-and-javascript/. Likewise, Unreal Engine, executes the blueprints written for the blueprint visual scripting system, which executes the associated C++ code to generate a web browser, in this example. See WebBrowser| Unreal Engine Documentation, docs.unrealengine.com/5.0/en-US/API/Runtime/WebBrowser/. See also Customizing the Player Web Page Unreal Engine4.27Documentation,docs.unrealengine.com/4.27/enUS/SharingAndReleasing/PixelStreaming/Custom-Player/. However, again, as mentioned, claimed subject matter is not limited in scope to employing Unreal Engine. Rather, it is provided as an illustrative example.

Therefore, as suggested, the 3D virtual displays may be populated with web browser derived real-time content. Again, this may include, as examples, content computer-generated within and/or derived from the execution of a web browser, such as computer-generated content, as examples, but without limitation, in the form of at least one of: web pages, images, video, slides, electronic documents, electronic spreadsheets, graphical displays, or any combinations thereof.

Figure 5:
FIGS. 5-11 are windows illustrating embodiments of a computer-generated three-dimensional (3D) gaming environment that includes one or more 3D virtual displays to provide real-time visualizations of web browser derived content in accordance with claimed subject matter.
Figure 6:
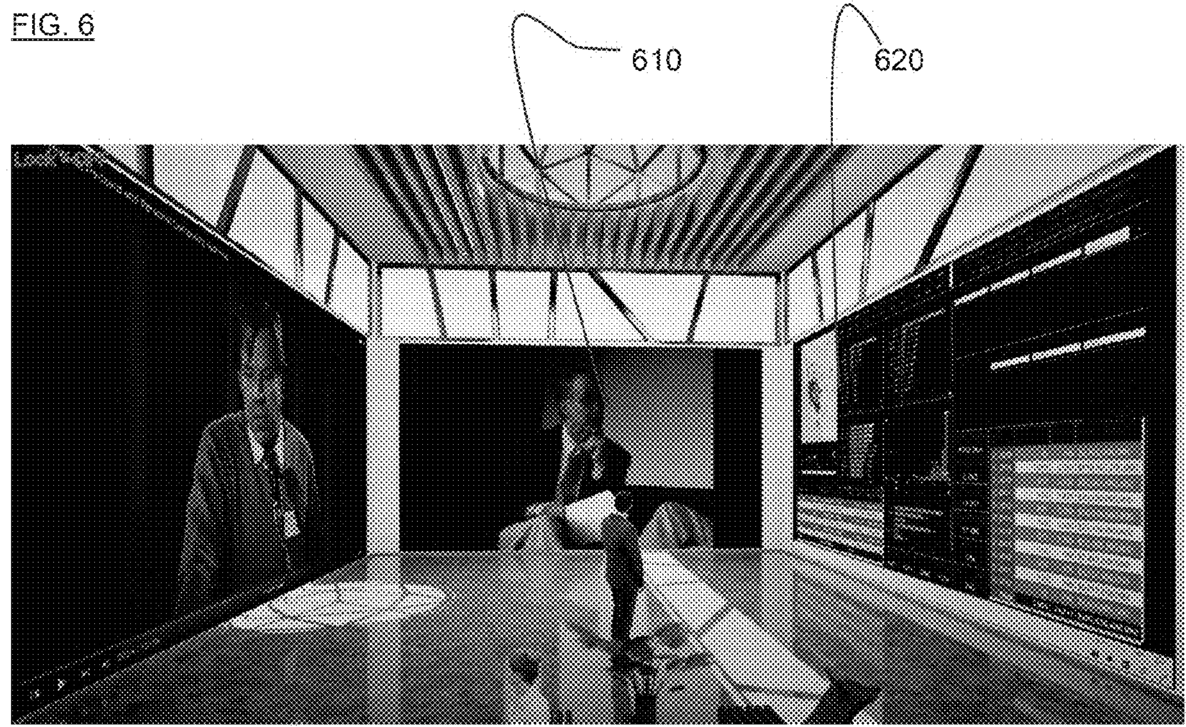
Figure 7:
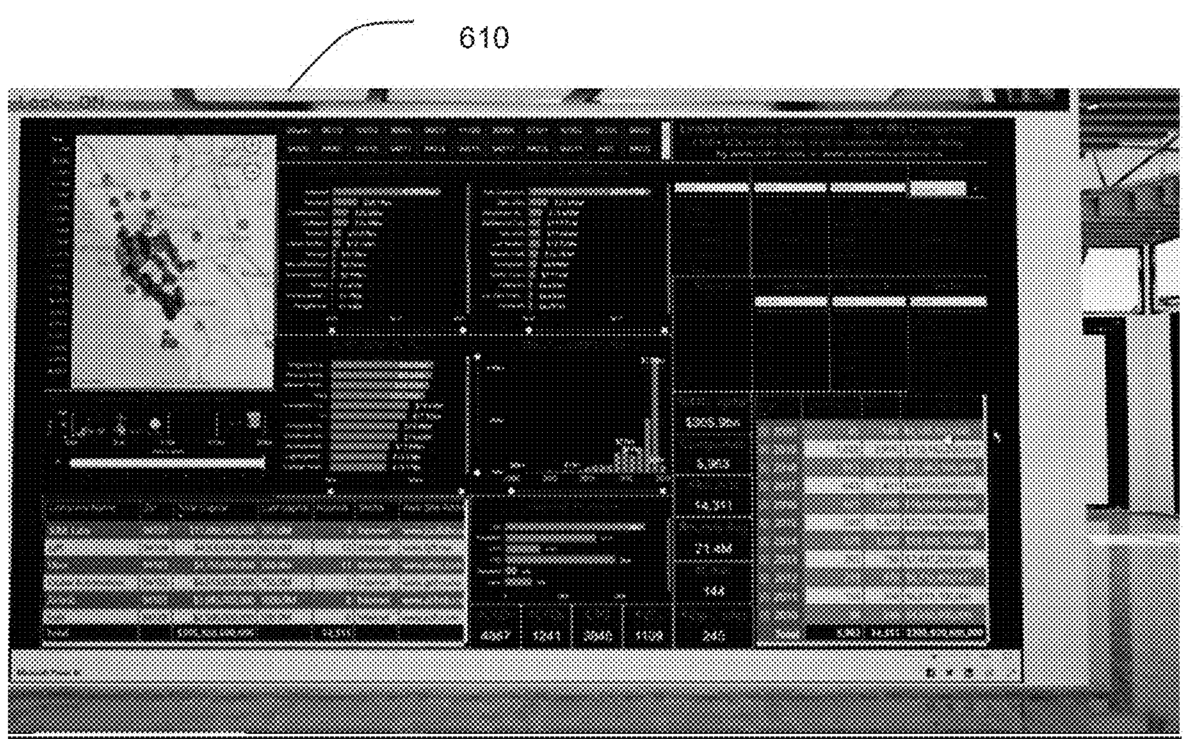
Figure 8:
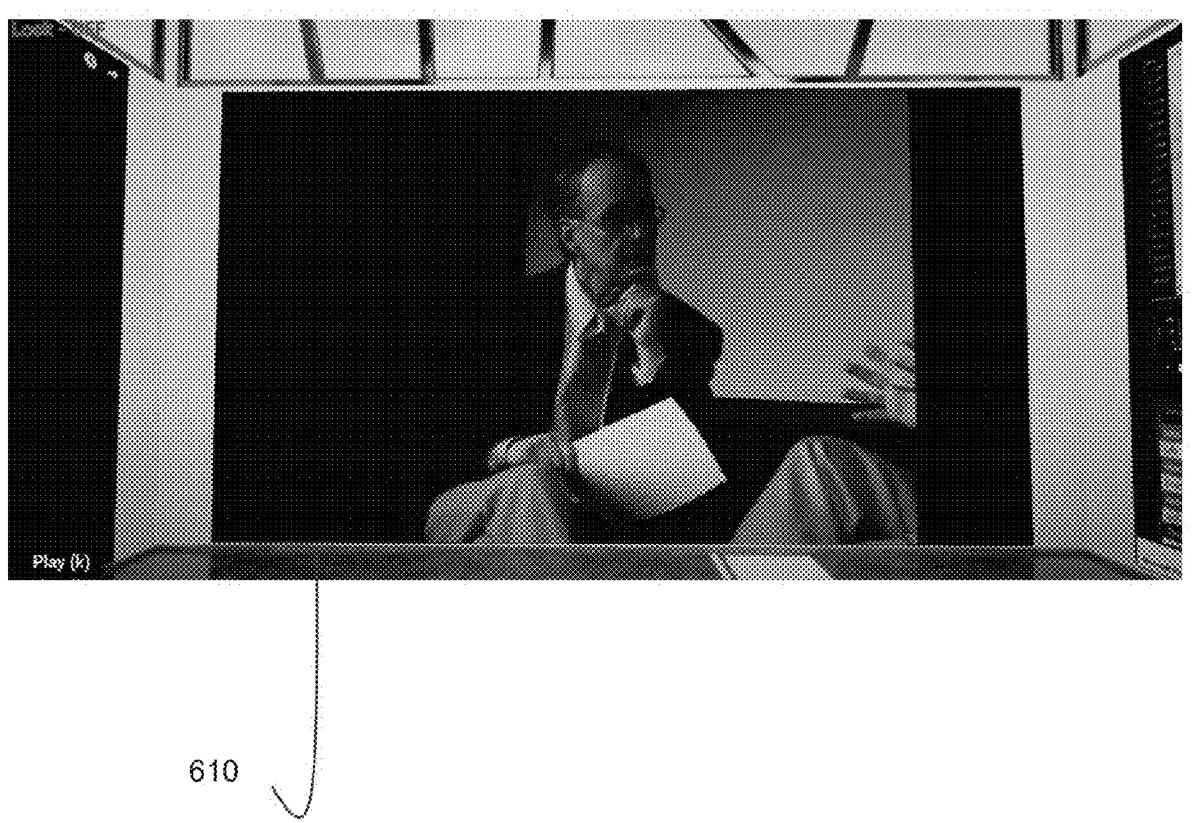

Referring to FIGS. 5 and 6, for example, these figures illustrate windows of an embodiment of a virtual 3D gaming environment, like the embodiment illustrated in FIG. 1. Thus, embodiment 500 of FIG. 5 and embodiment 600 of FIG. 6 illustrate, for an embodiment, the ability to virtually navigate within the virtual 3D gaming environment between and/or among various 3D virtual displays, since the computer-generated views being shown are different between the two figures, but both relate to the museum-like 3D gaming environment, discussed above. Furthermore, in FIG. 6, for example, it is illustrated that 3D virtual displays 610 and 620 have been populated with web browser derived real-time content. For example, as shown in FIG. 7 more clearly, 3D virtual display 610 has been populated with a video able to be shown as it is played in real-time within the 3D gaming environment. Likewise, as shown in FIG. 8, 3D virtual display 620 has been populated with graphics that provide real-time content, in this example, about a set of companies of interest. Thus, virtual 3D display 620 in FIGS. 6 and 8, for example, has been populated with a real-time visualization of real-time signal information, for example.

That is, for an embodiment, a web browser may be executed and may receive real-time signal information. That signal information may then be processed (e.g., 'sliced and diced'), for example, by the executing web browser and in real-time the processed signal information may be displayed within the web browser, which may be shown via a 3D virtual display, such as 620, within a 3D gaming environment. In this case, again, the real-time signal information provides content about a set of companies of interest. However, in another embodiment, for example, a 3D virtual display may show other real-world manifestations capable of being measured and/or reported in real-time, such as, without limit, temperature, pressure, voltage, current, electromagnetic radiation, and so on.

Thus, for an embodiment, such as depicted in FIGS. 5-8, a three-dimensional gaming environment may be computer generated so that 3D virtual displays within that environment are populated with web browser derived real-time content. Furthermore, the 3D virtual displays may be configured within the 3D gaming environment and may be populated with selected web browser derived real-time content so as to form a template for the display of and/or interaction with selected web browser derived real time content, via, for example, at least one 3D gaming simulation device. In this context, the term template refers to at least a 3D virtual display in a 3D gaming environment and/or, perhaps, an arrangement of 3D virtual displays in a virtual configuration in a 3D gaming environment, that provides a layout or structure for the presentation of content, such as web browser derived real-time content. A template, such as for a 3D virtual display, for example, is analogous to a template slide in Power Point. However, in an embodiment, several 3D virtual display templates may be combined to also form a greater template. Likewise, in an embodiment, a greater template may include a particular 3D model that also includes the templated 3D virtual displays for populating web browser derived real-time content. For example, a template may be formed from a 3D model that has been further edited with layout and/or structure, for example, in one embodiment, in the form of specific modules for the respective 3D virtual displays, to provide a template that includes the overall layout and/or structure within a 3D gaming environment.

For example, for an embodiment, a web browser may be executed, such as on the same computing device, for example, such as computing device 204. In an embodiment, the web browser may be executing a computer program, such as an application. Again, simply as examples, the web browser may be executing software written in Java Script and HTML. As a result of executing the software, the web browser may computer generate the appropriate content and that content may then be rendered so that it is seen via a 3D virtual display, such as displays 610 and/or 620, within a 3D gaming environment, such as the museum-type 3D gaming environment, previously discussed and illustrated.

Of course, in another embodiment, the web browser may interact with another program executing elsewhere other than on the same computing device. For example, for another embodiment, a web browser may be executing, for example, such as on computing device 204, as before. However, that web browser may be operating as a client with respect to one or more servers executing a computer program elsewhere. Thus, rather than processing of signals and creating content within the web browser to then be rendered within a 3D gaming environment, instead, processing of signals and creation of content may occur on a remote server, such as computing device 206 or computing device 202 in FIG. 2, for example, in communication with computing device 204 via network 208. Content generated by a remote server, such as computing device 202, let's say, may then be transmitted to computing device 204, where it may then be rendered on a 3D virtual display within a 3D gaming environment being rendered on computing device 204.

Many third-party application programs operate this way. For example, one may create and then display PowerPoint slides using a web browser via the program PowerPoint, available from Microsoft Corp., in this manner. That is, the PowerPoint application may be executing on a remote server that is being accessed by a web browser operating on computing device 204, for example. Having created a PowerPoint slide deck in this manner, for example, a user may then display that deck within a 3D gaming environment on a 3D virtual display via transmissions from the remote server. In general, any functionality available via a web browser that results in text, images, video, audio, and/or other types of content to display within the web browser, as well, may be transmitted to a computing device, such as 204, to be computer generated on 3D virtual displays within a virtual 3D gaming environment, in this or in a similar manner. This includes a host of commonly used third-party computer program applications, including, without limitation: the Microsoft 365 Suite, including such computer program applications as Outlook, Word, PowerPoint, and Excel. Other Microsoft computer program applications include Visio, Power BI, OneNote, a Microsoft web-based virtual whiteboard computer program application, and a Microsoft Project Online computer program application, as a few examples. Such programs are available from Microsoft Corp., Redmond, WA. Other computer application programs that may generate web browser derived real-time content to display in a web browser, as examples, but without limitation, may include AutoCAD, available from Autodesk, Inc, San Rafael, CA; Kanban board computer programs and/or applications; CPM, PERT and/or Gantt chart computer programs and/or applications, as well as a variety of other web-based computer program applications, etc.

Typically, to accomplish results as just described will generally involve use of a high-end graphics computing platform of some type, such as previously described. For example, a computing device with a state-of-the-art GPU, such as the Nvidia RTX3070 GPU, available from Nvidia Corp., San Jose, CA, and a state-of-the-art CPU, such as the Intel Core i9 microprocessor, available from Intel Corp., San Jose, CA, may be employed. Alternatively, as suggested, this capability may be accomplished via a virtual machine (VM) available through a service, such as AWS or Microsoft Azure, as examples.

On the other hand, one benefit would be for a standard business laptop, such as one having an Intel Pentium, Intel Celeron, or Intel Core microprocessor with 8 GB of RAM, for example, to have the capability to generate similar results, such as those previously described, with a potentially smaller memory capability and/or a potentially lower processing power than a high-end graphics computing platform.

In an embodiment, to accomplish the foregoing, streaming, for example, may be employed, which may provide a benefit, such as permitting use of a standard business laptop, such as one having an Intel Pentium, Intel Celeron, or Intel Core microprocessor with 8 GB of RAM, for example, or, perhaps use of a similar computing device with similar capabilities. Furthermore, streaming may take place via a standard internet connection, such as one with a speed of about 3 to about 8 Mbps, as an example.

Many approaches to streaming are available and claimed subject matter is not limited to a particular approach. However, as illustrative examples, the white paper, "Streaming Unreal Content to Multiple Platforms," herein incorporated by reference in its entirety, discusses streaming via WebGL and/or HTML5. This white paper is available from Epic Games at chromeextension://efaidnbmnnnibpcajpcgiciefindmkaj/cdn2. unrealengine.com/Unreal+Engine %2FPixelStreamingWhitepaper %2FPixelStreamingWhitepaper-V1.9C-ec1985a0f32c53c6650b2d02c11a67c32fa4e176.pdf. WebGL is a cross-platform, royalty free open web standard for low level 3D graphics. HTML5, a version of HTML, discussed in more detail later, is a mark up language used in conjunction with creating web sites. Here, the terms "WebGL" and "HTML" are intended to refer to any prior versions and/or any versions to be developed later of WebGL and HTML. Either and/or both of these may be employed to stream content across a network, such as the Internet.

Likewise, Epic Games has a streaming approach it refers to as "pixel streaming." "Pixel streaming" is explained in the aforementioned white paper, titled, "Streaming Unreal Content to Multiple Platforms." If using Unreal Engine, such as Unreal Engine 5.1, then streaming may be implemented via pixel streaming, if desired. Thus, Unreal Engine 5.1, in addition to features previously discussed, also makes available the ability to pixel stream across a network. However, again, claimed subject matter is not limited in scope to Unreal Engine or to employing pixel streaming. Rather, these are provided as illustrative examples.

Continuing, however, there are certain underlying technologies that, in an embodiment, may work together to deliver desirable results, which may include real-time ray tracing, such as has been made possible by Nvidia Corp., see developer.nvidia.com/rtx/ray-tracing, and streaming technology, such as has been made possible by HTML5, WebGL and/or pixel streaming technology, provided as a few illustrative examples For example, real-time ray tracing makes possible the creation of an immersive, photorealistic 3D gaming environment "on the fly," so to speak. Thus, as a user navigates between and/or among 3D virtual displays, the visual presentation, though changing in real-time, may be successfully rendered. This also may permit the rendering, for example, of multiple 3D virtual displays at once or in succession, such via "jump" or "teleport" virtual navigation modes between and/or among 3D virtual displays, described in more detail below. Therefore, a user employing a mode of virtual navigation, in an embodiment, may more easily digest large amounts of real-time delivered signal information quickly. It is also noted that in another virtual navigation mode, virtual movement between 3D virtual displays, rather than appearing as a "jump" or "teleport," may also be rendered as smooth virtual movement within the 3D gaming environment from one 3D virtual display to another.

Furthermore, real-time ray tracing also permits real-time updating to be displayed, for example, through visualization. Illustrative examples of many types of visualizations are included in the D3 gallery at observablehq.com/@d3/gallery. With real-time visualizations, changes, especially significant changes, may be easier to recognize, than may occur with merely reporting of updates, for example, in text, in which changes, including significant ones, may be more likely to be overlooked. Virtual navigating with real-time ray tracing, is illustrated, for example, by FIGS. 5, 6, and 7, showing example embodiments in which a user has virtually navigated to and/or between views that include a variety of 3D virtual displays. For example, in such a manner, a user is able to ultimately settle on a particular 3D virtual display providing real-time signal information of interest, such as shown in FIG. 7.

However, in addition to this capability, these results are able to be delivered without a high-end graphics platform in the immediate physical vicinity of the user. Through use of streaming technology, for example, the results illustrated by the embodiments of FIGS. 5, 6, and 7 may be delivered via a standard internet connection, such as an internet connection with a speed of from about 3 to about 8 Mbps, delivering content to a standard business laptop or similar computing device with similar capabilities, such as one having an Intel Pentium, Intel Celeron or Intel Core microprocessor with 8 GB of RAM, as an example. In a sense, one may view the results produced by a service, such as available from AWS or Azure, as providing a virtual machine, for example, to, in effect, be a "broadcast" delivered over a network, such as the internet, via streaming, to be received by a conventional laptop (e.g., standard business laptop or desktop), or a similar computing device with similar capabilities.

Figure 23:
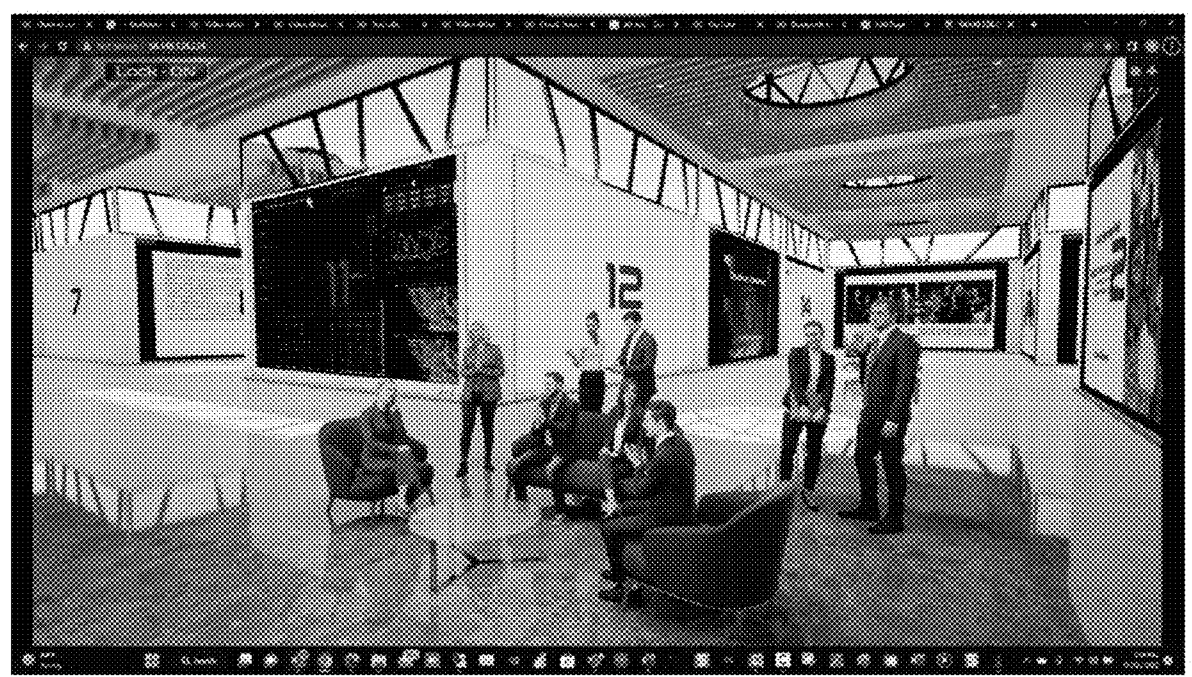

For purposes of comparison, FIGS. 5 and 6 illustrate embodiments 500 and 600, respectively, in which a three-dimensional gaming environment is generated without streaming and FIG. 23 illustrates an embodiment 2300 in which a three-dimensional gaming environment is generated with streaming. From visual inspection, the quality of the renderings is essentially equivalent.

In terms of a 3D gaming environment, a user may be viewed as a player, often termed a "first person." This refers to the user who would then be navigating between and/or among 3D virtual displays and also be interacting with the 3D virtual display(s) to affect the content shown or displayed, as illustrated and discussed with respect to FIG. 9 above, as one example. Consequently, within a 3D gaming environment, 3D virtual displays may be arranged in a particular configuration and selected 3D virtual displays may be populated with selected web browser derived real-time content so as to form a template for the display of and/or interaction with web browser derived real-time content. It is noted, for an embodiment using Unreal Engine, as an example, a "blueprint script" of the blueprint visual scripting system, for example, may be employed to form such templates, perhaps with a particular 3D model, depending on the particular template.

Likewise, in an embodiment, 3D virtual displays within the 3D gaming environment may be arranged in a configuration within the 3D gaming environment so that web browser derived real-time content may be selectable by the "first person" user for display within the template on selected 3D virtual display(s) within the computer-generated gaming environment. However, in addition to accomplishing this mode of user operation through physical operation of a high-end graphics platform, which, for example, might be computing device 204, as an alternative, via use of streaming technology, as was described, this may also be accomplished by a first person user at a standard business laptop using a standard internet connection, such as with a connection speed of about 3 to about 8 Mbps, as an example.

An embodiment, may, for example, via streaming, and/or through another transmission type mechanism, permit conversing (and/or perhaps even texting) between the first person user and one or more third person users, as an example. Likewise, "first person" user status may be transferred to a selected "third person" user so that the previous user with "first person" status becomes a "third person" user. Consequently, the selected "third person" user that acquired "first person" status may affect and/or interact with the content and/or the 3D virtual displays so that ultimately real-time collaboration between users may result. In one embodiment, simply by interacting with the content and/or the 3D virtual displays, "first person" status may be passed from the "first person" user to the "third person" user that attempted to interact with the content and/or 3D virtual displays. Thus, for example, in such an embodiment, "first person" status may be passed back by having the now "third person" user who had previously been the "first person" user then interact with the content and/or 3D display to regain "first person" status as a user. Likewise, in an embodiment in which there are multiple "third person" users, "first person" status may be passed among those users by the users respectively interacting with the content and/or the 3D virtual displays.

In such an embodiment, furthermore, as suggested, real-time collaboration may also be a capability. That is, via streaming, in an embodiment, one or more other remote users may be able to observe (and, in an embodiment, hear related audio) in real-time for one or more selected 3D virtual displays within the 3D gaming environment, including any interactions being executed by a remote first-person user. These one or more other remote users, again, may be referred to as "third person" users. Consequently, for an embodiment, within a chosen 3D model able to be rendered to computer generate a 3D gaming environment, a "first person" user may be able to at least partially control a wide variety of content to be presented, so to speak, in which selected content may appear on selected 3D virtual displays within a created template, for example, and in which that content may be back fed over a standard internet connection, such as, for example, from one or more cloud-based servers. The possibilities for content delivery, for example, as a result, become greater. For example, if an embodiment employs a virtual machine implementation, as suggested, such as may be implemented via AWS or Azure, for example, almost any content capable of presentation in a web browser, in an embodiment, may be auto-scaled for presentation via 3D virtual display. Likewise, the computer-generated 3D gaming environment presenting such content may be globally connected, such as via the Internet. Hence, a "first person" user in such an embodiment, may collaborate with one or more other "third" person users to affect and/or modify web browser derived real-time content appearing on one or more 3D virtual displays within a 3D gaming environment.

Figure 10:

Suppose a template, as one example, included only ten to twenty 3D virtual displays, since many more are possible. Conventionally, for a user to view such content this might have required a user to separately view 10 to 20 web pages or, perhaps, 10 to 20 thumbnails on a single screen. Instead, however, in an embodiment, a virtual user/viewer may be placed into a fully immersive, photorealistic, real-time ray traced 3D gaming environment. Similar to first person shooter games, instead of hunting and shooting bad buys and zombies, a virtual first person user may navigate and "hunt down" visually rendered signal information being processed in real-time and computer generated within a virtually navigable 3D gaming environment. An embodiment may provide up close and personal 3D virtual displays along with also having computer generated reusable templated views of clusters of 3D virtual displays, one example being illustrated by embodiment 1000 of FIG. 10, a corner shot of many 3D virtual displays. Furthermore, as described in more detail below, a user may interact with a 3D virtual display whether it appears to the user as shown in FIG. 7 or whether it appears to the user as shown in FIG. 10. That is, any 3D virtual displays that may have been rendered may be available for user interaction. It is additional noted that embodiment 1000 also includes 3D virtual display numbers appearing along with content on the 3D virtual displays to identify particular 3D virtual displays that have rendered computer generated content. This feature is discussed below in connection with FIG. 13.

Figure 11:
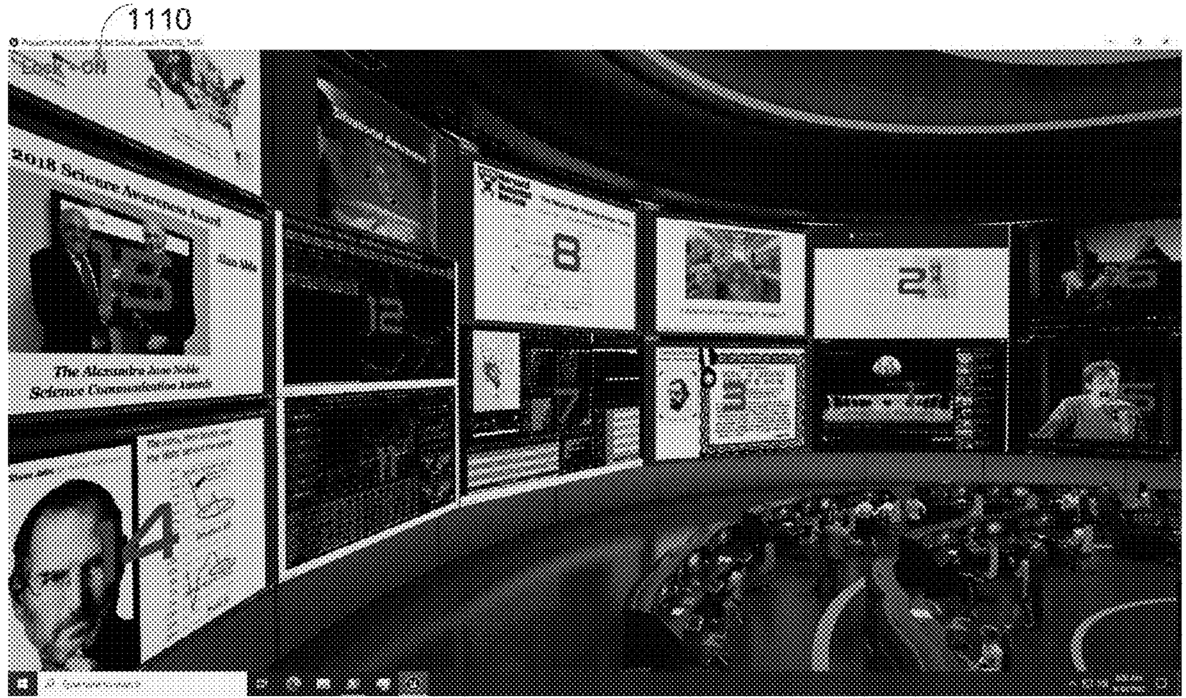
Figure 12:
FIG. 12 is a picture illustration of the Network Operations Center (NOC) for AT&T Corp.
Figure 24:
Figure 25:
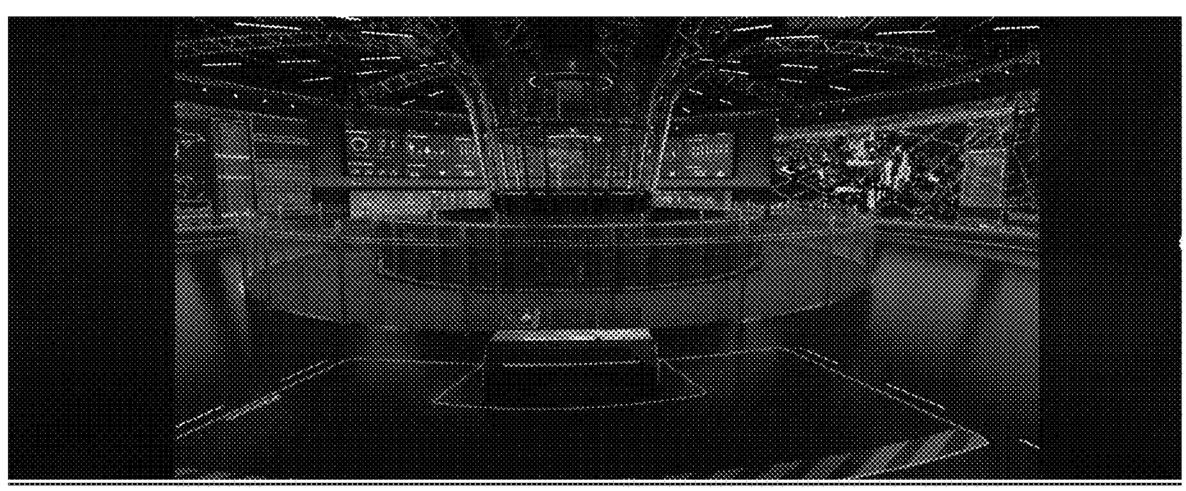

Another example might include ten to twenty, or even more, simultaneously observable 3D substantially rectangular virtual displays within the 3D gaming environment arranged in a "mission" control type (e.g., control room type) configuration within the 3D gaming environment, similar to the embodiment, 1100, shown in FIG. 11. This might, for example, be compared with illustration 1200 of FIG. 12, which shows the global network operations center (NOC) for AT&T Corp. A NOC of this magnitude must have cost literally a mountain of money to create and may have taken many months to years to design, build, test, make operational, maintain, upgrade, etc., unlike embodiment 1100 of a 3D gaming environment, as illustrated in FIG. 11. It is noted that another example embodiment showing a control room type configuration with a host of 3D virtual displays that render web browser derived real-time content is illustrated by FIG. 24. In an embodiment, these may be referred to as "dioramas," referring to computer generation of a host of 3D virtual displays in a gaming environment shown in a control room type configuration. Similarly, FIG. 25 illustrates a cyclorama, which, for an embodiment, may refer to computer generation of a host of 3D virtual displays in a gaming environment shown in a 360-degree configuration of 3D virtual displays, as illustrated in FIG. 25. Thus, as shown, a host of 3D virtual displays that computer generate web browser derived real-time content is illustrated.

Furthermore, in an embodiment, multiple "third person" users may also be able to nearly simultaneously observe, via a standard browser window, for example, an immersive, photorealistic viewable virtual 3D gaming environment with multiple 3D virtual displays. This virtual 3D gaming environment, in an embodiment, may be computer generated for display on a computer screen by a standard business laptop, desktop and/or tablet in an embodiment, rather than, for example, using expensive and powerful gaming specific hardware.

It is, of course, known and accepted that the human brain processes visual content (e.g., provided in the form of visualizations) faster than content provided, for example, as text. See, for example Friendly, Michael, "A Brief History of Data Visualization," appearing in the Handbook of Computational Statistics: Data Visualization, published by Springer-Verlap, 2006; Few, Stephan, Chapter 35 "Data Visualization for Human Perception, the Encyclopedia of Human-Computer Interaction, 2nd Edition, published by the Design Interaction Foundation, available at www.interaction-design.org/literature/book/the-encyclopedia-of-human-computer-interaction-2nd-ed; and Few, Stephan, "Tapping the Power of Visual Perception," dated September 4, 200, available at www.perceptualedge.com.

Stephan Few, for example, in his article "Tapping the Power of Visual Perception," quotes from Colin Ware's book, Information Visualization: Perception for Design, published by Academic Press, 2000:

> "Why should we be interested in visualization? Because the human visual system is a pattern seeker of enormous power and subtlety. The eye and the visual cortex of the brain form a massively parallel processor that provides the highest-bandwidth channel into human cognitive centers. At higher levels of processing, perception and cognition are closely interrelated, which is the reason why the words "understanding" and "seeing" are synonymous. However, the visual system has its own rules. We can easily see patterns presented in certain ways, but if they are presented in other ways, they become invisible. . . . If we can understand how perception works, our knowledge can be translated into rules for displaying information. Following perception-based rules, we can present our data in such a way that the important and informative patterns stand out. If we disobey the rules, our data will be incomprehensible or misleading."

This power of visual perception may be at least one reason why a host of tools exist to assist in computer generating visualizations, such as those illustrated, for example, by a D3 gallery at observablehq.com/@d3/gallery. As only a few examples, these "tools" include well-known and well-used application programs, such as PowerPoint, Power BI, AutoCAD, and Visio. Power BI, for example, has been recognized as innovative by others expert in analytics and business intelligence platforms. See powerbi.microsoft.com/en-us/blog/tag/gartner/.

In addition to visualization, another aspect, in an embodiment, relates to visualizations of real-time signal information. Hence, the most up-to-date signal information, in an embodiment, may be presented via visualizations. As was stated above, "[t]he eye and the visual cortex of the brain form a massively parallel processor that provides the highest-bandwidth channel into human cognitive centers." However, likewise, in an embodiment, not just "one brain," but, via a gaming environment, "many brains" may, in effect, be employed to digest real-time visualizations of the most up-to-date signal information relevant to a particular endeavor, for example.

Thus, for an embodiment, multiple 3D visual displays may present multiple visualizations of real-time signal information. In this manner, a host of perspectives of real-time signal information related to a host of functions and/or operations may be visualized by multiple users in an embodiment. Thus, in effect, multiple human brains may each apply their experience and/or expertise with respect to these multiple visualizations in a manner to provide insights and/or guidance to decision makers in the context of a particular project, and produce real-time collaboration for a host of purposes, including to address problems and/or potential problems, as examples. For an embodiment, this may involve, to provide only a few examples, factory process flows, manufacturing process flows, business process flows, and so on as non-limiting examples Previously, a few approaches to virtual navigating within the gaming environment between and/or among 3D virtual displays were mentioned. However, claimed subject matter is not limited in scope to those examples. Other modes and/or ways to navigate are intended to be included within the scope of claimed subject matter. It is noted, as previously discussed, for an embodiment using Unreal Engine, as an example, using a "blueprint script" of the blueprint visual scripting system, for example, various navigation modes, such as these examples, may be implemented.

Figure 13:
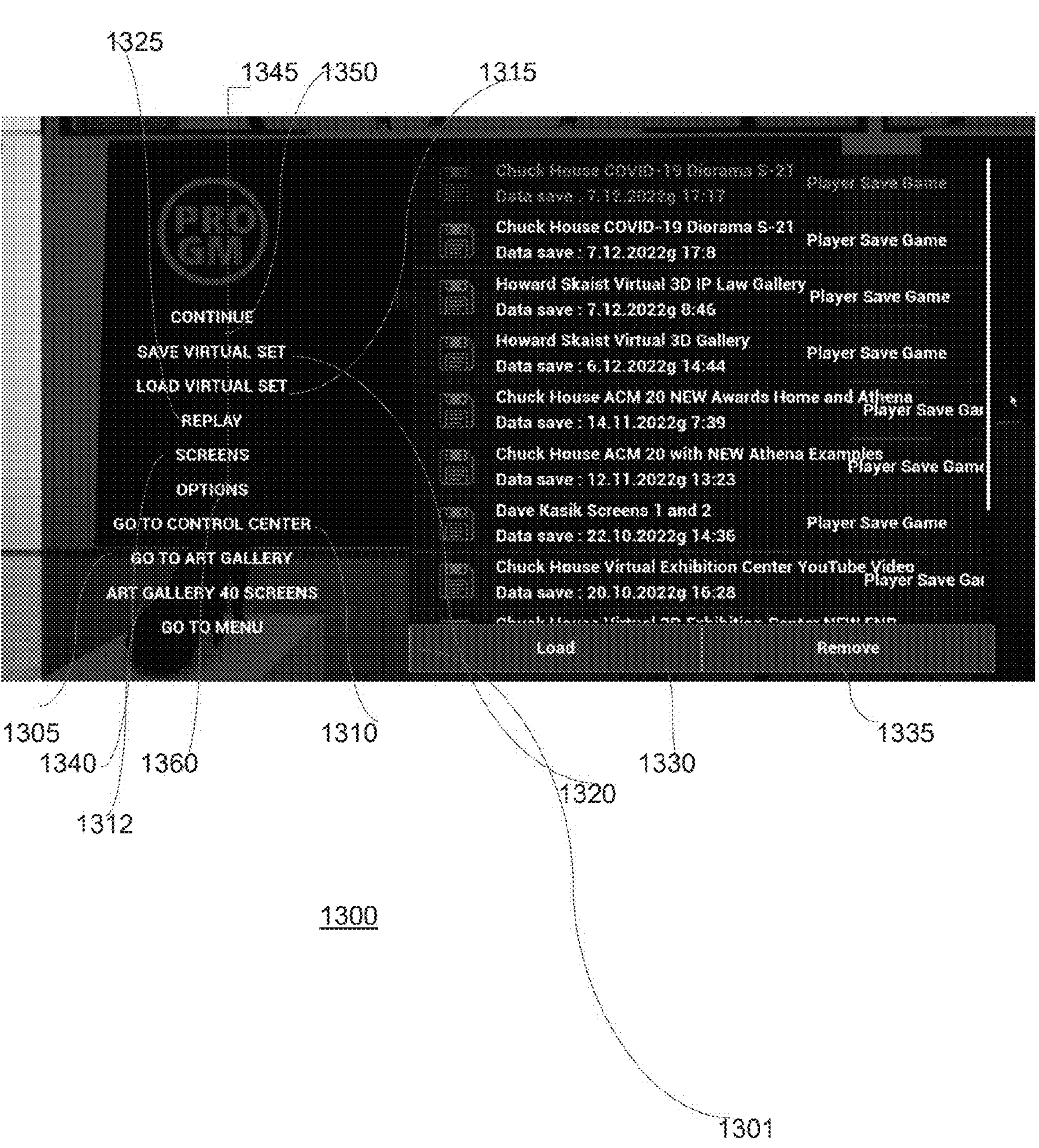
FIG. 13 is a window illustrating an embodiment of a selection menu for a computer-generated three-dimensional (3D) gaming environment that includes one or more 3D virtual displays to provide real-time visualizations of web browser derived content in accordance with claimed subject matter.

In an embodiment, at a more basic level, a menu of options may be shown, as illustrated by embodiment 1300 of FIG. 13. For example, a particular key stroke on a keyboard may signal to "bring up" (e.g., display) such a menu. As illustrated, a variety of choices may exist, although claimed subject matter is not limited to using a menu and/or to the choices available in this example illustration.

To make a gaming environment "active," so that it may be "played," in an embodiment, for example, one might select 1315, "load virtual set," which may refer to a particular 3D gaming environment in which selected content is included and arranged to appear on selected 3D virtual displays within the particular gaming environment. Thus, a "virtual set" refers to the 3D model, the templates and the content, which may all be loaded by "load virtual set," for example. In an embodiment, the arrangement of particular content assigned to appear on particular 3D virtual displays within the gaming environment may, in effect, be "pre-programable," as discussed in more detail below. Thus, if a new particular arrangement of 3D virtual displays in a 3D model that also includes templates with particular real-time content to be shown on particular 3D displays has been, in effect, "programmed," that virtual set might also, in an embodiment, be saved via selecting 1320, "save virtual set."

However, continuing, after "load virtual set" is selected, an embodiment may be computer generated, such as, for example, where Unreal Engine may render a 3D gaming environment. As suggested, FIGS. 5 and 6, for example, illustrate rendering without streaming and FIG. 23 illustrates rendering with streaming. Thus, as suggested, a 3D gaming environment, in an embodiment, may open with a corner view in which multiple 3D virtual displays are visible, shown by embodiment 1000, as an example. Thus, selecting "load virtual set" might produce "play" mode, in an embodiment, in contrast with "replay" mode, discussed in more detail below.

In a "play" type mode, for example, as was previously suggested, virtual navigation might be accomplished with a mouse, in which moving the mouse results in virtual movement within the 3D gaming environment. Likewise, a mouse, again, merely as an example, may permit zooming in and zooming out, perhaps via scrolling, for example. Similarly, in "play" virtual navigation mode, selected keys may assist in virtual navigation, such as for "left," "right," "up," and/or "down." These may move a preset amount within the gaming environment in the directions indicated, resulting in re-rendering what may be displayed, for example. Again, there are merely illustrative examples.

Perhaps, continuing, via at least one of: mouse clicks, keyboard touch events, screen touch events, remote control actuation events, speaking events, or any combinations thereof, other ways of virtual navigation within the gaming environment may be realized. For example, perhaps a key stroke might "pull up" a navigation user interface (UI), as illustrated by embodiment 1600 of FIG. 16.

Figure 16:
FIG. 16 is a window illustrating an embodiment of a virtual navigation user interface for a computer-generated three-dimensional (3D) gaming environment that includes one or more 3D virtual displays to provide real-time visualizations of web browser derived content in accordance with claimed subject matter.

Embodiment 1600 of FIG. 16 illustrates another example of a mode of virtual navigation for a 3D gaming environment. FIG. 16, for example, illustrates a user interface (UI) for virtual navigation. On the left side of the 3D virtual display, choices S-1, S-2, . . . . S-20, denoted 1610, are depicted. For an embodiment, via at least one of: mouse clicks, keyboard touch events, screen touch events, remote control actuation events, speaking events, or any combinations thereof, a choice may be selected. In this example, out of 20 3D virtual displays, selecting S-1, for example, in one virtual navigation mode, may computer generate on the user's screen smooth virtual movement within the 3D gaming environment, as if the user had virtually navigated to be in front of the 3D virtual display designated as "1." This may be referred to as a "teleport." Consequently, this virtual navigation mode, in an embodiment, may be referred to as "teleport" virtual navigation mode, and may be available, in an embodiment, if the 3D virtual display shows "teleport on." With "teleport off," for example, as shown in FIG. 16, virtual navigation to the 3D virtual display designated as "1" may be accomplished more as a type of "jump," in which the 3D virtual display may be rendered as if the user is immediately in front of that 3D virtual display. This, in an embodiment, may be referred to as "jump" virtual navigation mode. The other choices shown on the left-hand side may produce similar results for other 3D virtual displays. These choices may be referred to as specific "virtual display" jump or teleport choices, referred to with a "S" for an embodiment. The right hand side shows choices T-1, T-2, . . . , T-20, denoted 1620 in FIG. 16. These choices represent "pre-programed" locations or views within the 3D gaming environment. For example, selecting T-1, with "teleport off," as shown, may render a type of "jump," again, which may, in an embodiment, be referred to as "jump" virtual navigation mode, to a scene within the 3D gaming environment in front of a cluster of three specifically chosen 3D virtual displays in which the rendered real-time content of those 3D virtual displays is desired to be viewed by the user at the same time. Again, smooth movement to the particular scene, in an embodiment, may be referred to as a "teleport" and/or the virtual navigation mode may be referred to as "teleport" virtual navigation mode, and may result with "teleport on." The other choices, designed with a "T" represent other "pre-programmed" chosen locations or views within the gaming environment. To distinguish from specific "virtual display" jump or teleport choices, as discussed previously, in an embodiment, these choices may be referred to as "specific view" jump or teleport choices. Of course, as previously described, for an embodiment, a user choice may be a smooth walk-through and/or fly-through from one 3D virtual display to another, such as described below with reference to FIG. 9 and path 920. The advantage of this navigation mode is that users can easily see other virtual displays and their numbers to visit later, in an embodiment, again, shown, for example, by FIG. 10. Furthermore, the selections across the top of the 3D virtual display, shown in FIG. 16, such as "spline off" or "move to speed×1.0," illustrate that virtual motion within the gaming environment might, in an embodiment, for example, have an adjustable speed and/or move along a path between 3D virtual displays taking a variety of shapes, such as nearly linear, spline-like, etc.

Figure 14:
FIG. 14. is a window illustrating an embodiment of a computer-generated three-dimensional (3D) gaming environment that includes one or more 3D virtual displays to provide real-time visualizations of web browser derived content in accordance with claimed subject matter.

For an embodiment, virtual navigation between and/or among several or many 3D virtual displays is one perspective of navigation within a virtual world, here, a 3D gaming environment. However, typically once or after a user is positioned to a desired place within the gaming environment, often in front of a 3D virtual display, another type of virtual navigation may be understood as being available, a sort of virtual navigation with respect to the web browser derived real-time content of the 3D virtual display, also referred to as "user interaction", in this context. One possible example is illustrated as FIG. 9, as was discussed and/or FIG. 14. It is desirable for these just referenced two types of "virtual navigation" be performed separately and independently by a user, as described immediately below.

Figure 17:
FIGS. 17-25 are windows illustrating embodiments of a computer-generated three-dimensional (3D) gaming environment that includes one or more 3D virtual displays to provide real-time visualizations of web browser derived content in accordance with claimed subject matter.

In embodiments, as shown in FIGS. 9, 10 and 11, as examples, is a selection "lock-on," in the upper left hand corner, denoted by 1110 in FIG. 11. In an embodiment, for example, a lock may be toggled on and off for selection, via at least one of: mouse clicks, keyboard touch events, screen touch events, remote control actuation events, speaking events, or any combinations thereof, by a user, such as by selecting 1630. With "lock on" selected for virtual navigation mode, interaction with the particular 3D virtual display and its content may become enabled; whereas movement between 3D virtual displays may not be enabled. With "lock off" selected for virtual navigation mode, however, virtual navigation movement between and/or among 3D virtual displays may become enabled; whereas interaction with the content of the 3D virtual displays may not be enabled. For example, FIG. 17 shows "lock off" virtual navigation, in which movement "closer towards" a particular 3D virtual display is illustrated. For example, FIGS. 5 and 6, on the other hand, show "lock on" in the upper left hand corner, so that user interaction with the 3D virtual display and/or the content being displayed is enabled.

Thus, "lock off" virtual navigation may be a mode in which navigation between and//or among 3D virtual displays is able to take place, much as previously described. For "lock on" virtual navigation mode, interacting with the content of a 3D virtual display may be thought of as similar to interacting with a web page. For example, as shown in FIG. 9, a user may select 910, 920, or 930. Likewise, referring to FIGS. 18-22, mouse clicks or similar user actions with respect to the content (e.g., at various places on the 3D virtual display), as the content is being rendered in real-time, may result in rendering of different, but related, content on the particular 3D virtual display, such as, for example, a "multi-dimensional slice and dice" of the content being shown. This may include, as merely examples, rendering the content of a database providing the basis for visualization, rendering of a visual depiction of processing providing the basis for the visualization, rendering of another visualization of the content from a different perspective, rendering of other related content, etc.

Figure 18:
Figure 19:
Figure 20:
Figure 21:
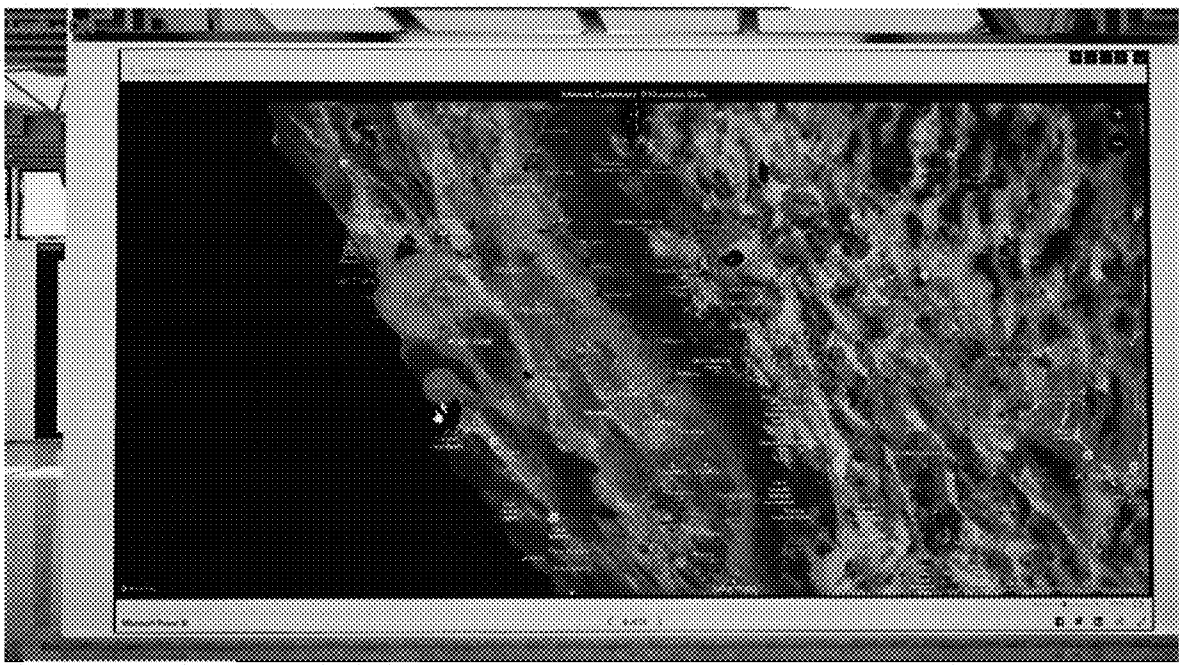
Figure 22:
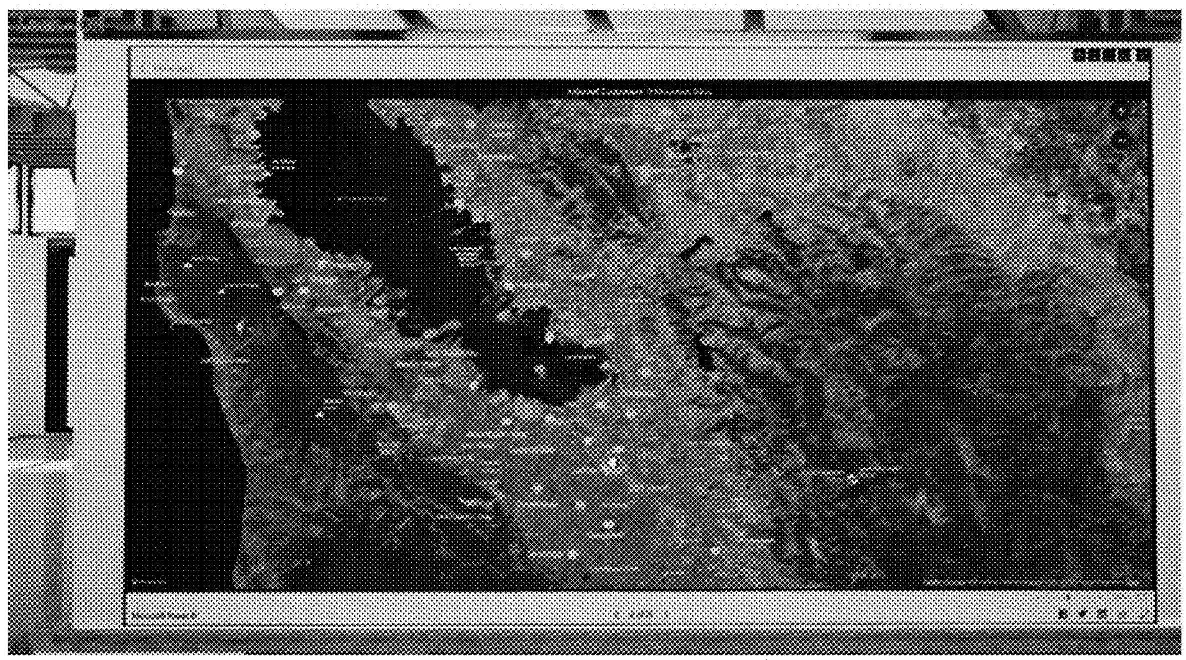

As one illustration, consider, for example, FIG. 18. Embodiment 1800 of FIG. 18 shows graphical lines rendered for multiple products of a bicycle company. In FIG. 19, however, through mouse clicks, in this example, with respect to the 3D virtual display, one line of those shown in FIG. 18 is now displayed, so as to drill down further on sales of the product associated with that line. Furthermore, with further mouse clicks, for example, again, with respect to the 3D virtual display, via additional content being rendered via interacting with the content of the 3D virtual display, and shown in succession by FIGS. 19-22, a user is able to drill down further on sales locations and determine, for example, sales opportunities for this particular product. FIG. 22, for example, shows that the bicycle company has little sales presence in San Jose, CA a highly populated area of California, suggesting an opportunity to increase product sales in that region. It is further noted, here, but not shown, that to the extent different 3D virtual displays are related or associated in terms of real-time content being rendered, a change made by a user with respect to the content for one 3D virtual display may potentially have a "ripple effect" on the content shown on various other related or associated 3D virtual displays, similar to the manner in which changing the value in a cell of an excel spreadsheet may ripple changes to other cells across that spreadsheet. Such a capability, of course, may be quite powerful for inter-related real-time content, specifically web browser derived real-time content, populating a cluster of 3D virtual displays within a 3D gaming environment.

Returning to the example menu for embodiment 1300, it may include a mechanism to provide a museum-type gaming environment, which might be shown as a selection of "go to art gallery," denoted 1305, and a mechanism to provide a control center-type gaming environment, which might be shown as a selection of "go to control center," denoted 1310, assuming, for an embodiment, as an example, the particular gaming environments are active. With multiple gaming environments active, an ability to switch between multiple virtual sets and/or multiple 3D environments, as non-limiting examples, may be implemented.

In an embodiment, for example, a mouse click and/or similar user action, in the close vicinity of these selections on the screen, may provide a signal indicating a selection by the user. In an embodiment, selecting "go to art gallery," 1305, might take the user to a museum-type gaming environment with 20 3D virtual displays rendered in a suitable museum arrangement, if currently active, whereas selecting "art gallery 40 screens," 1312, might take a user to a museum-type gaming environment with 40 3D virtual displays shown in a museum type gaming environment, if currently active. Furthermore, if multiple gaming environments are active, in an embodiment, these selections may permit switching between active gaming environments. For example, a user may want to compare displaying the same or similar content, for example, in different templated 3D gaming environments.

Selecting another particular mode of operation, referred to, here, as "replay" virtual navigation mode, as illustrated in FIG. 13 by a rectangularly shaped overlay 1301 shown on top of rendered computer-generated content, may, for an embodiment, be entered via selecting 1325, "replay." In replay mode, a user may be able to virtually navigate along a preset virtual path within the gaming environment, as previously discussed. For example, at the beginning of "replay," a user may, in an embodiment, via the replay selection, be "transported" (via rendering, for example) to an opening view of the 3D gaming environment created for this purpose, such as a corner shot of multiple 3D virtual displays, illustrated, for example, as the computer-generated scene beneath the rectangular overlay in FIG. 13, or alternately, illustrated by embodiment 1000 of FIG. 10, provided as two suitable examples.

Thus, again, as simply one example of a mode of navigation, a path of virtual navigation for a user may have been created during the editing process, such as one intended to virtually take the user to different 3D virtual displays in a particular order, for example. A guided virtual museum tour may be one non-limiting example of such a mode of navigation. In replay mode, for example, once or after a particular 3D display is reached via virtual navigation along a preset path, perhaps, via a mouse click, a keyboard key, or some other actuation of some other input device by a user, virtual navigation might be paused in front of the particular 3D display, but virtual navigation to the next 3D virtual display of the preset path may be resumed as well via a similar type of actuation via an input device. Embodiment 900 of FIG. 9, for example, as previously discussed, illustrates one embodiment.

In general, stopping and resuming virtual navigation between different 3D virtual displays along the preset path is smooth, rather than as jumps, in this mode, unless a user employs a button, such as one of the buttons shown on the bottom of FIG. 9 as part of embodiment 900, to "jump" or "teleport" to another 3D virtual display. Furthermore, if paused, a user may then interact with the 3D virtual display, as discussed previously in the context of describing "lock on" and "lock off" modes. Likewise, in "replay" mode, the user might have the option to record as the preset path is traversed via virtual navigation by selecting "record" (not shown) at the beginning of "replay." If the user ultimately were to later decide not to retain what has been recorded, it might be discarded by then selecting "remove," (not shown). It is likewise noted that after loading a "virtual set," using "load," denoted 1330, in FIG. 13, the virtual set loaded may be removed via "remove," denoted 1335, which is different from the "remove" for "replay" mode, which is not shown in FIG. 13.

In addition to the "replay" option, for the menu, shown on the left of embodiment 1300, other options under "load virtual set" are shown. For example, a "screens" selection, 1340, is shown. This selection might show in the computer-generated gaming environment, the particular number of the particular 3D virtual displays that have been rendered, as illustrated by FIGS. 11 and 23, for example. This feature was also illustrated in the embodiment of FIG. 10, in which 3D virtual display numbers are shown, even while web browser derived real-time content is also displayed. As shown, the numbers appear, in this example, as an overlay on top of the web browser derived real-time content.

FIG. 13 also illustrates a selection "options," 1345, beneath "load virtual set." This may, in an embodiment, permit a user to, with respect to a virtual set loaded or, perhaps, with respect to a virtual set to be loaded, customize certain aspects of the loaded or to be loaded 3D gaming environment. For example, other virtual navigation options (not shown) might, perhaps, be selected. For example, perhaps alternate preset paths may have been created (not shown) and/or other virtual navigation modes may be an option, such as example navigation modes discussed below, as illustrations.

FIG. 13 also illustrates a "continue" selection, 1350, and a "go to menu" selection, 1360. In an embodiment, for example, selecting "continue," 1350, might return a user to the user's "place" within the gaming environment before the user had "pulled up" the menu illustrated by FIG. 13, such as by a particular key stroke, for example. "Go to menu" may, for example, in an embodiment, take a user to a main selection menu (not shown) or perhaps, to an expansion (not shown) of the menu that is illustrated by FIG. 13. For example, the menu of FIG. 13 might be expanded if additional 3D gaming environments are to be computer generated, for example, in which three-dimensional (3D) virtual displays may be arranged in a configuration within the 3D gaming environment so as to be able to virtually navigate between and/or among the 3D virtual displays and in which the 3D virtual displays are to be populated with web browser derived real-time content. However, perhaps, instead, in an embodiment, "go to menu," might "pull up" a more complex menu, as shown, for example, by embodiment 1500, illustrated in FIG. 15, and perhaps better described as a master controller user interface (UI) for the 3D virtual displays and the gaming environment, described in more detail below. Of course, the foregoing are just illustrative examples. Claimed subject matter is not intended to be limited to illustrative examples and/or embodiments.

Figure 15:
FIG. 15 is a window illustrating an embodiment of a master controller user interface for a computer-generated three-dimensional (3D) gaming environment that includes one or more 3D virtual displays to provide real-time visualizations of web browser derived content in accordance with claimed subject matter.

As previously suggested, embodiment 1500 of FIG. 15 may be thought of as a master controller user interface for the gaming environment, including the 3D virtual displays. A "first person" user, with respect to a particular computer-generated 3D virtual display, may, as examples, setup, turn on or off, refresh, provide a name to, via a drop-down window change displayed content for, and even generate new "content" for particular 3D virtual displays within a 3D gaming environment virtually at anytime and/or virtually from anywhere.

For example, across the top of embodiment 1500 are several choices that may permit a user to affect the 3D gaming environment. In general, these are, as a group, intended to be denoted by 1510, as shown. These choices include "ceiling," "people," "floor art," "wall," "time" and the succession of choices denoted with a B followed by a number, such as "B-1," etc., which are reserved for special purposes. In addition, other choices may affect how the gaming environment looks once or after rendering, such as "screen brightness" and/or "exposure." Likewise, there is a choice "back" which may return the user back to the active gaming environment or "go to menu" which may result in the menu previously described with respect to FIG. 16 appearing, for example.

The master controller user interface of embodiment 1500 also may permit control over content being "played" or to be "played" within a selected 3D virtual display. For example, as shown in previous figures, and even shown in this figure, 3D virtual display numbers may be provided with a 3D virtual display. Here, for example, in FIG. 15, a 3D virtual display number is seen beneath a rectangular overlay. For example, 3D virtual display 2 is readily apparent in FIG. 15. Hence, to illustrate this feature with respect to 3D virtual display 2, controls for 3D virtual display 2 are shown across a row, which appears as the second row below the set of choices discussed above and denoted as 1510 in FIG. 15.

For example, along the left-hand side of the master controller user interface, a designation "SCREEN 2 (S-2)," denoted as 1520 in FIG. 15, may be associated with 3D virtual display 2. Immediately along that row, to the right of "SCREEN 2 (S-2)," a blank area is present in that row. For example, if a user wanted to name the content to appearing on 3D virtual display 2, a name might be entered here. An embodiment might, for example, include a content and/or similar guide, which is often made available to users of various cable channel and/or broadcast network options. These guides often name the specific content along with providing additional information describing the content. Continuing further to the right along the same row, a type of "switch" able to be toggled is shown. It is designated 1530 and appears below "screen brightness" in FIG. 15 on the master controller user interface. This switch may be used to toggle 3D virtual display 2 to be on or to be off within the 3D gaming environment. Next to the switch, on the right, is an a "refresh" button for 3D virtual display 2, depicted as 1555 with a circular design shown on the button that is not a "closed" geometric shape. On the right of the refresh button is a type of URL, called a "tinyurl" in the figure, which may designate a location for the content that is intended to be "played" on 3D virtual display 2 within the gaming environment.

One should notice to the right of the "tinyurl" is a tab 1540 for a pulldown menu. In particular, in FIG. 15, tab 1540 is shown as selected and so a pulldown menu 1550 of URLs (e.g., tinyurls) is shown. Selecting tab 1540 may be used to "open" pulldown menu 1550 with respect to 3D virtual display 3, for example (rather than 3D virtual display 2, which has a tab for a pull down menu above tab 1540). Thus, to change the content to be "played" on 3D virtual display 3 within the gaming environment, a user may select a different tinyurl within pull down menu 1550. Content associated with the selected tinyurl may as a result be shown via 3D virtual display 3 within the 3D gaming environment, after being loaded, for example. Of course, the foregoing is simply one illustrative embodiment and claimed subject matter is not intended to be limited to illustrative embodiments.

As mentioned previously, FIG. 11 is an example of a control room or mission control type configuration of 3D virtual displays within a 3D gaming environment. It is also noted that another example embodiment showing a control room type configuration with a host of 3D virtual displays that render web browser derived real-time content is illustrated by FIG. 24. Again, these are two illustrative examples are not intended to limit the scope of claimed subject matter. Nonetheless, with this in mind, one may generally ask: Why do generals have war rooms, pilots have cockpits, NASA have mission control centers, ship's captains have command bridges, and factories have control rooms? To make the point more clearly, an advantage of a configuration like this is the capability, though this virtual presentation of web browser derived real-time content, to make more intelligent, more insightful, more visual, more collaborative and, potentially even, closed loop or semi-closed loop type decisions. Here, a virtual control room, in an embodiment, may be real-time, closed-loop (or semi-closed loop) with situational awareness (SA) for continued and/or continuous executive decision making virtually from anywhere, at anytime and on nearly any computing device. Here, situational awareness refers to the ability to understand and/or respond to a situation by perceiving, analyzing, and/or making informed decisions. It involves being aware of your surroundings, potential threats, and/or how to act to protect yourself. Here, we are applying situational awareness to business. Likewise, the term "semi-closed loop" is to refer to a situation in which human knowledge, intuition, judgement, understanding, etc., in essence, closes the loop, so to speak. However, in an embodiment, in effect, closed or semi-closed loop operation may also be implemented.

Although the term "situational awareness" (SA) itself has fairly recently been coined, the concept has roots in the history of military theory—it is recognizable in Sun Tzu's The Art of War, for example. The term can be traced to World War I, where it was recognized as a skill for crews in military aircraft. There is evidence that the term situational awareness was first employed at the Douglas Aircraft Company during human factors engineering research while developing vertical and horizontal situation displays and evaluating digital-control placement for the next generation of commercial aircraft. Research programs in flight-crew computer interaction and mental workload measurement built on the concept of situational awareness measurement from a series of experiments that measured contingency awareness during learning, and later extended to mental workload and fatigue.

Situational awareness appears in the technical literature as early as 1983, when describing the benefits of a prototype touch-screen navigation display. During the early 1980s, integrated "vertical-situation" and "horizontal-situation" displays were being developed for commercial aircraft to replace multiple electro-mechanical instruments. Integrated situation displays combined the information from several instruments enabling more efficient access to flight parameters, thereby improving situational awareness and reducing pilot workload.

Before being widely adopted by human factors scientists in the 1990s, the term is said to have been used by United States Air Force (USAF) fighter aircrew returning from war in Korea and Vietnam. They identified having good SA as a factor in air combat engagements. Survival in a dogfight was typically a matter of observing the opponent's current move and anticipating his next move a fraction of a second before he could observe and anticipate it himself.

One formal definition of SA refers to: perception of the elements in the environment, comprehension or understanding of the situation, and projection of future status. Situational awareness or situation awareness (SA), therefore, has been understood to refer to an understanding of an environment, its elements, and how it changes with respect to time or other factors. Situational awareness has been recognized as associated with successful decision-making across a broad range of situations, many of which involve the protection of human life and/or property, including law enforcement, aviation, air traffic control, ship navigation, health care, emergency response, military command and control operations, transmission system operators, self defense, and/or offshore oil and nuclear power plant management. See, for example, "situational awareness", Wikipedia, en.wikipedia.org/wiki/Situation_awareness.

However, in general, it does not seem to be the case that SA has been specifically applied to business decision-making at least not in any formal and rigorous way to the best of the knowledge of the inventors. In a business context, situational awareness refers to: understanding lessons of the past, perceiving issues of the present, and anticipating potential threats of the future. For an embodiment in accordance with claimed subject matter, these shall be discussed in more detail below.

A virtual control room and/or virtual situational awareness room and/or center for business may be thought of as a virtual executive information system (EIS) and/or executive virtual support system (ESS). A virtual executive information system (EIS), also known as a virtual executive support system (ESS), may be implemented as a type of management support system that facilitates and/or supports senior executive information and/or decision-making. It may provide easy access to internal and/or external performance content relevant to organizational goals. A virtual EIS may emphasize graphical displays and/or easy-to-use user interfaces. They may offer strong reporting and/or drill-down capabilities. In general, a virtual EIS may comprise enterprise-wide systems, meaning it may have access to enterprise wide performance content that may help top-level executives analyze, compare, and/or highlight trends in business related variables so that they may monitor performance and/or identify opportunities and/or problems. Likewise, for at least some embodiments, it may be collaborative, for example, in real-time.

It should be stated up front that one desirable goal of having a virtual collaborative situational awareness center for business, for example, in an embodiment, may include achieving a capability to make effective and/or efficient business decisions. The benefits of good decision-making should apply across the board whether the environment is a military operation, an emergency medical treatment, a fire or motor vehicle accident, and/or a business decision. A goal, for an embodiment, may be the right information, at the right time, to the right person (or persons), who has (or have) the knowledge and/or wisdom to make the right choice going forward.

Thus, using, for example, human knowledge, intuition, judgement, understanding, etc., in a group situation, for example, many users may virtually view displayed content via a 3D gaming environment in which content is shown on multiple 3D virtual displays, such as content for a variety of functional departments, such as for a business, including, for example, sales, accounting, finance, operations, marketing, purchasing, etc., resulting in real-time collaboration, such as via user interaction with selected ones of the multiple 3D virtual displays, to make decisions with respect to the business. The results produced by those decisions may then be observed in real-time and/or via predictive analytics, using various simulations etc., which may then produce more real-time collaboration and further decisions with respect to the business, etc., etc., thereby resulting in at least semi-closed loop implementation and/or operation.

Continuing with such an embodiment, decisionmakers may include, for a consumer environment, those having a virtual visit to a museum, virtually walking through an exposition, or virtually experiencing an institution's Hall of Fame, or, for a business environment, a CEO, executive staff (e.g., CFO, COO, CSO, CIO, etc.) a founder, partners, etc., as non-limiting examples. One may, therefore, envision, in group type work situations, for example, any combination of synchronous and/or asynchronous use of a mechanism to computer generate a 3D gaming environment including a configuration of 3D virtual displays in the manner previously described. In one example, in addition to the described 3D gaming environment, for an embodiment, one may also imagine a Zoom type or Microsoft Teams type environment for communication between the users, for example, in which the 3D virtual displays of the 3D gaming environment may show web browser derived real-time content that, ordinarily, would not be easy to visualize in the real world, for various functional departments across a company, especially in one navigable, virtual 3D gaming environment. This is not unlike the example illustrated by FIGS. 18-22, a real-time assessment of product sales, for example, to identify opportunities for further sales, including, in this example, multiple stakeholders involved in real-time collaboration.

Continuing with the business example above, a first person user, such as a CEO, and several third person users, may be, in effect, sharing a 3D gaming environment, as described, in which the 3D virtual displays may show web browser derived real-time content that, again, ordinarily, would not be easy to visualize in the real world and certainly not in real-time across a host of functional departments, especially not in one navigable, virtual 3D gaming environment. These users from, again, as merely examples, accounting, purchasing, sales, finance, marketing, and/or operations, may respectively have 3D virtual displays providing various visualizations of signal information that relate to their respective functional departments to be shown to the CEO, in this example. However, likewise, it may be desirable for collaboration to occur as the various departments are able to show, discuss and/or interact with the respective visualizations. As suggested previously, although there is a single "first person" user, this status may be passed back and forth between "third person" users, allowing group collaboration via a shared gaming environment. As suggested, an advantage of a configuration like this is the capability, though a virtual presentation of web browser derived real-time content, to make more intelligent, more insightful, more visual, more collaborative and, potentially even, closed loop or semi-closed loop type decisions. For example, in addition to visualizations providing relevant content regarding the state of various departments of the company, likewise, a host of predictive analytical approaches exist to extrapolate from the present state of various departments and/or the company overall to gain insight into where the company may be headed, such as its finances, it's revenue, it's operating costs, etc. For example, various simple and/or more complex approaches to predictive analytics, to business simulation, and/or to market simulation, etc., may be employed within a 3D gaming environment, as has been described.

In yet another situation, again, a CEO, a member of executive staff, a partner, a Board Member, etc., might be "stuck" on a long flight, such as from Asia to the United States. A busy individual in this situation may have planned ahead and may have the desire to stay current with the latest available company reports and analysis. He or she might have brought a stack of reports or may even have a wide range of content stored on a laptop, buried across a range of emails, word documents, power point slides, accounting statements, etc. However, instead, with a 3D gaming simulation device comprising a standard laptop that individual may be able to computer generate the type of gaming environment previously described, such as by using a template, as one example, in which the individual may navigate across a variety of 3D virtual displays and interact with selected 3D displays providing web browser derived real-time content about the company. For example, most commercial flights now provide a capability to connect to the internet. Thus, this individual may even collaborate, while in flight, with one or many other company personnel in a manner previously suggested, for example, in connection with a business. Of course, claimed subject matter is not limited in scope to illustrative embodiments, such as the foregoing illustrative embodiment.

Figure 26:
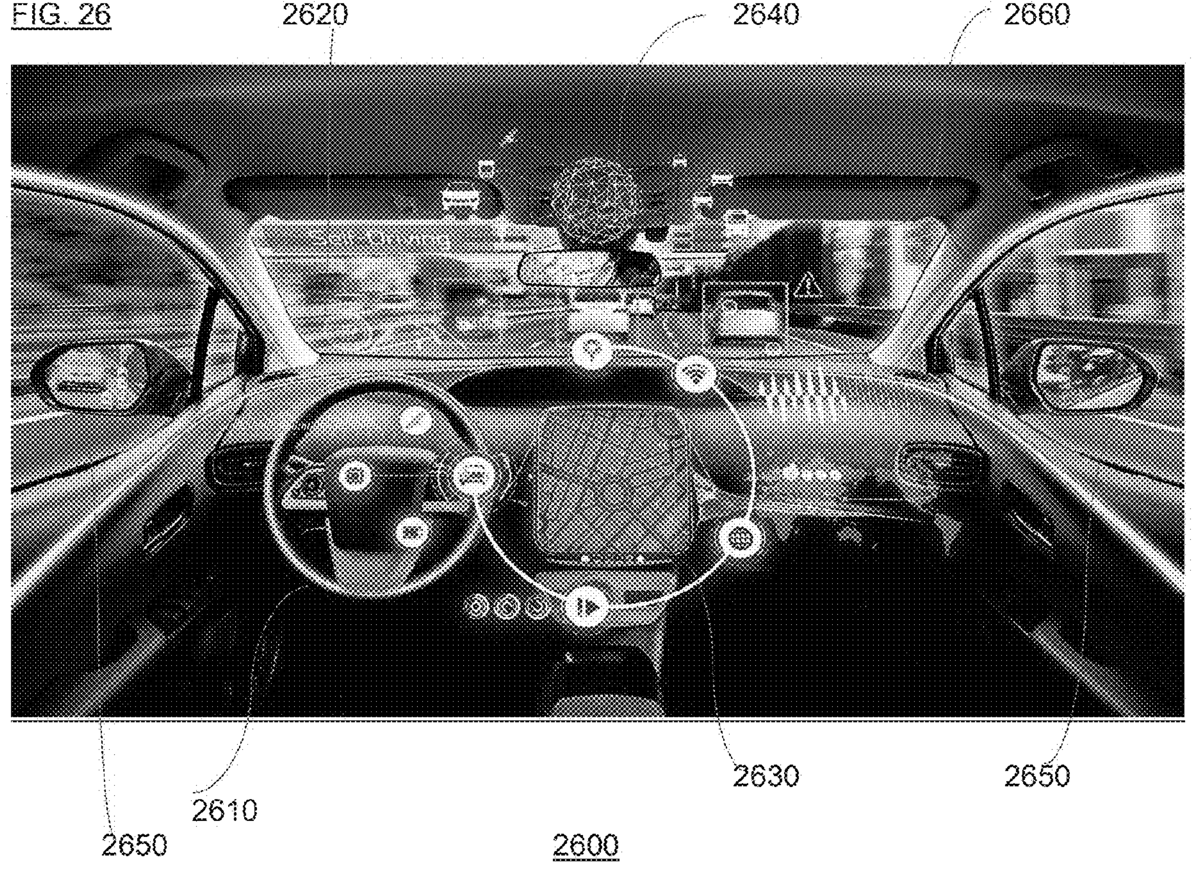
FIG. 26 is a schematic diagram of a closed loop process for driving a car, which may be implemented via an embodiment in accordance with claimed subject matter.

As still another example, FIG. 26 is a schematic diagram of a closed loop process for driving a car, which may be implemented via an embodiment 2600 in accordance with claimed subject matter. The figure shows the closed loop process as implemented in a self-driving car. However, this could just as easily be provided as an example of a closed loop process in which a human driver, in effect, closes the loop. For example, a typical car includes a steering wheel, denoted 2610 in FIG. 26, and an accelerator pedal, a brake and sometimes a gear shifter. These last three instruments for driving are not shown. However, these may all be operated by a human driver for use in directing the motion of a car. The car also includes real-time instrumentation, such as via a speedometer, a tachometer, etc. In an embodiment, a human driver may consume this "real-time content" via a heads up display, denoted 2620, as shown in FIG. 26. Likewise, a GPS system, shown by map 2630, is included. A human driver also has access to a rear-view mirror, denoted 2640, two side view mirrors, denoted 2650, and a windshield denoted 2660. Hence, although not in a business context, this may be considered another example of situational awareness.

Thus, analogously to a closed loop and/or semi-closed loop process in connection with a business, as previously discussed, an advantage of a configuration using a virtual presentation of web browser derived real-time content is that it provides an opportunity to make more intelligent, more insightful, more visual, more collaborative and, potentially, closed loop or semi-closed loop type decisions. The same might be said of this example closed loop and/or semi-closed loop process, illustrated in FIG. 26. For example, real-time content about where the car is and/or was may be provided, such as via a GPS system, various mirrors and/or various instrumentation, as described. Likewise, the windshield, not unlike predictive analytics and/or simulations, provides content describing where the car may be headed. Thus, a human driver and/or a computing device with appropriate software, may be able to make decisions, such as how to steer, how to engage the accelerator, brake and gear shift, etc., to make decisions about where to direct the car.

FIG. 26 is provided as an example to demonstrate the incredible capability of the human brain to consume, digest and/or process such content, while even engaging in other activities, such as listening to music, having a phone call, etc., as is commonly done while driving. As was stated above, "[t]he eye and the visual cortex of the brain form a massively parallel processor that provides the highest-bandwidth channel into human cognitive centers." Hence, these visual and mental processes may also be captured for other uses, some of which are previously described, including to direct a business, through computer generating a three-dimensional gaming environment. The computer generating may include computer generating at least six three-dimensional (3D) virtual displays up to a hundred or more arranged in a configuration within the 3D gaming environment and computer generating the 3D virtual displays within the 3D gaming environment so as to be able to virtually navigate within the 3D gaming environment in a manner between and/or among the 3D virtual displays, for example. Likewise, the 3D virtual displays may be populated with computer-generated web browser derived real-time content. In this manner, one or many human decision makers may digest and/or consume content about a business showing where it has been and/or where it is, for example, in real-time, as well as where it is headed, to decide whether to stay the course, "make turns," etc.

As has been suggested, an advantage of a configuration like embodiments in accordance with claimed subject matter previously described may be a capability, through a visual presentation of web browser derived real-time content in a 3D gaming environment, such as a collaborative virtual 3D situational awareness room and/or center for business, to make more intelligent, more insightful, more visual, more collaborative and/or, potentially even, closed loop or semi-closed loop type decisions. For example, real-time visualizations providing relevant content regarding the state of various departments of a company may be computer generated in an embodiment in accordance with claimed subject matter. Likewise, a host of various analytical approaches, termed analytics, may include a capability to provide a past and/or present state of a business including real-time visualizations and/or other real-time representations generated via one or more analytical approaches in an embodiment in accordance with claimed subject matter. Furthermore, as explained in more detail, cognitive analytics may be applied to the past and/or present state of the business in terms of at least one or more of the following: profits, sales, revenue, and/or operating costs.

Analytics in this context refers to the systematic computational analysis of signal data and/or applied statistics. It is noted here, as also indicated below, that signal data, signal information, content etc. may be used interchangeably without loss of meaning and/or understanding. Systematic computational analysis of signal data and/or applied statistics, E.g., analytics, may be used for the discovery, interpretation, and/or communication of meaningful patterns in signal data, which also may fall under and directly relate to the umbrella term, data science (e.g., signal data) Analytics may also entail identifying signal data patterns toward effective decision-making. It may be valuable in areas rich with recorded content; analytics may rely on the application of statistics, computer programming, and/or operations research to quantify performance. In the context of the present patent application, operations and/or processing involve physical manipulation of physical quantities, including so-called signal data, signal information, content, etc. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc. It has proven convenient at times, principally for reasons of common usage, to refer to such physical signals and/or physical states as bits, values, elements, attributes, parameters, symbols, characters, terms, numbers, numerals, measurements, content, data signals, signal information and/or the like. It should be understood, however, that all of these and/or similar terms are to be associated with appropriate physical quantities and are merely convenient labels.

Organizations may apply analytics to describe, predict, and/or improve business performance. Specifically, areas within analytics include descriptive analytics, diagnostic analytics, predictive analytics, prescriptive analytics, and cognitive analytics. See, e.g., The 4 Types of Data Analytics Guide_insightsoftware.pdf and Types of analytics explained—descriptive, predictive, prescriptive, and more.pdf. See also riverlogic.com/technology-platform/prescriptive-analytics/. Analytics may apply to a variety of fields including, as examples, marketing, management, finance, online systems, information security, and/or software services. Since analytics may involve extensive computation, the processes and/or software used for analytics may harness the most current methods in computer science, statistics, and/or mathematics. This also aligns closely with the concept of situational awareness, in which SA, for example, may refer to: perception of the elements in the environment, comprehension or understanding of the situation, and projection of future status. In a business context, however, another way to state situational awareness comprises: understanding lessons of the past, perceiving issues of the present, and anticipating potential threats of the future, which, again, in an embodiment in accordance with claimed subject matter shall be discussed in more detail below.

Various simple and/or more complex approaches to cognitive analytics, to business simulation, and/or to market simulation, etc., may be employed within a 3D gaming environment, as has been and/or shall be described in an embodiment in accordance with claimed subject matter. In general, cognitive analytics in this context includes artificial intelligence (AI) assisted and/or AI augmented analytical processing. In this context, AI refers to the theory and development of computer systems able to perform tasks that normally involve human intelligence, such as visual perception, speech recognition, decision-making, and/or translation between languages.

Analytics or analytical processing was previously described, but, in this context, refers to processing that includes signal processing. Cognitive analytics, therefore, refers to employing analytics, as described above, in the form of signal processing and refers to a technology, such as various forms AI, to assist in analyzing content, such as company performance in an embodiment in accordance with claimed subject matter. Cognitive analytics may process large amounts of structured and/or unstructured signal data from various sources, including audio, video, text, and/or images. Cognitive analytics may then identify complex patterns and/or extract insights that may be used for decision-making and/or business intelligence. Cognitive analytics may use a variety of technologies, however, in this context, cognitive analytics, again, includes AI assisted and/or AI augmented signal processing employed with respect to analytics and/or analytical signal processing, which may include, as a few illustrative examples: machine learning, neural networks including deep learning neural networks, Natural Language Processing (NLP) including large language models, as well as other types of AI unrelated to these foregoing processes and/or techniques.

Here, embodiments in accordance with claimed subject matter may provide 100% virtual 3D immersive and photorealistic environments, such as by using real-time ray traced rendering technologies, to provide an EIS and/or virtual collaborative 3D situational awareness room and/or center for business, as previously described, instantiated, for example, using the latest Epic Games "Unreal Engine 5 and Pixel Streaming technologies," used extensively by creative artists, game developers, advertisers, Hollywood movies, etc. Sample virtual 3D displays, for example, in an embodiment in accordance with claimed subject matter, may comprise 30 feet diagonal (10 meters) screens, providing, for example, readability and an ability to "compare" several such big displays, such as 3 or more large 3D virtual displays, side-by-side.

Furthermore, viewing and/or collaborating may be via a browser, such as, for example, a Chrome browser, as found on iPhones, iPads, Android smartphones/tablets (e.g., the latest Samsung Galaxy Fold 6), virtually all flavors of PCs including tablets/laptops/pen based "convertibles" and/or any Mac running a browser, again, in an embodiment in accordance with claimed subject matter. Hence, one may see some embodiments in accordance with claimed subject matter as a type of virtual command bridge, so to speak; here, referred to as a virtual 3D immersive and photorealistic environment for a virtual war room and/or a virtual collaborative 3D situational awareness center and/or room.

An ability to "see at a glance" a vast amount of "visual content"—including side-by-side comparisons of so-called "multidimensional content"—virtually anywhere, virtually at anytime and virtually on any computing device, in an embodiment in accordance with claimed subject matter, such as with multiple subject matter experts and/or business decision makers potentially involved, may create a perfect storm of "collaboration and/or decision-making". Previously, examples of "CEO and C-Suite usage scenarios" were described. These are presented as analogous to driving a car down a busy freeway while still having additional "human brain bandwidth" to listen to the radio and/or converse with other passengers and/or simply enjoy the "scenery" as discussed in connection with FIG. 26.

Common denominators of the above non-limiting examples of old style war rooms, old style situation (or situational awareness) rooms, command decks, bridges, or centers, etc. may include: (a) they are physically located somewhere; and (b) they take a very long time to plan-design-build-test-operate-maintain, etc. perhaps on the order of many months and even possibly many years. Then, like the NASA Houston Mission Control Center and the New Jersey based ATT Global NOC, etc., again, as non-limiting examples, (c) they use decision-makers, operators and/or viewers in a manner so that they are "physically close," typically on a daily basis. In essence, human brains, so to speak, may come to these physical centers to collaborate effectively, including in connection with business-related decision making. However, potentially worse than the physical requirements may be that these "decision-making centers" potentially cost millions, if not tens of millions of dollars, (d) just to implement and, perhaps, even more to maintain and upgrade.

Much of the prior discussion regarding real-time visualizations, for example, has related to past and/or present company performance, as an example. While useful and/or valuable, backward-looking hindsight analytics may relate more generally to what happened and why it happened, and, hence, may tend to provide a "rearview mirror" view, as illustrated in FIG. 26 and previously discussed. Cognitive analytics, for an embodiment in accordance with claimed subject matter, may include predictive analytics and/or prescriptive analytics, for example, in comparison to the former, and may tend to be more forward looking (although without a doubt, cognitive analytics may also be descriptive and/or diagnostic, the latter of which, again, may be more like a "rear mirror" view).

Nonetheless, forward looking analytics, including predictive analytics and/or prescriptive analytics, provided in a collaborative virtual 3D, fully immersive, photorealistic gaming embodiment in accordance with claimed subject matter, as suggested below, may provide even more value than hindsight backward looking analytics in a variety of situations. Hence, as an example, previously in this document, where predictive analytics and/or techniques were mentioned, such as in the foregoing paragraphs 97-100, in its place, one may imagine a variety of types of cognitive analytics, including descriptive, diagnostic, predictive, prescriptive, AI assisted and/or AI augmented analytics (assisted and augmented are used interchangeably without loss of generality), and/or any combinations thereof, which, therefore, may be visualized in a virtual 3D gaming environment using multiple virtual 3D displays in an embodiment in accordance with claimed subject matter.

This may be accomplished virtually in a 3D gaming environment, allowing collaboration in real-time of multiple individuals with respect to generated cognitive analytics, as previously mentioned, in an embodiment in accordance with claimed subject matter. Thus, real-time company performance content may be accumulated, in the form of stored signals and/or states, such as for company sales, profits, finances, operating costs and/or combinations thereof, to generate real-time visualizations for multiple virtual 3D displays in a virtual, navigable, collaborative 3D gaming environment, in one example embodiment.

As suggested, features of example embodiments in accordance with claimed subject matter previously described have included 100% virtual 3D, immersive and photorealistic environments, such as using real-time ray traced rendering technologies. Thus, these 3D gaming environments, as suggested, typically may include 3D large displays typically 30 feet diagonal (10 meters). Viewing, for example, may take place via a browser, such as a Chrome browser, as may be found on iPhones, iPads, Android smartphones/tablets (like, for example, the latest Samsung Galaxy Fold 6), virtually all flavors of PCs including tablets/laptops/pen based "convertibles" and any Mac running a browser, in an embodiment in accordance with claimed subject matter.

Now, in connection with embodiments of a 3D gaming environment in accordance with claimed subject matter, additional features are described, enabled and demonstrated, that may provide even greater capability to make use of such additional "human brain bandwidth." For such purposes, here, as a reference and alluded to above, we describe various types of cognitive analytics including descriptive, diagnostic predictive and prescriptive analytics in connection with, for example, a collaborative virtual 3D situational awareness room and/or center, which may include a collaborative virtual 3D EIS or ESS room and/or center, as described, in one embodiment in accordance with claimed subject matter.

Figure 27:
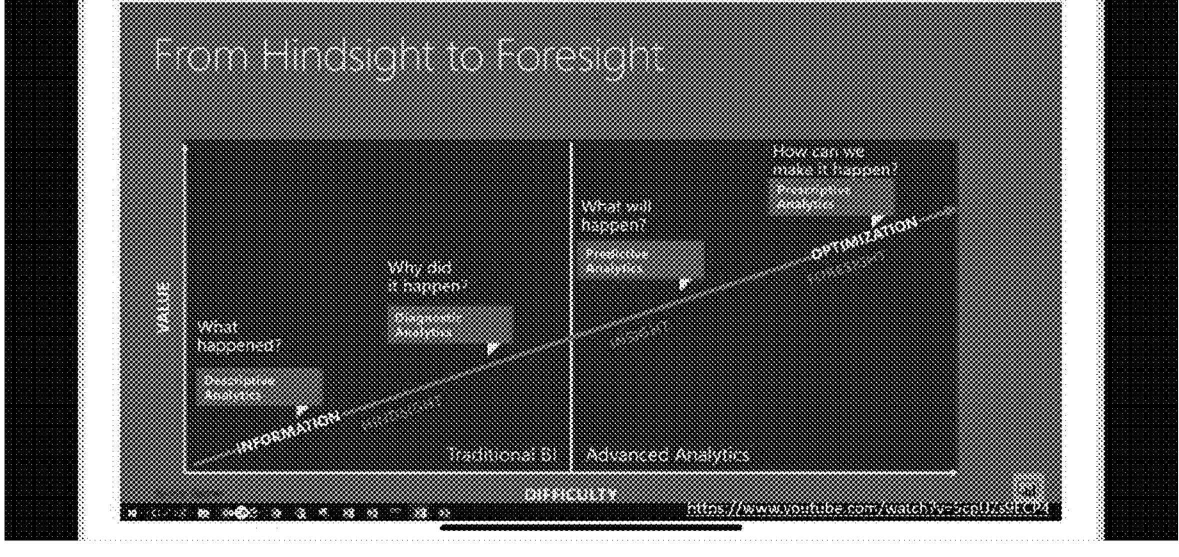
FIG. 27 is a schematic diagram illustrating various analytics including cognitive analytics, which may be employed to implement an embodiment of claimed subject matter.

One diagrammatic rendition of a potential overall process, provided by Gartner Management Consulting Co., although there are many such renditions, is shown in FIG. 27. It is noted here that in an embodiment in accordance with claimed subject matter of a virtual 3D environment, as previously described, for example, in which real-time visualizations are generated, boundary line differences, so to speak, between, for example, descriptive analytics, diagnostic analytics, predictive analytics and prescriptive analytics, respectively, may at times be blurred and/or a particular computer generated analytic may, for example, serve more than one purpose.

The next operation, also shown in FIG. 27, shall be described and illustrated below for an embodiment in accordance with claimed subject matter, and may employ AI related processing to assist and/or augment such analytics (including descriptive, diagnostic, predictive, and/or prescriptive analytics) which the former in general is referred to in this context as cognitive analytics. That is, in an example embodiment in accordance with claimed subject matter, using company past and/or present performance content, and employing AI assistance in a 3D gaming environment, may potentially lead to better insights and/or visualizations which may be generated for more efficient and/or effective interpretation and/or decision making, via superior "human brain visual analytics" compared to, for example, even fast computers based on 1's and 0's, for example.

Figure 28:
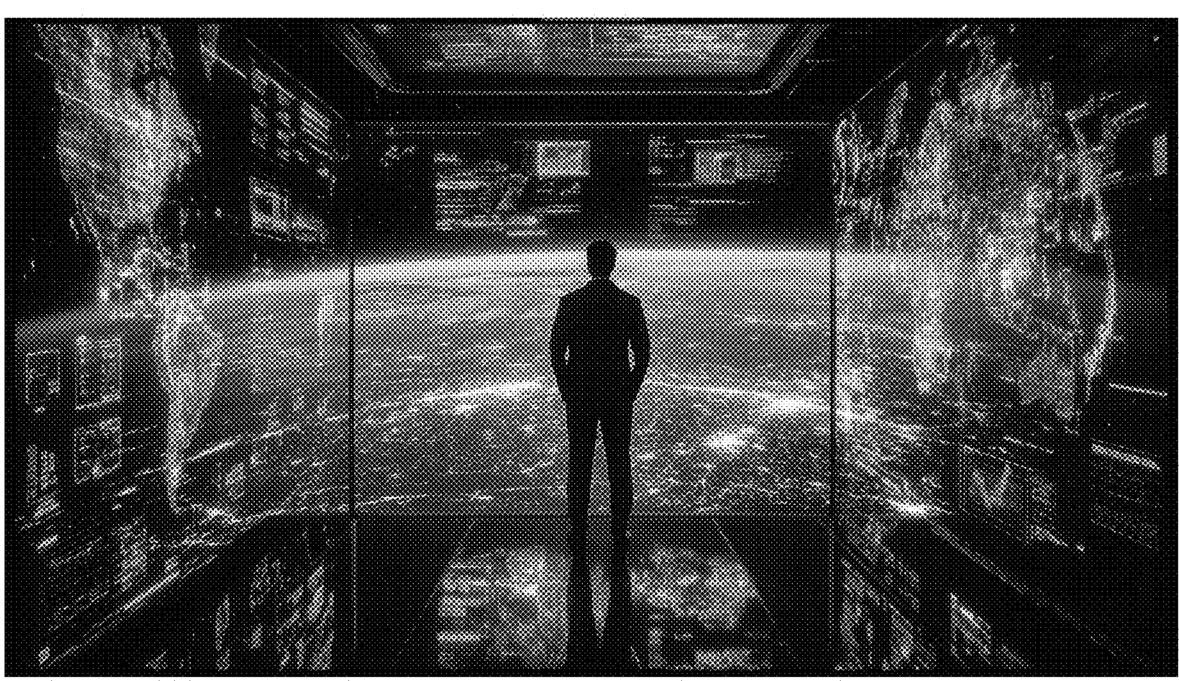
FIG. 28 is a schematic diagram showing an example embodiment in accordance with claimed subject matter illustrating a computer generated collaborative virtual 3D situational awareness center and/or room within a 3D gaming environment to provide business situational awareness.

FIG. 28 is a drawing showing one non-limiting example of an embodiment in accordance with claimed subject matter illustrating a computer generated collaborative virtual 3D situational awareness center and/or room within the 3D gaming environment to provide business situational awareness at least in part to at least one, or some, remote business decision makers. As previously suggested, in an embodiment, acts or operations may include computer generating, populating and streaming. This example is provided purely as an illustration and is not intending to limit the scope of claim subject matter. In a business context, as previously indicated, another way to state situational awareness comprises: understanding lessons of the past, perceiving issues of the present, and anticipating potential threats of the future, as illustrated by the following example.

Figure 30:
FIG. 30 is a schematic diagram of an example embodiment in accordance with claimed subject matter in which various analytics have been used to generate real-time visualizations which may be viewed in a computer generated collaborative virtual 3D situational awareness center and/or room within a 3D gaming environment.
Figure 31:
FIG. 31 are images illustrating business-type "war rooms" that have been used in the past.

FIG. 30, much like FIGS. 18-22, shows an example embodiment in accordance with claimed subject matter in which various analytics, as previously described, have been used to generate real-time visualizations which may be viewed, for example, in a computer generated collaborative virtual 3D situational awareness center and/or room within a 3D gaming environment to provide business situational awareness at least in part to at least some remote business decision makers. Hence, as suggested, FIG. 31 shows an illustrative embodiment in accordance with claimed subject matter in which a computer generated collaborative virtual 3D situational awareness center and/or room within the 3D gaming environment to provide business situational awareness at least in part to at least some remote business decision makers may, for example, be nearly simultaneously streamed to multiple platforms. For example, this figure shows several smartphones and laptops, so that the decision makers may make collaborative decisions using content provided via the collaborative virtual 3D situational awareness center and/or room in an embodiment in accordance with claimed subject matter. It is also noted, in an embodiment in accordance with claimed subject matter, a collaborative virtual 3D situational awareness center and/or room may comprise a virtual 3D EIS and/or ESS, such as previously suggested.

To use AI assisted and/or AI augmented signal processing, as an example in an embodiment in accordance with claimed subject matter, tabulated content, for example, may be uploaded to ChatGPT, as an illustrative example. ChatGPT comprises a generative artificial intelligence chatbot developed by OpenAI and launched in 2022. It is currently based at least in part on the ChatGPT-4o large language model (LLM), although a recent version is referred to as ChatGPT 03-mini. It is noted, however, that in this context, "ChatGPT" refers to any current and/or future versions of ChatGPT, including, for example, versions that may include logical reasoning, for example. ChatGPT may generate human-like conversational responses and may enable users to refine and/or steer a conversation towards a desired length, format, style, level of detail, and/or language. ChatGPT is built on OpenAI's proprietary series of generative pre-trained transformer (GPT) models and is said to be fine-tuned for conversational applications using a combination of supervised learning and reinforcement learning from human feedback. For example, successive user prompts and/or replies may be considered at conversational stages as context. ChatGPT was released as a freely available research preview, but due at least in part to its popularity, OpenAI now operates the service on a freemium model. Users on its free tier may access GPT-4o. The ChatGPT subscriptions "Plus", "Team", and "Enterprise" provide additional features such as DALL-E 3 image generation and an increased usage limit. A feature in which uploads may remain secure may also be available for a fee.

It is noted, however, that other LLMs, such as Microsoft's Copilot may, instead or in addition, be employed. Microsoft Copilot also comprises a generative artificial intelligence chatbot, here developed by Microsoft. It is noted, however, that in this context, like for ChatGPT, "Copilot" refers to any current and/or future versions of Copilot, including, for example, versions that may include logical reasoning. Based at least in part on the GPT-4 series of large language models, it was launched in 2023 as Microsoft's primary replacement for the discontinued Cortana. The service was introduced in February 2023 under the name Bing Chat, as a built-in feature for Microsoft Bing and Microsoft Edge. Over the course of 2023, Microsoft began to unify the Copilot branding across its various chatbot products, cementing the "copilot" analogy. At its Build 2023 conference, Microsoft announced its plans to integrate Copilot into Windows 11, allowing users to access it directly through the taskbar. In January 2024, a dedicated Copilot key was announced for Windows keyboards. Copilot utilizes the Microsoft Prometheus model, built upon OpenAI's GPT-4 foundational large language model, which in turn, as previously mentioned, may have been fine-tuned using both supervised and reinforcement learning techniques. Copilot's conversational interface style resembles that of ChatGPT. The chatbot is able to cite sources, create poems, generate songs, and/or use numerous languages and/or dialects. Microsoft operates Copilot on a freemium model. Users on its free tier may access most features, while priority access to newer features, including custom chatbot creation, may be provided to paid subscribers under the "Microsoft Copilot Pro" paid subscription service. Several default chatbots may be available in the free version of Microsoft Copilot, including the standard Copilot chatbot as well as Microsoft Designer, which may be oriented towards using its Image Creator to generate images based at least in part on text prompts. A feature in which uploads may remain secure may also be available for a fee.

The descriptions above suggests that it may be possible for either ChatGPT and/or Copilot with payment of a fee to keep uploads confidential. Furthermore, it may also be possible, as another alternative, to download and/or create an LLM to run locally if desired, for example, for security reasons. See, e.g., Imstudio.ai/ That is, the signal data and/or signal information accumulated need not be accessible to anyone other than those creating and/or developing the locally run LLM. A large language model (LLM) refers to a type of computational model designed for natural language processing tasks such as language generation. As language models, LLMs acquire these abilities by learning statistical relationships from vast amounts of text during a self-supervised and/or semi-supervised training process. See also Generative-AI-and-LLMs-for-Dummies.pdf Hence, with these non-limiting illustrative examples, claimed subject matter is not intended to be limited to illustrative examples and/or embodiments, such as an illustrative example which employs ChatGPT and/or Copilot.

The notion here is that, with such a comprehensive database of business related content in conjunction with AI-assist and/or AI augment analysis using the 3D gaming environment shown and discussed, improved collaboration and/or decision making may result in an embodiment in accordance with claimed subject matter. Here, embodiments in accordance with claimed subject matter may provide 100% virtual 3D immersive and photorealistic environments, such as by using real-time ray traced rendering technologies, to provide an EIS and/or situational awareness room for business, as previously described, instantiated using the latest Epic Games "Unreal Engine 5 and Pixel Streaming technologies," used extensively by creative artists, game developers, advertisers, Hollywood movies, etc. Of course, later versions of Unreal Engine are also included within the scope of claimed subject matter. Sample virtual 3D displays, for example, in an embodiment in accordance with claimed subject matter, may comprise 30 feet diagonal (10 meters) displays, providing, for example, readability and an ability to "compare" several such big displays, such as 3 or more large 3D virtual displays, side-by-side, fir example.

Hence, for example, content for a business may be tabulated using Excel, such as sales, cost, etc., which may then be uploaded to ChatGPT. Several other data types other than Excel (.xls/.xlsx) currently are also supported, such as Comma-separated values (.csv), PDF (.pdf), and JSON. As illustrations of ChatGPT's capabilities, it may automatically create an interactive table view, allowing one to scroll through the signal data uploaded and view the rows and columns. After uploading a file, ChatGPT may determine a recommended chart type for the dataset, or one may specify a supported chart type in a prompt. One may customize the graphics of interactive charts and may create summaries explaining any findings. See Data analysis with ChatGPT OpenAI Help Center.pdf After uploading, AI prompts may be used so that AI assisted and/or AI augmented processing may occur, such as to generate cognitive analytics. Prompt engineering (referring here to AI prompts) is a relatively new discipline for developing and/or improving prompts to efficiently and/or effectively use language models (LMs) for a wide variety of applications and/or research topics. Prompt engineering skills may help to better understand the capabilities and/or limitations of large language models (LLMs). Researchers may use prompt engineering to improve the capacity of LLMs on a wide range of common and/or complex tasks, such as question answering and/or arithmetic reasoning. Developers may use prompt engineering to design robust and/or effective prompting techniques that may interface with LLMs and/or other tools. Prompt engineering is not just about designing and/or developing prompts. It may encompass a wide range of skills and/or techniques that may be useful for interacting with and/or developing LLMs. It may be a desirable skill to interface, build with, and/or understand capabilities of LLMs. Prompt engineering may be used to improve safety of LLMs and/or build new capabilities like augmenting LLMs with domain knowledge and/or external tools. See, e.g., AI for Data Analysis_The Ultimate Guide for 2024.pdf. See also Prompt engineering best practices for ChatGPT, help.openai.com/en/articles/10032626-prompt-engineering-best-practices-for-chatgpt.

While ChatGPT itself cannot directly process audio, it may be used to analyze and/or interact with audio content by utilizing OpenAI's "Whisper" speech-to-text model, which allows users to upload audio files and/or generate a text transcript that ChatGPT may then process and/or respond to in light of the text transcription; essentially, ChatGPT acts as a language processing tool on the text generated from audio through Whisper. See community.openai.com/t/voice-to-text-via-whisper-integration-in-chatgpt-web-app/685231

Using the previously described database, an illustrative embodiment in accordance with claimed subject matter may include AI assisted signal processing combined with a virtual collaborative 3D situational awareness room and/or center. Figures, for example, showing graphs, as an example, may be generated by ChatGPT through AI prompts with respect to the previously described database using an embodiment in accordance with claimed subject matter. AI prompting in this context refers to the process of using natural language to communicate with an artificial intelligence (AI) system to get a desired outcome. See Prompt engineering best practices for ChatGPT, help.openai.com/en/articles/10032626-promptengineering-best-practices-for-chatgpt.

ChatGPT 4o (the "o" is for omni and not zero and refers to its conversational nature) and ChatGPT 03-mini appear to permit "verbal, human voice spoken" prompts. It is noted, again, that any and all future versions of ChatGPT are intended to be included within the scope of claimed subject matter, including versions that may employ logical reasoning. Typically, NLP for natural language processing may be employed after the verbal human spoken prompts are converted to text, as previously described. Likewise, spoken human synthesized voice may be produced from generated text and/or numerical results, for example.

Hence, embodiments of a virtual collaborative 3D situational awareness center in accordance with claimed subject matter may permit a 100% virtual collaborative immersive and photorealistic 3D environment available virtually anywhere, available virtually at anytime, and available virtually on any computing device, with virtually always updated real-time visualizations generated via cognitive analytics, for example, that may be accessed, such as viewed, through only a browser, such as a web browser.

For an embodiment in accordance with claimed subject matter, since a virtual 3D environment, as described, may nearly always be made available, a single CEO may access real-time visualizations generated, for example, via cognitive analytics "individually" or "collaboratively" and, even better, either "synchronously" in groups like via a Zoom screen sharing session, and/or "asynchronously" across functional areas via an embodiment of a virtual collaborative 3D situational awareness center, for example, in accordance with claimed subject matter. In such a manner, collective wisdom and/or extraordinary "human brain processing power" may be made available for business decision makers.

Hence, for an example illustrative embodiment, imagine another situation, in which a CEO might be getting off an airplane, like, for example SFO (San Francisco) and may merely speak "verbally" into his/her iPhone or Android smartphone the natural language (NLP) statement of "who are my top customers"? Using the latest AI ChatGPT 4o (omni) technology with conversational level voice interaction, the CEO, in this one example, may create and continue a conversational dialog for several minutes—to tens of minutes—of deadtime that we all have experienced while deboarding a plane and potentially only having a smartphone to carry and access, for example. Hence, via the smartphone, access to the 3D gaming environment may provide an embodiment of a virtual collaborative 3D situational awareness center in accordance with claimed subject matter.

To accomplish such complex tasks, analysis and/or decision-making, an AI agent may, potentially, be employed in an embodiment. Thus, a layer of software on top of an embodiment, as described, may, in effect, "agentize" the AI processing. An AI agent represents a different level of AI processing compared with the foregoing. However, an AI agent is not simply intended to be a type "autopilot." That is, an AI agent may enable closed loop and/or semi-closed loop decision making, meaning that the embodiment may perform processing and may let a human make the ultimate decision.

Likewise, an AI agent is not simply a virtual assistant. An AI agent and a virtual assistant may both be types of artificial intelligence, but they typically have different functions and/or levels of complexity. In an embodiment, an AI agent may be a system that may perform tasks and/or may make decisions based at least in part on input from its environment. It may interact with signal data, recognize patterns, and/or autonomously make decisions and/or take actions to achieve specific goals. AI agents may be used in a wide range of fields, from game development (where agents control characters in a game) to more complex areas like robotics, business analytics, and/or even self-driving cars. They typically may be more advanced than virtual assistants in that they may often be designed to handle dynamic, complex tasks and may adapt to new situations without human intervention.

A virtual assistant, like Siri, Alexa, or Google Assistant, may be a specific type of AI that may help users perform tasks and/or access information. These tasks may typically be related to things like setting reminders, answering questions, controlling smart devices, and/or helping with navigation. Virtual assistants may typically be designed with a focus on user interaction, usually through voice or text, and may primarily be built to improve convenience for everyday activities. While virtual assistants may be sophisticated, they may more generally be limited in scope compared to full-fledged AI agents, as they usually may rely on predefined commands and may not be as adaptable and/or autonomous in the same way. In short, AI agents may tend to be more complex and/or capable of autonomous decision-making in a variety of contexts, while virtual assistants may be more focused on simplifying specific, everyday tasks for users.

An AI agent generally may have access to deep specialist knowledge, may have memory regarding past inquiries and/or tasks, may be interactive and perhaps, most importantly, may have an ability to reason. Thus, an AI agent may be able to operate autonomously and may make decisions as it seeks a result.

An AI agent comprises a software system typically designed to autonomously perform tasks and/or make decisions based at least in part on input signal data, predefined rules and/or learning models. It may process large amounts of information in the form of signals and/or states, adapt to new situations, and/or seek to improve its actions over time to achieve specific goals. Often powered by machine learning processes, AI agents may analyze patterns, recognize objects and/or speech, and/or may even predict outcomes. These agents may continually evolve to become more intelligent and/or versatile in various fields, from healthcare to finance and entertainment, as examples.

To illustrate unique aspects of an AI agent, while both an AI agent and ChatGPT may be powered by artificial intelligence, they may work a bit differently based at least in part on their design and/or purpose. An AI agent may typically be built to perform specific tasks and/or functions autonomously within a given environment. It may often use processes, sensors, and/or signal data to take actions and/or make decisions based at least in part on real-time inputs. For example, a self-driving car may comprise an example of an AI agent that may interpret road conditions and/or may adjust its driving in real time. These agents may usually be goal-oriented and/or may operate without continuous interaction with humans, adjusting their behavior based at least in part on the signal data they receive.

ChatGPT, on the other hand, may comprise a language-based model designed to generate human-like text responses based at least in part on input. It works by predicting the next word or phrase in a sequence of conversation, utilizing vast amounts of text data from books, websites, and/or other sources to mimic natural language. ChatGPT may not be intended to perform tasks or take actions outside of generating text-based responses. It's not autonomous in the same way an AI agent may be; rather, it relies on prompts and/or may be typically used for information retrieval, conversation, and/or text generation. In short, an AI agent usually may be focused on making decisions and/or performing actions in a dynamic environment, while ChatGPT may more typically be designed for engaging in text-based interaction.

As indicated, an AI agent may typically comprise a software system designed to autonomously perform tasks and/or make decisions based at least in part on input signal data, predefined rules and/or learning models. These systems typically may be highly versatile and/or capable of processing large amounts of signal data, potentially enabling them to adapt to new situations and/or to potentially improve their actions to achieve specific goals. AI agents may typically be powered by machine learning processes, which may allow them to analyze patterns, recognize objects and/or speech, and/or predict outcomes. This flexibility makes them potentially applicable across a broad spectrum of industries, from healthcare to finance, entertainment, and beyond.

At the core of an AI agent's functionality may be its ability to perceive, reason, and act. Perception may be achieved through sensors and/or input mechanisms that allow the agent to gather signal data from its environment. For example, a self-driving car may use cameras and/or LIDAR sensors to perceive road conditions and/or obstacles. Once the agent may gather input signal data, it may move to a decision-making phase. This is where predefined rules, logical reasoning, and/or machine learning processes may help the agent decide on an action. After making a decision, the agent may take action, such as steering a vehicle and/or sending a recommendation to a user. Over time, many AI agents may be designed to learn from their environment, continually refining their decision-making process to improve performance.

Another feature of AI agents may be their ability to adapt. They may use feedback from past actions to modify their behavior and/or improve future decision-making. This adaptability may be powered by learning mechanisms, such as supervised, unsupervised, and/or reinforcement learning. Reinforcement learning, for instance, may involve the agent receiving rewards and/or penalties based at least in part on its actions, which may motivate it to adjust its behavior to maximize long-term rewards. This dynamic learning process may allow AI agents to thrive in environments that may typically involve frequent adjustment and/or improvement, potentially making them useful for applications like autonomous vehicles and/or predictive analytics systems. The operational scope of AI agents may vary significantly, ranging from simple reactive agents that may respond to direct stimuli to complex deliberative agents potentially capable of planning and/or reasoning. Reactive agents typically operate based at least in part on immediate inputs, typically without relying on historical context and/or past experiences. In contrast, deliberative agents may evaluate multiple possibilities, making them useful for complex decision-making tasks. Some AI agents may be designed with a hybrid approach, combining the speed of reactive decision-making with the sophisticated reasoning of deliberative systems.

In the realm of business, AI agents may prove effective in supporting decision-making processes. Predictive analytics agents, for example, may analyze historical signal data to forecast future trends, which may help businesses improve inventory control, predict customer demand, and/or guide investment strategies. So-called "optimization agents" may tackle problems like supply chain management, where they may assess variables and/or constraints in an effort to identify efficient solutions, if possible. Decision support agents may provide actionable insights based at least in part on signal data analysis, potentially assisting business leaders in making informed choices without necessarily making the decisions for them. These agents may streamline decision-making, may reduce human error, and/or may ultimately improve business performance by offering data-driven recommendations. With their ability to process vast amounts of information quickly and/or effectively, AI agents may play a role in enhancing operational efficiency, improving customer experiences, and/or enabling more strategic long-term planning.

Thus, as may now be clear, an AI agent may, for example, write a strategic plan for a business. Likewise, an AI agent may, for executives of a business, without prompts, monitor competitive products as they are introduced and analyze strengths and weaknesses relative to the products for the particular business and potentially many, many more things, as described below.

It is noted that several companies are already deploying AI agents. For example, OpenAI has developed advanced AI models like GPT-4 and GPT-4o, which are utilized in various applications, including autonomous AI agents. Google's AI initiatives include the development of AI agents through platforms like Vertex AI and the Gemini project, enhancing multi-modal and multi-agent systems. Microsoft has been actively integrating AI agents into its products and services, including the Azure AI platform and the AI Copilot feature. IBM's Watson platform offers AI solutions that enable businesses to deploy AI agents for various applications, including customer service and/or signal data analysis.

Creating an AI agent may involve defining the core components, functionalities, and/or processes of the agent in a clear and detailed manner. An AI agent is typically composed of several functional components that work together to allow it to make decisions, interact with the environment, and/or improve over time. Here's a breakdown of the useful components:

Perception:

This may refer to the agent's ability to gather information from the environment. It may involve sensor and/or input mechanisms that may allow the agent to perceive its surroundings. For instance, a robot may use cameras, microphones, and/or touch sensors to understand what's happening around it. In AI agents working with signal data, this could mean reading and/or receiving input signal data (e.g., sensor readings, text, images, etc.).

Decision-Making (or Reasoning):

This is where the agent may process signal information it perceives and may decide what action to take. The decision-making process may involve a set of predefined rules, logical reasoning, and/or more advanced techniques like machine learning and/or reinforcement learning. In reinforcement learning, for example, the agent may make decisions to maximize a reward based at least in part on its past experiences. This is where the agent may "think" about a preferred course of action.

Action:

Once or after the agent has made a decision, it may execute an action in the environment. In physical systems, this could be something like moving, manipulating objects, and/or adjusting settings. In software-based agents, the action could involve making a recommendation, sending an email, and/or initiating a transaction.

Learning/Adaptation:

Over time, an AI agent may improve its performance through learning. This may involve modifying its internal model based at least in part on feedback and/or new signal data. For example, a machine learning-based AI agent might update its model to improve its predictions and/or behavior based at least in part on past successes and/or failures. Some AI agents may be designed to continually learn and/or adapt in real-time (e.g., reinforcement learning agents).

Memory/Storage:

AI agents may use a way to store and/or recall signal information over time. This may be in the form of short-term memory (for immediate tasks) or long-term memory (for storing knowledge gained over time). For instance, an agent working in a dynamic environment might store signal data about previous actions, experiences, and/or changes in the environment to improve its future decisions.

Communication:

In some cases, an AI agent may find it useful to interact with other AI agents or human users. This could involve using natural language processing (like ChatGPT), sending signals, and/or sharing signal data. Communication may help the agent gather more context and/or provide updates on its actions.

These components work together to allow the AI agent to observe its environment, make decisions, act, and/or improve its performance over time. The complexity of these components may vary depending on the task the agent is designed to perform, but these may be the general building blocks for typical AI agents.

In summary, businesses may benefit from a wide variety of AI agents, from those that may focused on predictive analytics to more advanced agents that may support decision-making in real-time. These agents may drive operational efficiency, improve customer experiences, and/or guide strategic initiatives, ultimately potentially helping businesses to stay competitive and/or make better decisions.

To now come full circle, one should not lose sight of the power of real-time visualization, such as in the previously described embodiments. For example, techniques for capturing content that may originate in a web browser and then processing and rendering that content inside a gaming environment may allow players, which may include business executives, to see and/or interact with web-based signal information and/or visualizations as part of the game's 3D world. A theme may be the web-derived content being visualized in real time, meaning that updates in the source (the web browser) may be reflected dynamically within the game. This synchronization may be useful for applications where current information may be desirable, such as live data feeds and/or interactive web elements. The described system embodiment, for example, may potentially allow for seamless interaction between conventional web platforms and immersive virtual environments. This may be particularly useful in a variety of contexts. Hence, previously discussed embodiments, for example, may bridge the gap between a typically static, isolated environment of traditional gaming and a dynamic, interconnected world of web content. By doing so, it may lay a foundation for gaming environments that are not only interactive in the usual sense but may also be capable of reflecting and/or integrating external signal data in real time, thereby expanding the scope and/or interactivity of modern virtual experiences.

While an AI agent may be a desirable and useful tool in this ecosystem, so to speak, that is merely one piece of the overall scenario. A much larger and more dramatic shift in decision making may be taking place and could be embraced by CEOs and business executives. An embodiment of a technological foundation that would support a shift toward decision-centric signal data and analytics may be implemented as described.

More specifically, for an embodiment in accordance with claimed subject matter, a synergistic effect may occur from collaboration of multiple web browsers with web browser derived content, such as in a virtual collaborative 3D situation awareness center and/or room, but now with the power of an AI agent, programmed, for example, to autonomously make real time comparisons and/or perform analysis of the market, for example. As suggested, such an embodiment may produce strategic analysis and/or reports. Graphics may be created without prompting that may identify a potential host of business opportunities, such as overlooked customers, markets, cheaper materials, more efficient processes, technologies, etc., etc. The synergistic opportunities may only be as limited as those who program the reasoning of an autonomous AI agent to seek opportunities.

It should be reasonably apparent that AI agents may be specially tailored, as suggested by the prior application examples. Hence, one may imagine an AI agent with access to PhD level knowledge regarding signal data and/or signal data analysis. One may, for example, refer to an AI agent, such as an information science AI agent. Likewise, there may be some distinction between a signal data analyst and a signal data scientist. Hence, an information science AI agent may include a combination of the capabilities of each, for example. As suggested, AI agents may be perceptive, may be flexible, may have reasoning to support autonomous decision making, may have a learning capability (e.g., an ability to adapt), and may have an ability to take action. As suggested, in a signal data science and/or signal data analysis realm, collaboration of web browser derived content to result in situational awareness, such as via a virtual center and/or room, may, via AI agents, for example, result in closed loop and/or semi closed loop decision making, real time visualization through graphics, including audio, video, text and/or other forms which may be used to assist business executives, for example, to recognize and/or seize upon opportunities that might otherwise have gone unnoticed.

AI agents, in an embodiment, as previously described, for example, may make it much easier to recognize new perspectives, to obtain "what if" type analysis, and/or to perform multi comparative analyses. One may view an AI agent as a cognitive extension to the analytics described earlier to enable highly dynamic decision making. For example, one may imagine these highly sophisticated AI agent with PhD level knowledge, as a simple example embodiment, may continually execute a cycle, such as (1) performing an action, (2) taking measurements and (3) generate and analyze feedback to lead to (4) an adjustment, and then continually repeat the cycle.

Figure 29:
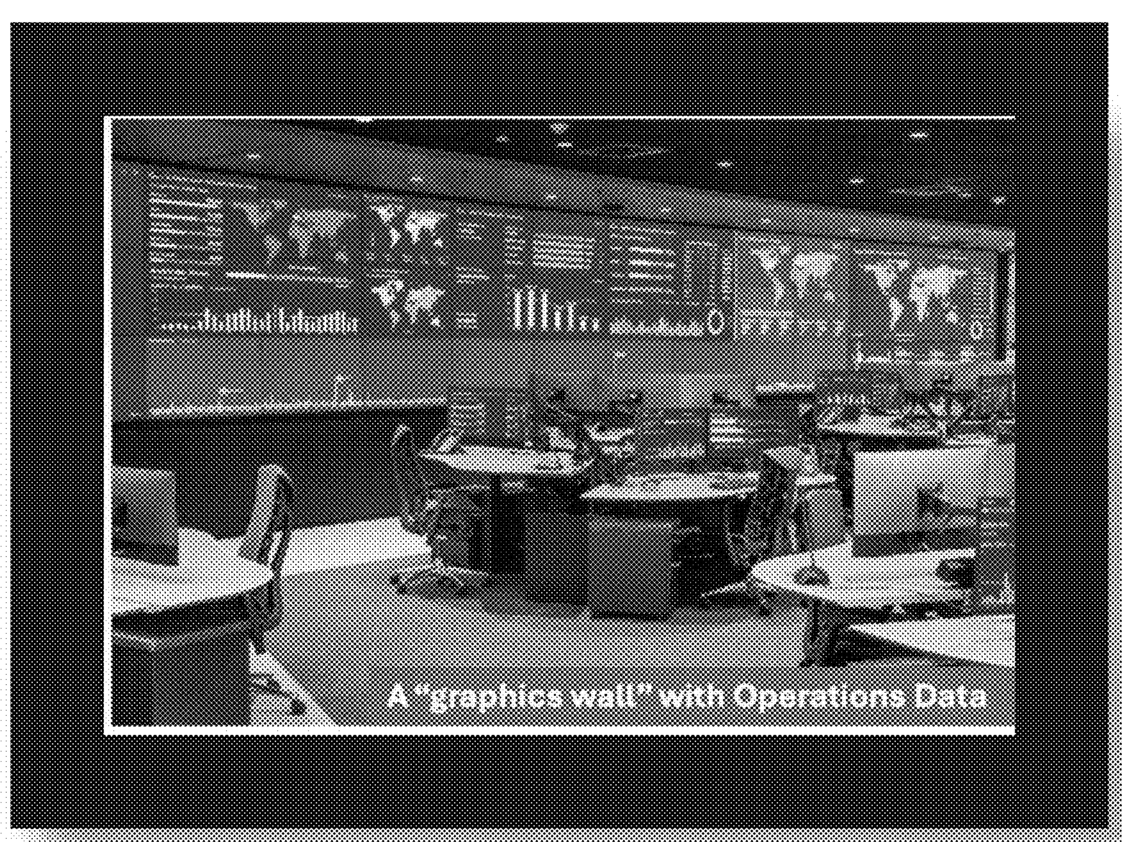
FIG. 29 is a schematic diagram of an example embodiment in accordance with claimed subject matter in which various analytics have been used to generate real-time visualizations.
Figure 32:
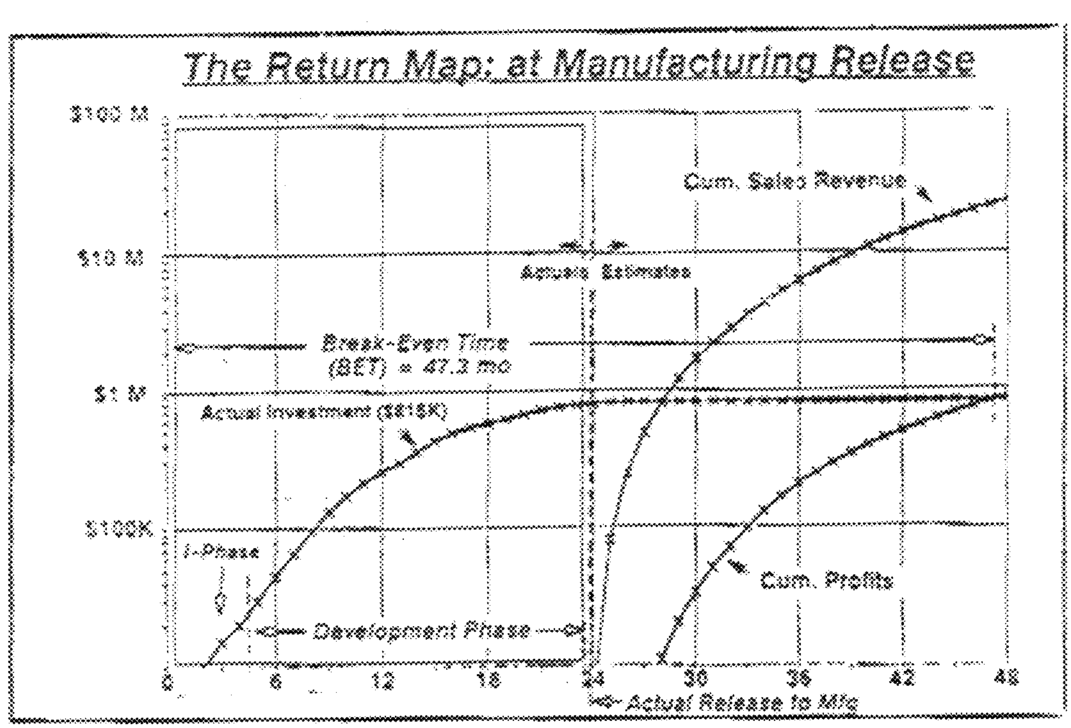
FIG. 32 is a graph illustrating an example Return Map.
Figure 33:
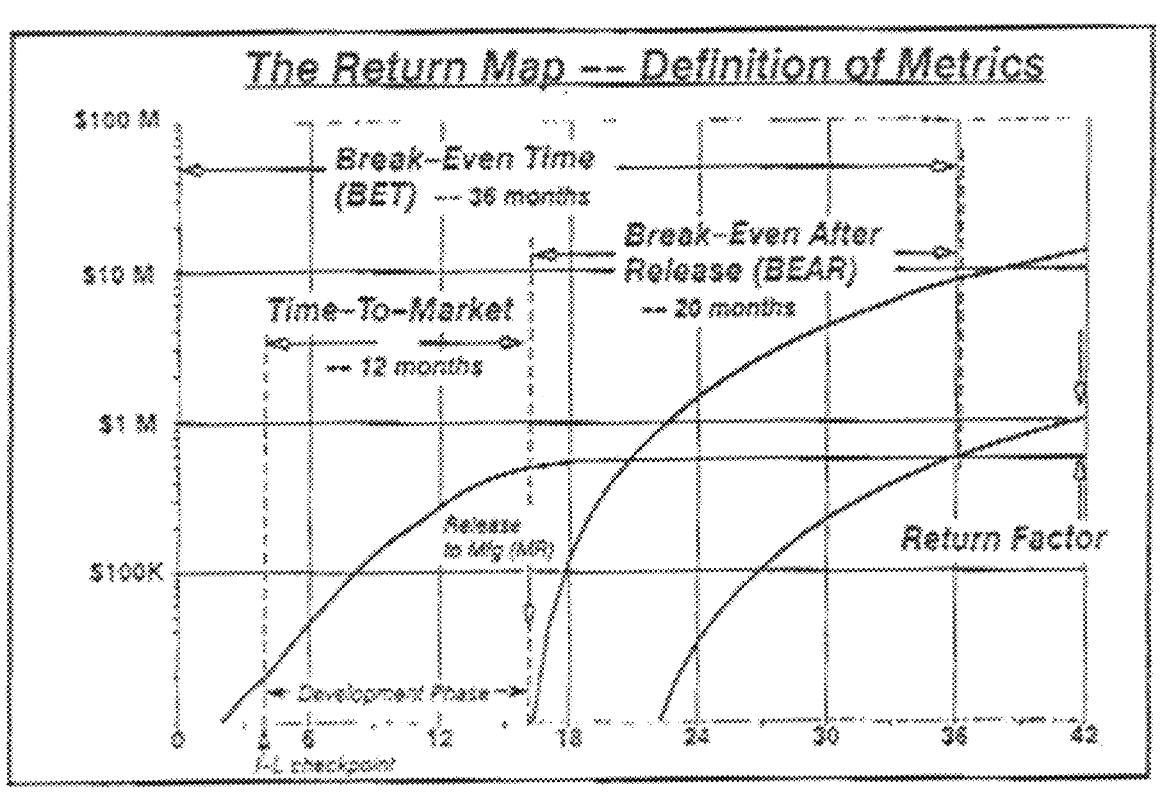
FIG. 33 is another graph illustrating metrics able to be determined using a Return Map.

As yet another illustration, companies, company executives and/or individual experts have long created customized and/or unique "views" of signal data or signal information, as shown in FIG. 29. In the BI and BA space (Business Intelligence and Business Analytics), these are often referred to as a KPI which stands for "Key Performance indicators". See, e.g., Performance indicator—Wikipedia; Performance measurement—Wikipedia KPIs may be as simple as "at a glance" red—amber—green stoplights, up/down arrows, etc. However, an embodiment in accordance with claimed subject matter may dramatically enhance these simple "at a glance type of visuals" and may create a more significant PAST-PRESENT-FUTURE type of "Visualization and natural language spoken answer". Using, for example, in an embodiment, the latest AI intended to be virtually "always live, always updated, forward looking with what-if functionality, etc.," a CEO could easily ask a question and get a conversational answer. For a modern automobile, as an example, PKIs or performance measurements may be viewed as having evolved into a series of "custom instrumentation displays" versus raw numbers and/or simply graphs. Hence, in the context of an embodiment that includes a computer generated collaborative virtual 3D situational awareness center and/or room within the 3D gaming environment, a specific example, without limitation, of a "custom instrument," so to speak, for a situational awareness center in accordance with claimed subject matter is now described. One may wonder what constitutes instrumentation in a 3D gaming environment, such as described. In this context. Instrumentation refers to the design, provision, and/or use of measuring instruments. FIG. 32 shows an illustrative example of an embodiment of an instrument in accordance with claimed subject matter referred to here as a Return Map. Consider, for example, an embodiment in accordance with claimed subject matter, that, for example, may employ project based accounting. In contrast to period accounting, it is a type of accrual accounting, measuring revenue, cost, and profitability of a project or portfolio of projects. Worthy of mention is that one of the inventors of the presently claimed subject matter was heavily involved in developing approaches to project based accounting, such as the illustrative custom instrumentation discussed here. Among his prolific works includes an article in Harvard Business Review. House C. and Price, R. "The Return Map: Tracking Project Teams," Harvard Business Review, January-February 1991, pp. 92-101. HBR article at hbr.org/1991/01/the-return-map-tracking-product-teams. In an embodiment, a simple, easily comprehended, easily constructed graphical model of relevant investments and returns of a project may be employed so that members of a project team may predict, plot progress, and/or adjust as a function of the reflected economic results of their estimates, accomplishments and/or problems (e.g. competitive pressures, cost over-runs). Another example of a typical Return Map using past and/or present signal data, for example, is depicted in FIG. 33. However, an illustrative embodiment in accordance with claimed subject matter may provide so much more. For example, an embodiment of a Return Map in accordance with claimed subject matter may comprise an interactive management assessment map for continual (which may also include continuous) and/or real-time updates of forecasts, decisions, actions and/or results from inception to far beyond investment break-even into the future. That is, an embodiment of a Return Map in accordance with claimed subject matter, such as one using project-based accounting, dovetails well with situational awareness and a situational awareness center, as previously described. A Return Map may extend past, and present metrics into future business metrics and/or similar considerations across multiple perspectives and/or time frames. Rather, a multi-year, multi-dimensional, multi-display capability of a Return Map methodology, especially in situations that may combine with video records of meetings, and application of AI technology, etc., as described, to the collected corpus of signal data, provides a real world example of an embodiment in accordance with claimed subject matter. To illustrate, prescriptive approaches, as described, combined with AI techniques for analysis, may make an embodiment of a Return Map in accordance with claimed subject matter more powerful as a virtual instrument. The collective database for a corporation's myriad projects may become signal data feeds for AI associative work, as an example. Whereas previously generating, for example, a sales profile, from such a corpus was done laboriously, AI capability, which has since become available, may make such collection gathering chores much less onerous. However, that is just the beginning. A Return Map embodiment as suggested, in accordance with claimed subject matter, may, for example, employ AI related processing to assist and/or augment Return Map results and/or predictions, (including descriptive, diagnostic, predictive, and/or prescriptive analytics). That is, in an example embodiment in accordance with claimed subject matter, using company past and/or present performance content, and employing AI assistance in a 3D gaming environment, may, for a Return Map using assisted and/or augmented AI processing, potentially lead to better insights and/or visualizations which may be generated for more efficient and/or effective interpretation and/or decision making, via superior "human brain visual analytic." Hence, a Return Map example, illustrating an embodiment in accordance with claimed subject matter, may provide a classic illustration of a valuable business "war-room" and/or collaborative situational awareness center and/or room for business product development material. For an embodiment, multiple years may be displayed in multiple perspectives (such as multi-dimensional, both for period-based and for project-based accounting approaches), and/or along with voice/video screens displaying meetings in which arguments and/or discussions that went into decision making may be made quickly available in a virtual three-dimensional gaming environment. Furthermore, combined with analytics, as discussed, a Return Map may, for example, be used to verify that a chosen company path is "on target," so to speak, through verification. The possibilities and/or capabilities may be virtually as endless as the human imagination. For example, with more advanced AI processing, as merely an example, perhaps a Return Map embodiment may then lead to a written report providing analysis and/or conclusions for human consumption, but generated without direct human involvement.

A slide presentation by Gartner Management Co. regarding signal data and analytics (D & A) drives home many of the points described previously with respect to embodiments in accordance with claimed subject matter. A video of the presentation and the presentation slides are available at Agenda|The Future of Data & Analytics: From Data-Driven to Decision-Centric Slide 7 from Gartner's presentation indicates that 65% of respondents to a poll by Gartner said that signal data and analytics (D & A) are used to justify a decision that has already been made by an organization. Slide 13 from Gartner's presentation indicates that the real goal with D & A is better decision making rather than simply the generation of signal data. Furthermore, data-driven decisions should be decision-centric, so to speak. Slide 15 from presentation shows Gartner's assessment that for D & A to improve decision making it should be more contextual, more connected, and more continuous, as has been alluded previously and/or is described later in this document.

Slide 20 comes the presentation by Gartner Management Consulting Co. depicts several features potentially in common with an embodiment in accordance with claimed subject matter. Slide 20, for example, suggests a new fabric may be implemented. It may represent a highly integrated, unified layer where signal data from a variety of sources may be brought together. The term "fabric" may be used to imply a seamless, interconnected network. Some characteristics may include: (1) internal and external data: that is, an embodiment may combine both in-house and third-party data sources; (2) batch and streaming: that is, an embodiment may support both periodic (batch) and continuous (streaming) data flows; (3) analytical and operational: that is, an embodiment may handle both strategic, long-term analysis and/or real-time, operational signal data; (4) cross-silo: that is, an embodiment may break down traditional organizational signal data silos to allow holistic insights; and/or (5) multistructured signal data: that is, an embodiment may be capable of managing diverse signal data types (e.g., structured, semi-structured, and unstructured signal data).

A feature of an embodiment may include a decision intelligence platform, as depicted on slide 20. This may be, for example, an application layer that may turn "raw data" into actionable, decision-centric insights. Features of an embodiment may include: (1) a decision-centric UI: that is, an embodiment in which a user interface may be designed specifically to support decision-making by focusing on desired metrics and/or actions rather than raw data; (2) decision flow models and orchestration: that is, an embodiment in which tools and/or frameworks may map out decision processes and the flow from signal data insight to action; (3) monitoring and adaptation: that is, an embodiment in which continuous oversight of decisions may take place, with the ability to adjust in real-time as conditions change.

In an embodiment, such as shown on slide 20, analytics and AI capabilities may comprise a spectrum of analytics, from basic to advanced analytical techniques, such as: descriptive: what happened?; diagnostic: why it happened?; predictive: what is likely to happen?; prescriptive: what should be done?, in addition to graphics, simulation, and/or knowledge management, which may further enhance the ability to model complex relationships, simulate different scenarios, and/or store and retrieve domain knowledge.

Slide 20 also indicates that AI Agents may have a role that for an embodiment may include: decision support: such as, providing insights and/or recommendations, and decision augmentation: such as, enhancing human decision-making with advanced analysis. An embodiment may be integrated and provide a scalable infrastructure so that an underlying signal data architecture may be robust and/or flexible enough to handle diverse and/or complex signal data sources so that relevant signal information may be available to drive decisions.

A transition to a decision intelligence platform may, for an embodiment, as suggested by slide 20, move beyond signal data collection. It may emphasize transforming signal data into actionable intelligence that may be directly or indirectly tied to business outcomes. A progression from descriptive analytics through to prescriptive analytics—and ultimately to AI assisted and/or AI augmented decision-making—highlights how organizations may evolve their decision-making processes, such as from signal data to report on what has happened and diagnose issues to potentially forecasting future trends and/or suggesting actions, and then to moving toward AI assisted and/or AI augmented decisions, thereby potentially increasing speed and/or consistency. By integrating signal data from multiple sources and/or types (internal, external, batch, streaming), organizations may potentially break down the traditional silos that may hinder effective decision-making. This may lead to more comprehensive insights and/or more agile, responsive business operations. An element may be a capability to continuously monitor decisions and/or their outcomes, potentially enabling a system embodiment to adapt quickly as new signal data and/or conditions arise. This may be desirable in fast-paced business environments where conditions may change rapidly.

Tying this technology together in an embodiment in accordance with claimed subject matter, in today's fast-paced business environment, the decision-making process for CEOs and executive teams has traditionally hinged on intuition, experience, and a reliance on periodic, manually compiled reports. Leaders often have depended on historical trends and/or personal judgment to navigate complex challenges. However, in accordance with an embodiment, as previously described, a transformative shift may be implemented, a move from experience-based, reactive decision-making to an AI-powered, decision-centric approach that is continuous, signalmdata-driven, and transparent.

At the core of traditional decision-making lies the reliance on personal experience and/or gut instincts. Executives have long made choices based at least in part on what has worked in the past, leaning on their intuition and/or the authority of established practices. In contrast, in an embodiment in accordance with claimed subject matter, as previously described, decisions are not left to subjective judgment alone. Instead, signal data and artificial intelligence (AI) may be employed to augment human insight so that decisions may be informed by comprehensive analytics, real-time simulations, and/or predictive insights while operating in a virtual 3D gaming environment, in an embodiment. This shift potentially moves the focus from merely justifying decisions with signal data–often a post-hoc rationalization—to using signal data as a proactive driver of strategic choices.

Moreover, conventional approaches may be characterized by isolated decision-making. Different departments, such as marketing, finance, and operations, may work in silos, possibly leading to fragmented views and/or sometimes conflicting interpretations of signal data. However, as previously discussed, in a 3D gaming environment, for example, that may include a virtual collaborative 3D situational awareness center or room so that these departments may, instead, be integrated. An integrated ecosystem where AI orchestrates decisions across departments in real time, such as previously suggested, may break down organizational silos and/or may foster a connected decision ecosystem that may align stakeholders with a unified, holistic understanding of the business landscape.

Another departure from the traditional process may be a transition from periodic reporting to continuous, real-time decision-making, again, as previously suggested. Historically, executives have relied on weekly, monthly, or quarterly reports to gauge performance and/or forecast trends. Such static snapshots of signal data, however, may quickly become outdated in today's dynamic markets. Instead, in an embodiment in accordance with claimed subject matter, AI and real-time analytics may be leveraged to continuously monitor performance metrics and/or environmental changes, potentially enabling organizations to adjust strategies on the fly. This dynamic model may not only speed up the decision-making process but may also result in decisions based at least in part on the most current information available, for example.

The traditional reactive approach—where companies wait to see the outcomes of past events before deciding how to proceed—also contrasts sharply with a predictive and/or prescriptive model, which may also include cognitive analytics, as previously discussed. Instead of simply reporting what has happened, advanced analytics may forecast future trends and/or provide actionable recommendations on what should be done next. This proactive stance may empower businesses to anticipate challenges and/or opportunities, rather than merely responding to them after the fact.

Transparency in decision-making may be another aspect of implementing an embodiment in accordance with claimed subject matter. In many current scenarios, decisions may be made in what may be described as a "black box," illustrated, for example, in FIG. 39, also from the previously referenced Gartner presentation, where the underlying rationale may not be clearly visible, perhaps, for example, due to political influences and/or ingrained biases. In contrast, an embodiment in accordance with claimed subject matter may involve the use of explainable AI models that may make the decision process more clear and/or traceable. This transparency may not only build trust among stakeholders but may also facilitate more informed and/or accountable leadership.

Finally, traditional decision-making processes frequently may involve manual reviews, meetings, and/or approvals that may slow down execution. By potentially automating repetitive tasks, such as via AI, for example, while keeping humans in the loop for strategic oversight, organizations may increase the speed and/or efficiency of their decision cycles.

In this transformed approach, situational awareness may play a pivotal role. Executives may harness real-time signal data streams from various sources-such as market trends, operational dashboards, and/or external economic indicators—to build a comprehensive picture of the current environment. With situational awareness, decision-makers may not only be aware of what is happening across areas of the enterprise but may also be better prepared to predict potential disruptions or/or opportunities. For instance, in the face of a sudden supply chain disruption, integrated systems may quickly alert leadership, may provide context on the scale and/or potential impact of the issue, and/or may suggest pre-emptive measures to mitigate risk. By applying situational awareness in this manner, organizations may respond more rapidly and/or effectively, so that strategic decisions may be informed by a breadth of available intelligence.

In summary, the shift recommended and capable of implementation in accordance with an embodiment of claimed subject matter represents a transformation in executive decision-making. It moves away from reliance on personal intuition and/or static reports toward a future where decisions may be continuously improved by real-time, AI-driven insights in a 3D gaming environment via a virtual collaborative 3D situational awareness room and/or center, for example. This evolution should enable faster, more accurate, and/or transparent decision-making, potentially breaking down departmental silos and/or aligning decisions with an organization's strategic goals. Ultimately, this may improve operational efficiency and/or build a more resilient and/or agile enterprise potentially ready to meet the challenges of an increasingly complex and/or competitive global market.

Figure 34:
FIG. 34 is a picture illustration of NASA Mission Control.

Previous examples of a situational awareness center and/or EIS center included a 3D NASA Mission Control Center, shown in FIG. 34, analogous to real-world embodiments like the White House Situation Room, a Command bridge of a ship (all the way back to Star Trek the Original Series, in 1966, that was remastered in 2009 by Paramount), factory control rooms—like the ATT Global NOC (Network Operations Center)—pilot's cockpits, military/sports/political "war rooms", etc. The famous WWII Winston Churchill "war room" was yet another example, captured via Hollywood movies like the "Battle of Britan" and the D-Day invasion.

Consider, for example, Hollywood depictions of war rooms and/or situation awareness centers and/or rooms. As suggested, in 1966, the command bridge of the Enterprise in Star Trek: The Original Series emulates such war rooms and/or situation awareness centers and/or rooms, although not virtually, of course. For example, on a main viewer screen (e.g., display), in space, ahead of the Enterprise ship, an object anomaly, previously unknown, may appear. The captain may request an explanation of what he is seeing; his officers may then consult available ship sensors and/or databases and may respond that they do not have sufficient signal data to identify the object. So, the captain may ask, "can you tell me what it isn't?" The officers may then list a variety of things that the object is not. See Season 3, Episode 18 of Star Trek: The Original Series. Watch Star Trek Season 2 Episode 18: Star Trek: The Original Series (Remastered)—The Immunity Syndrome—Full show on Paramount Plus Although fictional, this depiction captures various elements of a non-virtual war and/or collaborative situational awareness room. As previously described, in a business context, situational awareness comprises: understanding lessons of the past, perceiving issues of the present, and anticipating potential threats of the future. Further, as described, in these non-virtual situational awareness room and/or center examples, collaboration may occur in real-time. To be more specific, for an illustration, here, superior "human brain visual analytics" from such collaboration of "human brain bandwidth," so to speak, is believed to provide better results compared to, for example, even fast computers based on 1's and 0's.

Although fictional, the Star Trek Original Series episode referenced above may nonetheless demonstrate various features of an embodiment in accordance with claimed subject matter using currently available technology, although in the episode the displays etc., are nit vurtual. For example, the episode demonstrates real time signal data integration. As the anomaly of the episode comes into view, the main viewer screen may spring to life with layered, high-resolution signal data. The display may not just be showing raw images; it may overlay sensor readings, spectral analyses, and/or simulated predictive models. The signal information may also be fed nearly simultaneously into a display interface for respective team members, for example. The episode also may demonstrate nearly simultaneous analysis. Captain Kirk may see not only the visual representation of the anomaly but he may also see predictive trajectories that may indicate potential hazards. His mind may process these details as he calls out, "Status report—what are we dealing with here?" Spock may have a display interface that synchronizes with the main display so that nearly instantly energy fluctuation patterns may be correlated with known cosmic phenomena. "Captain, the anomaly exhibits characteristics of a self-organizing plasma structure with possible emergent intelligence. I am computing probable responses to our proximity," Spock replies. Other Officers (like Uhura, Chekov, and Scotty) may contribute in parallel. Uhura may monitor communication logs and/or sensor feed integrity and may note potential interferences; Chekov may review navigational readouts and/or chart potential safe trajectories; Scotty may assess the ship's systems to be comfortable that energy shields and/or power outputs may adapt to sudden shifts.

Furthermore, the viewer screen or display may not necessarily be a one-way display. It may be part of a closed-loop or semi-closed loop system. For example, observations, predictions, and/or suggested maneuvers of members of the team may be fed back into the ship's central computer. For instance, Spock suggests a particular trajectory that reduces gravitational strain, that option may then be modeled on the screen. The central computer may synthesize inputs and may run real-time simulations that may incorporate the captain's strategic priorities and/or the collective expertise of the crew. The main display may then update to show multiple "what-if" scenarios, such as, highlighting outcomes if the ship adjusts its course, modifies shield parameters, and/or increases power to the impulse engines. Furthermore, these visual simulations may be served as nearly immediate feedback for further deliberation.

With a closed-loop or semi-closed loop system continuously cycling through signal data, analysis, and/or simulated outcomes, Captain Kirk may take a moment to integrate potential insights. He may nod to Spock's logical assessment while factoring in Chekov's navigational recommendations and Scotty's system checks. "Spock, adjust our trajectory to the northwest quadrant of the anomaly, and Scotty, divert extra power to our shields. Uhura, keep monitoring for any communication disruptions," he commands. Almost instantly, the viewer screen or display reflects these changes-displaying a new flight path, updated shield status, and/or real-time sensor confirmation that the adjustments may be mitigating potential threats.

As the Enterprise navigates the anomaly, the system may remain in a continuous feedback loop. For example, new signal data about the anomaly's shifting energy fields and/or structural changes may nearly immediately be fed into the display. Members of the team may then update their assessments, and the computer may refine its simulations. Hence, potentially decisions may be re-evaluated in light of fresh signal information so that the team's collective expertise and the technological interface may work in concert to maintain situational awareness and/or control. Therefore, this scenario may showcase a closed-loop situational awareness system where the main viewer screen or display might not be a passive display but may be an active, dynamic interface that may provide real-time data integration, nearly simultaneous cognitive actionable feedback and/or unified command decision-making, just as, analogously, may take place with an embodiment in accordance with claim subject matter in a virtual collaborative 3D situational awareness center and/or room with closed loop and/or semi-closed loop feedback. Collective analysis may consequently lead to rapid, well-informed decisions that may adapt as the situation evolves. This integrated approach may be employed so that new and/or useful information, for example, may nearly immediately be analyzed, acted upon, and/or may create a seamless, adaptive environment that may embody the pinnacle of situational awareness and decision-making efficiency.

An embodiment in which a large viewer display or screen not only displays useful information but also directly feeds signal data into decision-makers' displays, for example, may operate so that cognitive processes, as described, for example, may be employed and result in signal information integration. Such an approach, for an embodiment, may offer several distinct advantages. For example, a large, centralized screen or display may present a comprehensive, real-time view of complex signal data, such as tactical maps, sensor readings, and/or communications. This signal information may also be directly or indirectly' L provided to experienced team members while cognitive processes may be executed potentially producing detailed signal data that may be quickly understood and contextualized. This integrated input may support rapid comprehension of the situation, such as in high-stakes scenarios. Multimodal signal data processing may also be employed. Humans process information in various ways. A visual display caters to those who rely on imagery and/or spatial representation, while other modes of signal data input may feed raw, analytical data (e.g., text, images, video, audio etc.) to someone who may excel in logical reasoning, for example. This multimodal approach may allow essentially the same signal information to be "read" in different formats, potentially catering to the strengths of respective decision-makers and perhaps reducing the chance of misinterpretation. Signal information may be delivered both visually and potentially via other formatted channels, for example, to potentially result in built-in redundancy. One channel may experience a delay or error; however, another channel may serve as a backup. Moreover, multiple representations of essentially the same signal data may permit cross-verification of details quickly, potentially bolstering confidence in the decisions made based at least in part on that signal information. Cognitive processing may reduce the time for interpretation. Instead of waiting for a visually scan and then waiting for mental processing, cognitive analytics may make available solid deductions quickly, for example. This may be especially valuable where split-second decisions may make the difference between success and failure. With a shared, central display, personnel may literally be "on the same page." This may also tend to reduce discrepancies in interpretation. This commonality may foster smoother communication and/or a more unified, coherent strategy, such as during various operations. Cognitive processing may allow a team member to rapidly correlate incoming signal data with a vast repository of stored knowledge, leading to more insightful and/or calculated decision-making. Integrating multiple channels of signal data input may reduce friction between signal information gathering and action. Instead of relying solely on manual observation and/or subsequent verbal reporting, an embodiment in accordance with claimed subject matter may provide an almost instantaneous flow of signal information into a command structure. This integration may be especially beneficial in scenarios that may involve both speed and precision. For an embodiment, added value of large displays that may be nearly simultaneously seen by a team may include: enhanced and redundant situational awareness, faster, more accurate signal data processing, multimodal information integration that leverages individual strengths, smoother team coordination, and/or a streamline of the overall decision-making process, potentially in high-pressure environments. An embodiment as described may, therefore, merge advanced technological displays with cognitive processing. Such a system embodiment may combine human intuition and machine precision for better decision making, useful for mission success in a host of complex operations.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular and/or the plural, "and/or" is also used to describe a plurality and/or some other combination of features, structures, characteristics, and/or the like. Likewise, the terms "based", "based on" and/or similar terms are understood as not necessarily intending to convey an exhaustive list of factors, but to allow for existence of additional factors not necessarily expressly described.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter and/or patent eligibility. Rather, it is asserted, that physical measurements are not mental steps and, likewise, are not abstract ideas. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more other memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combinations thereof. As mentioned, signal packets and/or frames, for example, may be exchanged, such as between a server device and/or a client device, as well as other types of devices, including between wired and/or wireless devices coupled via a wired and/or wireless network, for example, or any combinations thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combinations thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The terms electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "signal data," "signal information," "information," "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) may be referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the terms attributes (e.g., one or more attributes) and/or parameters (e.g., one or more parameters) refer to material descriptive of a collection of signal samples, such as one or more electronic documents and/or electronic files, and exist in the form of physical signals and/or physical states, such as memory states. For example, one or more parameters and/or attributes, such as referring to an electronic document and/or an electronic file comprising an image, may include, as examples, time of day at which an image was captured, latitude and longitude of an image capture device, such as a camera, for example, etc. In another example, one or more parameters and/or attributes relevant to digital content, such as digital content comprising a technical article, as an example, may include one or more authors, for example.

Claimed subject matter is intended to embrace meaningful, descriptive attributes and/or parameters in any format, so long as the one or more parameters and/or attributes comprise physical signals and/or states, which may include, as examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, OsNet, RS-232, SPX, System Network Architecture, Token Ring, USB, PCI and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$ and/or 5th generation (2G, 3G, 4G, and/or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 2, a system embodiment may comprise a local network (e.g., device 204 and medium 240) and/or another type of network, such as a computing and/or communications network. For purposes of illustration, therefore, FIG. 2 shows an embodiment 200 of a system that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 2 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112(f) so that it is specifically intended that 35 USC § 112(f) not be implicated by use of the term "computing device," "processor" and/or similar terms; however, if it is determined, for some reason not immediately apparent, that the foregoing understanding cannot stand and that 35 USC § 112(f), therefore, necessarily is implicated by the use of the term "computing device," "processor" and/or any other terms, then, it is intended, pursuant to that statutory section, that corresponding structure, material and/or acts for performing one or more functions be understood and be interpreted to be described at least in figure(s) 2 and 31 and in the text associated with the foregoing figure(s) of the present patent application.

In FIG. 2, computing device 202 may provide one or more sources of executable computer instructions in the form physical states and/or signals (e.g., stored in memory states), for example. Computing device 202 may communicate with computing device 204 by way of a network connection, such as via network 208, for example. As previously mentioned, a connection, while physical, may not necessarily be tangible. Although computing device 204 of FIG. 2 shows various tangible, physical components, claimed subject matter is not limited to a computing device having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof may be used. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable computer instructions. For example, processor 220 may fetch executable instructions from memory and proceed to execute the fetched instructions. Memory 222 may also comprise a memory controller for accessing device readable-medium 240 that may carry and/or make accessible digital content, which may include code, and/or instructions, for example, executable by processor 220 and/or some other device, such as a controller, as one example, capable of executing computer instructions, for example. Under direction of processor 220, a non-transitory memory, such as memory cells storing physical states (e.g., memory states), comprising, for example, a program of executable computer instructions, may be executed by processor 220 and able to generate signals to be communicated via a network, for example, as previously described. Generated signals may also be stored in memory, also previously suggested.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, attributes, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 2, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combinations thereof. In various implementations and/or embodiments, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 2 also illustrates device 204 as including a component 232 operable with input/output devices, for example, so that signals and/or states may be appropriately communicated between devices, such as device 204 and an input device and/or device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals, referred to, for example, as a speaking event. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. An article comprising: a non-transitory storage medium; wherein instructions stored thereon are executable to perform the following:

computer generating a virtual fully immersive, photorealistic 3D gaming environment using real-time ray tracing, wherein the computer generating includes computer generating at least four up to a hundred or more three-dimensional (3D) virtual displays arranged in a configuration;

generating computer-generated web browser derived real-time content within the 3D gaming environment using AI assisted and/or AI augmented processing for at least some of the generated web browser derived real-time content;

streaming via a standard internet connection at least portions of the computer-generated virtual fully immersive, photorealistic 3D gaming environment;

wherein the computer generating further comprises: computer generating a virtual collaborative 3D situational awareness center and/or room to provide situational awareness with respect to the selected environment;

wherein the populating comprises populating the virtual collaborative 3D situational awareness center and/or room with computer-generated web browser derived real-time content;

wherein the streaming comprises: streaming the virtual collaborative 3D situational awareness center and/or room to provide the situational awareness with respect to the selected environment, and wherein the AI assisted and/or AI augmented processing is to permit audio language processing for receiving natural language multimodal AI prompts and/or for providing natural language multimodal responses to AI prompts.

2. The article of claim 1, wherein the natural language multimodal AI prompts and/or the natural language multimodal AI responses comprise conversational natural language voice prompts and/or responses.

3. The article of claim 1, wherein the AI assisted and/or AI augmented processing comprises AI assisted and/or AI augmented signal processing includes using any one of a variety of AI techniques with respect to a past, present, and/or predicted future state of the selected environment to generate cognitive analytics.

4. The article of claim 3, wherein at least one of the states of the selected environment comprises the state of a business and includes at least one or more of the following: profits, sales, revenue, and/or operating costs.

5. The article of claim 4, wherein a Return Map comprises a virtual instrument to illustrate one or more states and/or one or more metric measurements in which at least the profits, sales, revenue, and/or operating costs are able to be used to extend past and present business metrics into future business metrics.

6. The article of claim 3, wherein AI assisted and/or AI augmented processing comprises agentized and/or AI agent processing.

7. The article of claim 6, wherein the agentized and/or AI agent processing comprises processing by an information scientist agent.

8. The article of claim 3, wherein the computer generating, the populating and the streaming provide the situational awareness for the selected environment, updated periodically, aperiodically, continuously or continually, to enable closed-loop and/or semi-closed loop type decision making.

9. The article of claim 1, wherein the computer generating includes computer generating the 3D virtual displays within the 3D gaming environment so as to be able to form a template for the display of and/or interaction with computer-generated web browser derived real-time content to populate the 3D virtual displays.

10. The article of claim 9, wherein the instructions are further executable to perform:

saving the template.

11. The article of claim 1, wherein the instructions are further executable to perform: the populating, wherein the populating comprises populating the at least four up to a hundred or more 3D virtual displays within the 3D gaming environment with selected computer-generated web browser derived real-time content so as to form a virtual set for the display of and/or interaction with the selected computer-generated selected web browser derived real-time content, and, wherein the instructions are further executable to perform: saving the virtual set.

12. A method comprising:

computer generating a virtual fully immersive, photorealistic 3D gaming environment using real-time ray tracing, wherein the computer generating includes computer generating at least four up to a hundred or more three-dimensional (3D) virtual displays arranged in a configuration;

generating computer-generated web browser derived real-time content within the 3D gaming environment using AI assisted and/or AI augmented processing for at least some of the generated web browser derived real-time content;

streaming via a standard internet connection at least portions of the computer-generated virtual fully immersive, photorealistic 3D gaming environment;

wherein the computer generating further comprises: computer generating a virtual collaborative 3D situational awareness center and/or room to provide situational awareness for a selected environment;

wherein the populating comprises populating the virtual collaborative 3D situational awareness center and/or room with computer-generated web browser derived real-time content;

wherein the streaming comprises: streaming the virtual collaborative 3D situational awareness center and/or room to provide the situational awareness for a selected environment; and wherein the AI assisted and/or AI augmented processing permits audio language processing for receiving natural language multimodal AI prompts and/or for providing natural language multimodal responses to AI prompts.

13. The method of claim 12, wherein the natural language multimodal AI prompts and/or the natural language multimodal AI responses comprises conversational natural language voice prompts and/or responses.

14. The method of claim 12, wherein the AI assisted and/or AI augmented processing comprises AI assisted and/or AI augmented signal processing that includes using any one of a variety of AI techniques with respect to a past, present, and/or predicted future state of the selected environment to generate cognitive analytics.

15. The method of claim 14, wherein at least one of the states of the selected environment comprises the state of a business and includes at least one or more of the following: profits, sales, revenue, and/or operating costs.

16. The method of claim 15, wherein a Return Map comprises a virtual instrument to illustrate one or more states and/or one or more metric measurements in which at least the profits, sales, revenue, and/or operating costs are able to be used to extend past and present business metrics into future business metrics.

17. The method of claim 14, wherein AI assisted and/or AI augmented processing comprises agentized and/or AI agent processing.

18. The method of claim 17, wherein the agentized and/or AI agent processing comprises processing by an information scientist agent.

19. The method of claim 14, wherein the computer generating, the populating and the streaming provide the situational awareness for the selected environment, updated periodically, aperiodically, continuously or continually, to enable closed-loop and/or semi-closed loop type decision making.

* * * * *